(12) United States Patent
Talarico et al.

(10) Patent No.: US 11,991,003 B2
(45) Date of Patent: May 21, 2024

(54) CONTENTION WINDOW SIZE UPDATES FOR CODE BLOCK GROUP BASED RETRANSMISSION CONFIGURATIONS

(71) Applicant: Apple Inc., Cupertino, CA (US)

(72) Inventors: Salvatore Talarico, Santa Clara, CA (US); Gang Xiong, Santa Clara, CA (US); Yingyang Li, Santa Clara, CA (US); Carlos H. Aldana, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 288 days.

(21) Appl. No.: 17/415,845

(22) PCT Filed: Mar. 20, 2020

(86) PCT No.: PCT/US2020/023900
§ 371 (c)(1),
(2) Date: Jun. 18, 2021

(87) PCT Pub. No.: WO2020/191309
PCT Pub. Date: Sep. 24, 2020

(65) Prior Publication Data
US 2022/0085924 A1    Mar. 17, 2022

Related U.S. Application Data

(60) Provisional application No. 62/821,847, filed on Mar. 21, 2019.

(51) Int. Cl.
*H04L 1/1829* (2023.01)
*H04L 1/1812* (2023.01)
*H04W 74/0816* (2024.01)

(52) U.S. Cl.
CPC .......... *H04L 1/1854* (2013.01); *H04L 1/1812* (2013.01); *H04L 1/1832* (2013.01); *H04W 74/0816* (2013.01)

(58) Field of Classification Search
None
See application file for complete search history.

(56) References Cited

U.S. PATENT DOCUMENTS

| | | | |
|---|---|---|---|
| 2017/0171883 A1 | 6/2017 | Noh | |
| 2019/0037601 A1* | 1/2019 | Noh | .......... H04L 27/26 |

(Continued)

FOREIGN PATENT DOCUMENTS

| | | |
|---|---|---|
| CN | 108886815 | 11/2018 |
| CN | 109314615 | 2/2019 |

OTHER PUBLICATIONS

International Search Report and Written Opinion for International Application No. PCT/US2020/023900, dated Nov. 13, 2020, 19 pgs.

(Continued)

*Primary Examiner* — Yaotang Wang
(74) *Attorney, Agent, or Firm* — Kowert, Hood, Munyon, Rankin & Goetzel, P.C.

(57) ABSTRACT

Apparatuses, systems, and methods for performing contention window size updates for code block group based retransmission configurations in a wireless communication system. A code block group based wireless communication may be performed in unlicensed spectrum. A reference burst of the code block group based wireless communication may be identified. One or more of a number of acknowledgements or a number of negative acknowledgements associated with the reference burst may be identified. A contention window size adjustment may be determined based at least in part on one or more of the number of acknowledgements or the number of negative acknowledgements associated with the reference burst.

20 Claims, 20 Drawing Sheets

(56) References Cited

U.S. PATENT DOCUMENTS

| | | | | |
|---|---|---|---|---|
| 2020/0084789 A1* | 3/2020 | Wang | ................... | H04L 1/1825 |
| 2020/0100286 A1* | 3/2020 | Xu | .......................... | H04L 1/187 |
| 2020/0344819 A1* | 10/2020 | Myung | ................ | H04W 72/23 |
| 2021/0160919 A1* | 5/2021 | Wang | ................... | H04W 74/08 |
| 2021/0360673 A1* | 11/2021 | Myung | ................ | H04L 1/1864 |

OTHER PUBLICATIONS

Later Publication of revised International Search Report for International Application No. PCT/US2020/023900, dated Dec. 24, 2020, 6 pgs.
Second Written Opinion of the International Preliminary Examining Authority for International Application No. PCT/US2020/023900, dated Feb. 12, 2021, 5 pgs.
Nokia, et al: "Feature Lead's Summary on Channel Access Procedures," 3GPP TSG RAN WG1 Ad-Hoc; Meeting 1901; R1-1901408, Jan. 2019; Taipei, Taiwan; 17 pgs.
Intel Corporation: "Enhancements to channel access mechanism for NR-unlicensed," 3GPP TSG RAN WG1; Meeting #94; R1-1808685, Aug. 2018; Gothenburg, Sweden; 9 pgs.
Office Action for CN Patent Application No. 202080007571.1; dated Dec. 20, 2023.
LG Electronics "Corrections for spatial bundling in AUL-DFI"; 3GPP TSG RAN WG1 Meeting R1-1807509; May 25, 2018.
Alcatel et al. "Remaining Details ofSingle-Carrier LBT"; 3GPP TSG RAN WG1 Meeting R1-157013; Nov. 22, 2015.

* cited by examiner

| LBT Priority Class | n | CWmin | CWmax | MCOT | Set of CW Sizes |
|---|---|---|---|---|---|
| 1 | 1 | 3 | 7 | 2ms | {3,7} |
| 2 | 1 | 7 | 15 | 3ms | {7,15} |
| 3 | 3 | 15 | 63 | 8 or 10ms | {15,31,63} |
| 4 | 7 | 15 | 1023 | 8 or 10ms | {15,31,63,127,255,511,1023} |

FIG. 8

| LBT Priority Class | n | CWmin | CWmax | MCOT | Set of CW Sizes |
|---|---|---|---|---|---|
| 1 | 1 | 3 | 7 | 2ms | {3,7} |
| 2 | 1 | 7 | 15 | 4ms | {7,15} |
| 3 | 3 | 15 | 1023 | 6ms (see note 1) or 10ms (see note 2) | {15,31,63,127,255,511,1023} |
| 4 | 7 | 15 | 1023 | 6ms (see note 1) or 10ms (see note 2) | {15,31,63,127,255,511,1023} |

NOTE 1: The MCOT of 6ms may be increased to 8 ms by inserting one or more gaps. The minimum duration of a pause shall be 100 μs. The maximum duration (Channel Occupancy) before including any such gap shall be 6 ms. The gap duration is not included in the channel occupancy time.

NOTE 2: If the absence of any other technology sharing the carrier can be guaranteed on a long term basis (e.g. by level of regulation), the maximum channel occupancy time (MCOT) for LBT priority classes 3 and 4 is for 10 ms, otherwise, the MCOT for LBT priority classes 3 and 4 is 6 ms, as in note 1.

FIG. 9

| LBT Priority Class | n | CWmin | CWmax | MCOT | Set of CW Sizes |
|---|---|---|---|---|---|
| 1 | 1 | ((aCWmax+1)/256-1) | ((aCWmax+1)/128-1) | 2ms | {3,7} |
| 2 | 1 | ((aCWmax+1)/128-1) | ((aCWmax+1)/64-1) | 4ms | {7,15} |
| 3 | 3 | ((aCWmax+1)/64-1) | aCWmax | 6ms (see note 1) or 10ms (see note 2) | {15,31,63,127,255,511,1023} |
| 4 | 7 | ((aCWmax+1)/64-1) | aCWmax | 6ms (see note 1) or 10ms (see note 2) | {15,31,63,127,255,511,1023} |

NOTE 1: The MCOT of 6ms may be increased to 8 ms by inserting one or more gaps. The minimum duration of a pause shall be 100 μs. The maximum duration (Channel Occupancy) before including any such gap shall be 6 ms. The gap duration is not included in the channel occupancy time.

NOTE 2: If the absence of any other technology sharing the carrier can be guaranteed on a long term basis (e.g. by level of regulation), the maximum channel occupancy time (MCOT) for LBT priority classes 3 and 4 is for 10 ms, otherwise, the MCOT for LBT priority classes 3 and 4 is 6 ms, as in note 1.

FIG. 10

CONTENTION WINDOW SIZE UPDATES FOR CODE BLOCK GROUP BASED RETRANSMISSION CONFIGURATIONS

PRIORITY INFORMATION

This application is a U.S. National Stage filing of International Application No. PCT/US2020/023900, filed Mar. 20, 2020, titled "CONTENTION WINDOW SIZE UPDATES FOR CODE BLOCK GROUP BASED RETRANSMISSION CONFIGURATIONS", which claims the benefit of priority to U.S. provisional patent application Ser. No. 62/821,847, entitled "ON THE CONTENTION WINDOW SIZE UPDATE FOR CAT. 4 LBT FOR CBG BASED RETRANSMISSION IN NR SYSTEMS OPERATING ON UNLICENSED SPECTRUM," filed Mar. 21, 2019, each of which are hereby incorporated by reference in their entirety as though fully and completely set forth herein.

FIELD

The present application relates to wireless devices, and more particularly to apparatus, systems, and methods for performing contention window size updates for code block group based retransmission configurations in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), BLUETOOTH', etc.

The ever increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments relate to apparatuses, systems, and methods for performing contention window size updates for code block group based retransmission configurations in a wireless communication system.

According to the techniques described herein, a wireless device (e.g., a cellular base station or a user equipment device) may determine to perform a wireless communication in unlicensed spectrum with code block group based retransmissions configured. In order to perform the wireless communication, the wireless device may perform a listen-before-talk procedure to obtain medium access, and so may determine a contention window size for the listen-before-talk procedure. In order to determine the contention window size, the wireless device may identify a reference burst (e.g., a portion of a previous downlink or uplink burst), and identify the hybrid automatic repeat request feedbacks for the reference burst. Based at least in part on these feedbacks, the wireless device may determine whether (and, if so, how) to adjust the contention window size for the listen-before-talk procedure. The wireless device may then perform the listen-before-talk procedure using the selected contention window size, and upon successfully completing the listen-before-talk procedure, may perform the wireless communication.

The techniques described herein may be implemented in and/or used with a number of different types of devices, including but not limited to unmanned aerial vehicles (UAVs), unmanned aerial controllers (UACs), cellular phones, tablet computers, wearable computing devices, portable media players, automobiles and/or motorized vehicles, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIGS. 8-10 are tables illustrating possible sets of listen-before-talk parameters and maximum channel occupancy time values, according to some embodiments;

Figure 1:
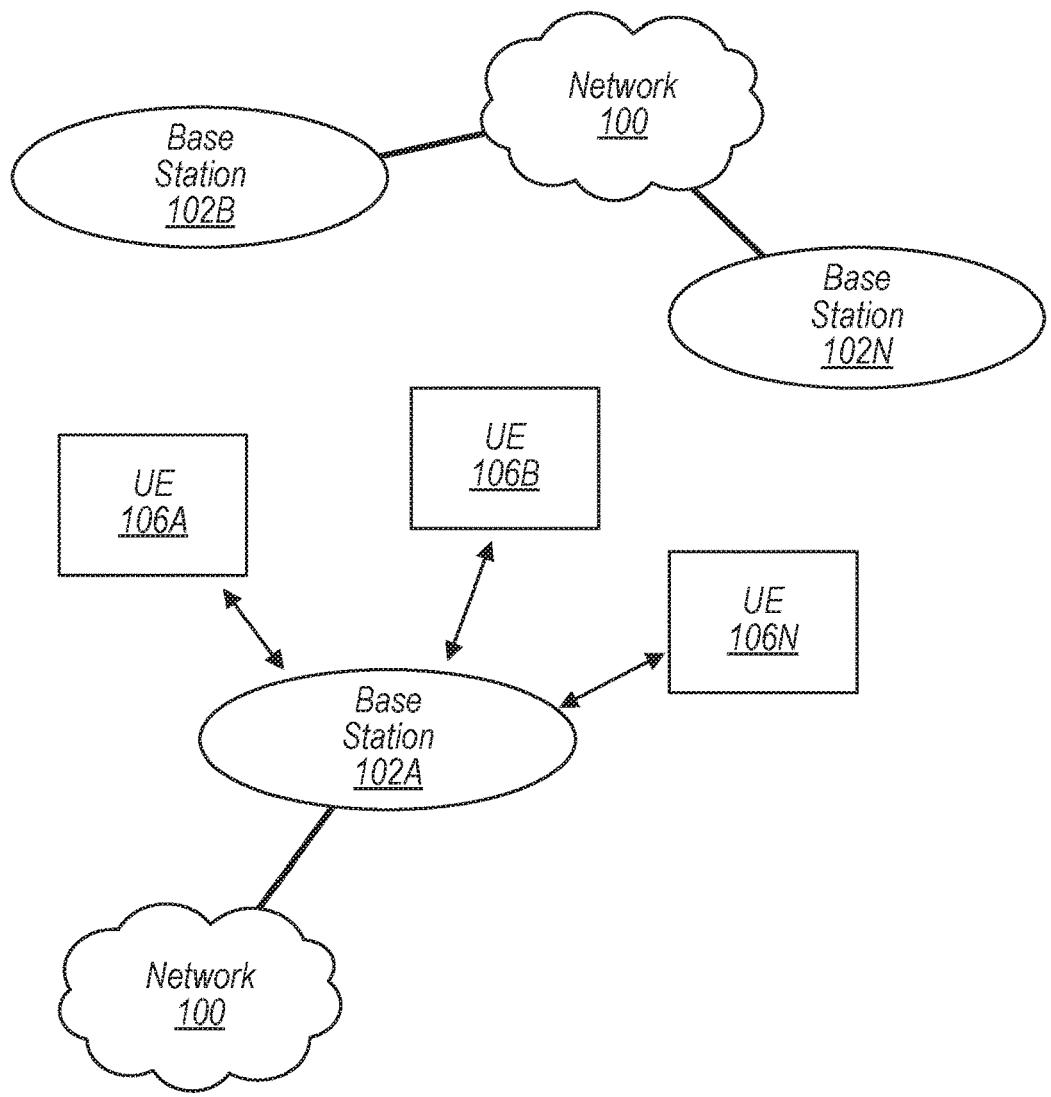
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
4G: Fourth Generation
5G: Fifth Generation
Rel: Release
NW: Network
RF: Radio Frequency
UE: User Equipment
BS: Base Station
gNB: Next Generation NodeB
GSM: Global System for Mobile Communication
UMTS: Universal Mobile Telecommunication System
LTE: Long Term Evolution
NR: New Radio
NR-U: NR Unlicensed
RAT: Radio Access Technology
TX: Transmission/Transmit
RX: Reception/Receive
UL: Uplink
DL: Downlink
CORESET: Control Resource Set
LBT: Listen Before Talk
MCOT: Maximum Channel Occupancy Time
CWS: Contention Window Size
HARQ: Hybrid Automatic Repeat Request
ACK: Acknowledgement
NACK: Negative Acknowledgement Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
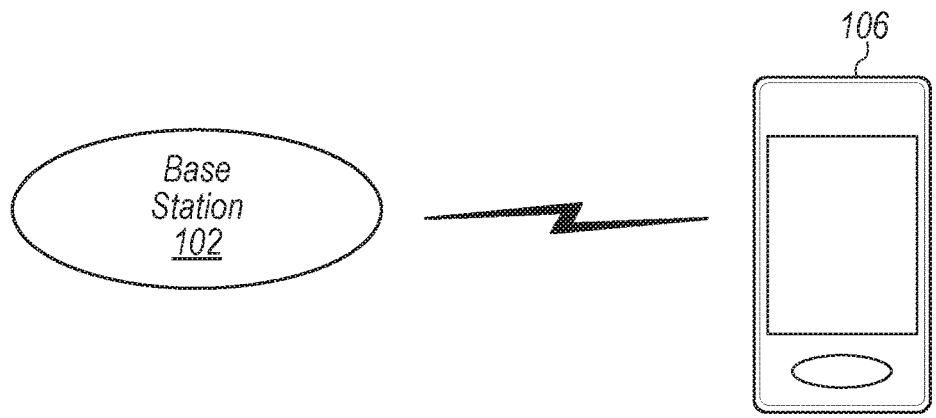
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternatively be referred to as a 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC)/5G core (5GC) network. In addition, a gNB cell may include one or more transition and reception points (TRPs). In addition, a UE capable of operating according to 5G NR may be connected to one or more TRPs within one or more gNBs. For example, it may be possible that the base station 102A and one or more other base stations 102 support joint transmission, such that UE 106 may be able to receive transmissions from multiple base stations (and/or multiple TRPs provided by the same base station).

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer, a laptop, a tablet, a smart watch or other wearable device, an unmanned aerial vehicle (UAV), an unmanned aerial controllers (UAC), an automobile, or virtually any type of wireless device.

The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

Figure 3:
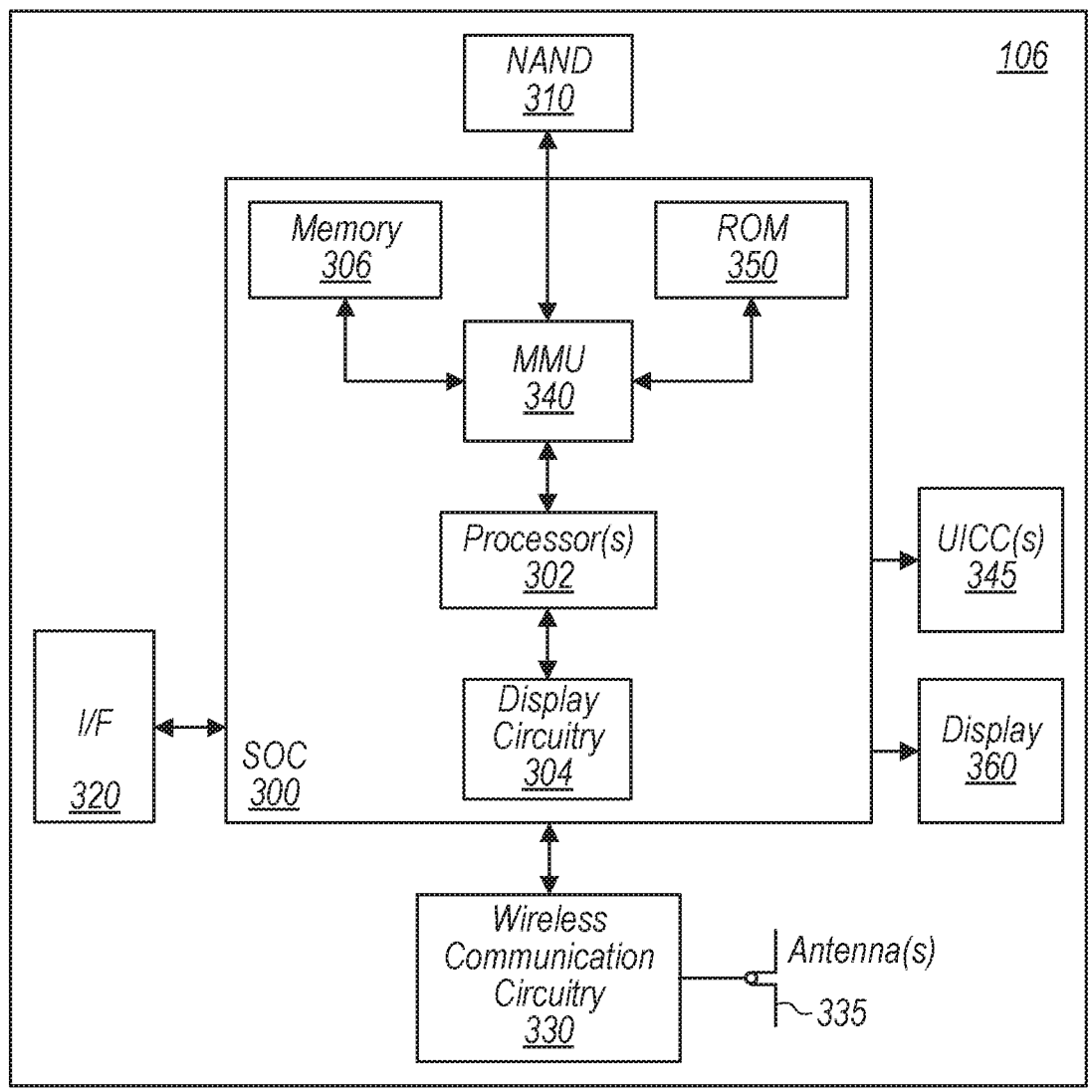
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some embodiments, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Figure 4:
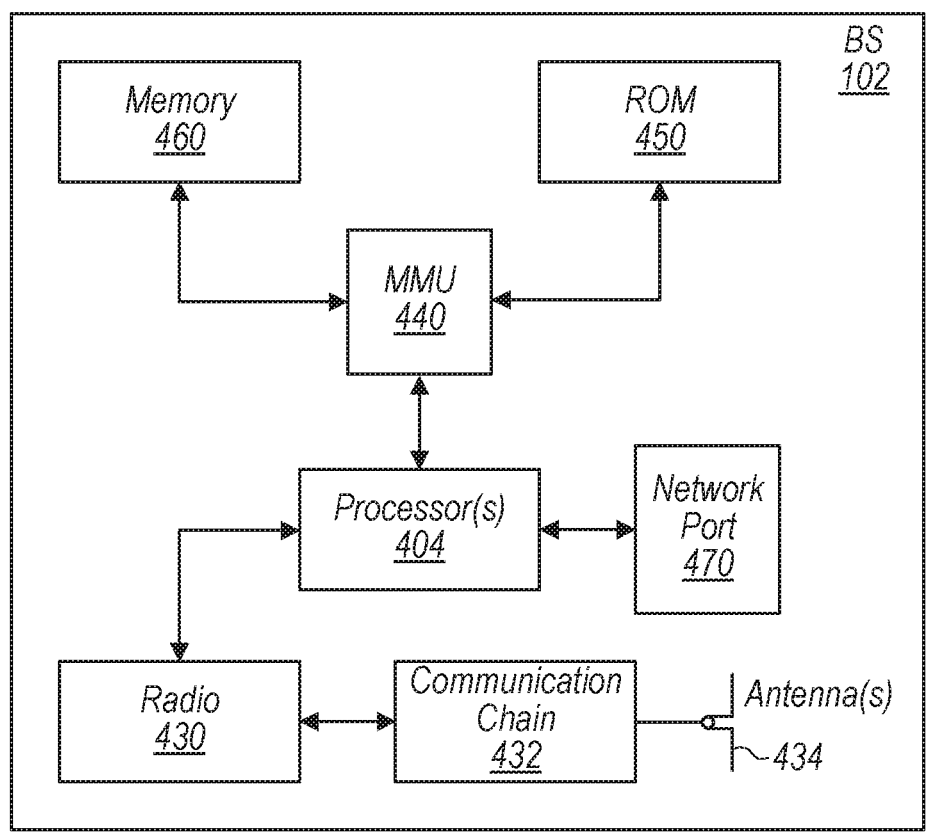
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC)/5G core (5GC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
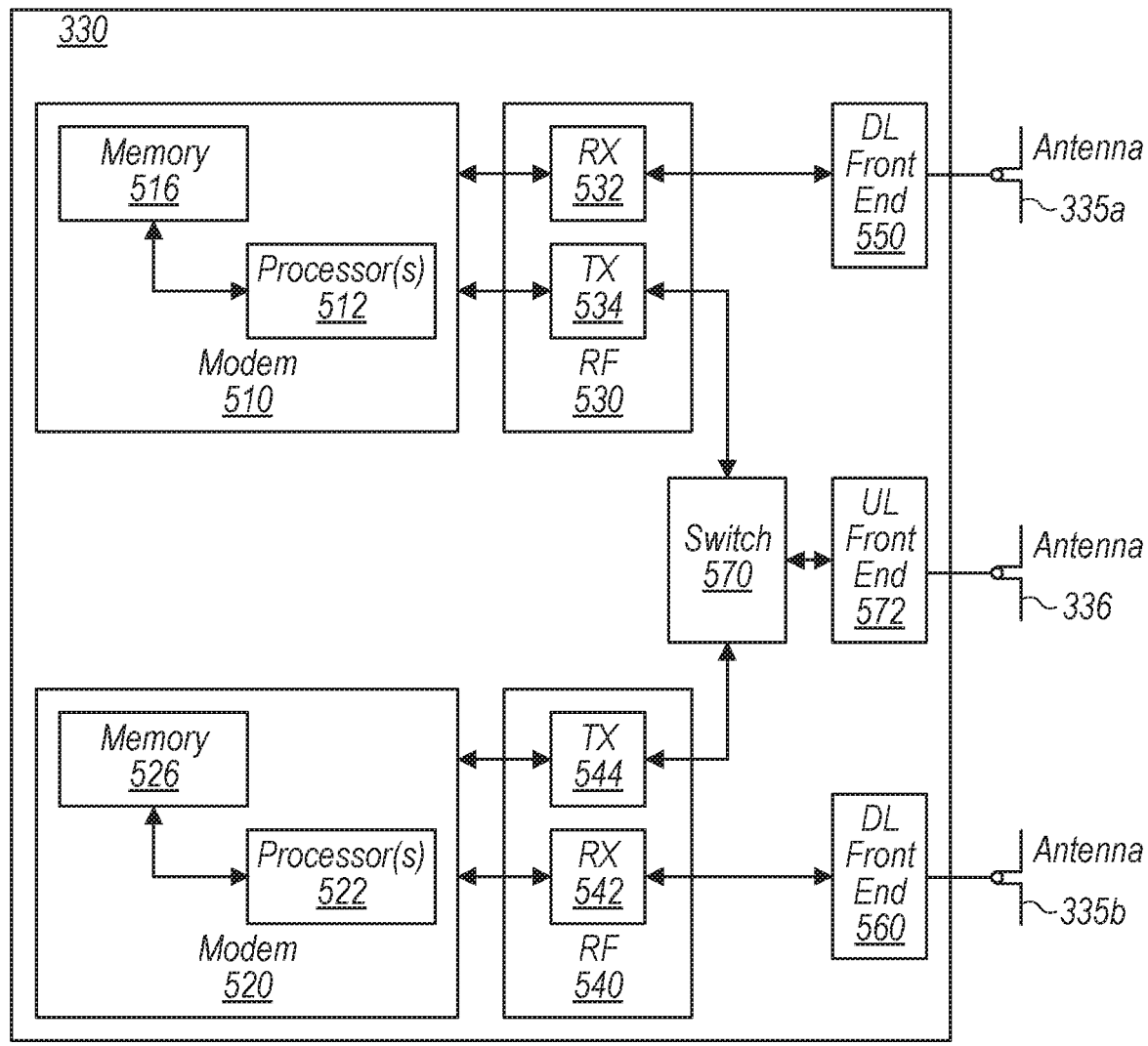
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown. In some embodiments, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 330 may include only one transmit/receive chain. For example, the cellular communication circuitry 330 may not include the modem 520, the RF front end 540, the DL front end 560, and/or the antenna 335*b*. As another example, the cellular communication circuitry 330 may not include the modem 510, the RF front end 530, the DL front end 550, and/or the antenna 335*a*. In some embodiments, the cellular communication circuitry 330 may also not include the switch 570, and the RF front end 530 or the RF front end 540 may be in communication, e.g., directly, with the UL front end 572.

Figure 6:
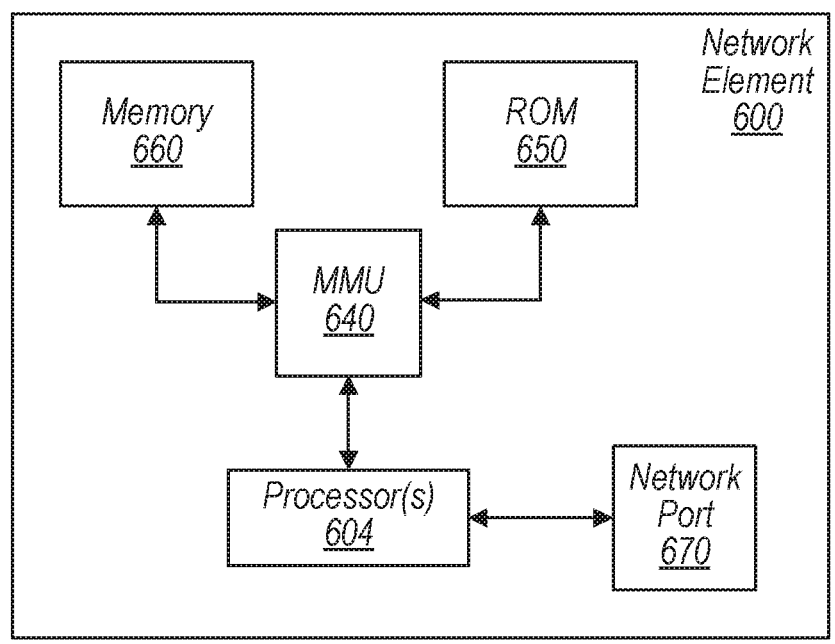
FIG. 6 illustrates an example block diagram of a network element, according to some embodiments.

FIG. 6—Exemplary Block Diagram of a Network Element

FIG. 6 illustrates an exemplary block diagram of a network element 600, according to some embodiments. According to some embodiments, the network element 600 may implement one or more logical functions/entities of a cellular core network, such as a mobility management entity (MME), serving gateway (S-GW), access and management function (AMF), session management function (SMF), etc. It is noted that the network element 600 of FIG. 6 is merely one example of a possible network element 600. As shown, the core network element 600 may include processor(s) 604 which may execute program instructions for the core network element 600. The processor(s) 604 may also be coupled to memory management unit (MMU) 640, which may be configured to receive addresses from the processor(s) 604 and translate those addresses to locations in memory (e.g., memory 660 and read only memory (ROM) 650) or to other circuits or devices.

The network element 600 may include at least one network port 670. The network port 670 may be configured to couple to one or more base stations and/or other cellular network entities and/or devices. The network element 600 may communicate with base stations (e.g., eNBs/gNBs) and/or other network entities/devices by means of any of various communication protocols and/or interfaces.

As described further subsequently herein, the network element 600 may include hardware and software components for implementing and/or supporting implementation of features described herein. The processor(s) 604 of the core network element 600 may be configured to implement or support implementaiton of part or all of the methods described herein, e.g., by executing program instructions stored on a memory medium (e.g., a non-transitory computer-readable memory medium). Alternatively, the processor 604 may be configured as a programmable hardware element, such as an FPGA (Field Programmable Gate Array), or as an ASIC (Application Specific Integrated Circuit), or a combination thereof.

Figure 7:
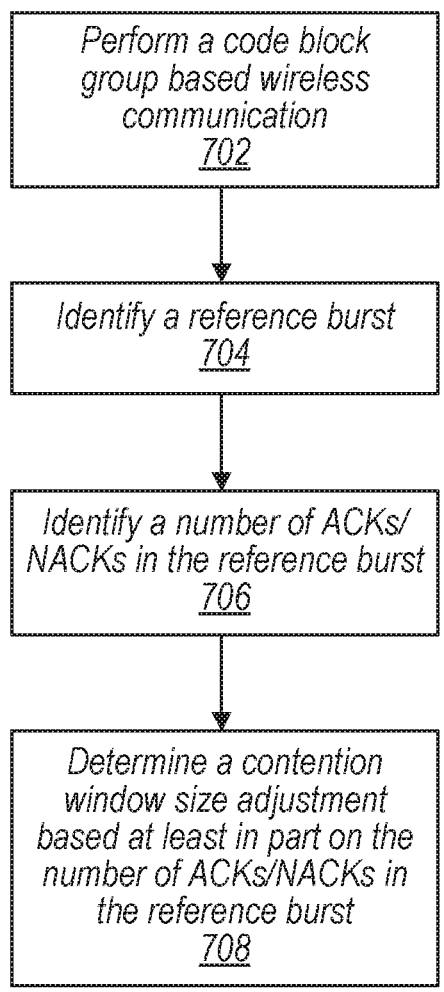
FIG. 7 is a flowchart diagram illustrating an example method for performing contention window size updates for code block group based retransmission configurations in a wireless communication system; according to some embodiments.

FIG. 7—Contention Window Size Updates for Code Block Group Based Retransmission Configurations New cellular communication techniques are continually under development, to increase coverage, to better serve the range of demands and use cases, and for a variety of other reasons. As new cellular communication technologies is developed and deployed, certain features may be included that are new or differ from previously developed and deployed cellular communication technologies.

In 3GPP 5G NR, code block group (CBG) based retransmission can be configured. This feature may include dividing a transport block (TB) into smaller subsets, which may be referred to as code block groups. When such a feature is configured, hybrid automatic repeat request (HARQ) feedback may be provided on a per CBG basis, e.g., in a more finely grained manner than if HARQ feedback is provided on a per TB basis. This may reduce the amount of data that may need to be retransmitted, albeit potentially at a cost of greater HARQ feedback overhead, at least according to some embodiments.

Techniques for deploying NR in unlicensed spectrum may be subject to regulations and/or other requirements, which could for example include a requirement to perform a listen-before-talk (LBT) procedure prior to performing a transmission in certain spectrum portions in certain jurisdictions. At least in some instances, the contention window size (CWS) for such an LBT procedure may be adapted based on HARQ feedback. Thus, when CBG based retransmission is configured, this may in turn affect how the CWS adjustments are performed for LBT procedures, and it may accordingly be beneficial to provide a framework for how to perform contention window size updates when CBG based retransmission is configured.

Accordingly, FIG. 7 is a flowchart diagram illustrating an example of a method for performing contention window size updates for code block group based retransmission configurations in a wireless communication system, at least according to some embodiments. Aspects of the method of FIG. 7 may be implemented by a wireless device such as a UE 106 illustrated in various of the Figures herein, a base station such as a BS 102 illustrated in various of the Figures herein, and/or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

In various embodiments, some of the elements of the methods shown may be performed concurrently, in a different order than shown, may be substituted for by other method elements, or may be omitted. Additional elements may also be performed as desired. As shown, the method of FIG. 7 may operate as follows.

In 702, a code block group based wireless communication may be performed. The CBG based wireless communication may include a downlink communication transmitted by a cellular base station (such as a gNB operating according to 3GPP 5G NR) to a wireless device (e.g., a UE device). As another possibility, the CBG based wireless communication may include an uplink communication transmitted by a wireless device to a cellular base station. In such a case, the uplink communication may be triggered by the provision of an uplink grant from a serving cellular base station, at least in some instances. The communication may be performed in unlicensed spectrum, and performing the communication may include performing a LBT procedure to contend for medium access prior to transmission, at least according to some embodiments.

In 704, a reference burst of the CBG based wireless communication may be identified. The reference burst may be determined in any of various ways, and may depend on the type of wireless communication being performed, in some instances.

For example, as one possibility, for a downlink transmission, the downlink reference burst may include a specified portion of the most recent/latest downlink burst for which HARQ-ACK feedback is available. The portion specified may include a configured amount of time (e.g., 1 ms, or some other amount) from the beginning of the downlink burst, e.g., in a manner independent from subcarrier spacing, as one possibility. As another possibility, the portion specified may include a partial subframe from the beginning of the downlink burst. As a still further possibility, the portion specified may include the partial subframe from the beginning of the downlink burst, and also the following subframe, although if the partial subframe is the only subframe included in the downlink burst, it may be the case that only the partial subframe is used as the downlink reference burst. As a still further possibility, the portion specified may include a configured number of symbols from the beginning of the downlink burst.

As another possibility, for an uplink transmission, the uplink reference burst may include a specified portion of the most recent/latest uplink burst with uplink shared channel (UL-SCH) content that is transmitted at least a certain amount of time (e.g., 4 ms, or some other amount) prior to receiving the uplink grant for the uplink transmission. The portion specified may include a configured amount of time (e.g., 1 ms, or some other amount) from the beginning of the uplink burst as the uplink reference burst, e.g., in a manner independent from subcarrier spacing, as one possibility. As another possibility, the portion specified may include a partial subframe from the beginning of the uplink burst. As a still further possibility, the portion specified may include the partial subframe from the beginning of the uplink burst, and also the following subframe, although if the partial subframe is the only subframe included in the uplink burst, it may be the case that only the partial subframe is used as the uplink reference burst. As a still further possibility, the portion specified may include a configured number of symbols from the beginning of the uplink burst as the uplink reference burst.

The reference burst may be used to determine whether to perform a CWS adjustment for the LBT procedure for the wireless communication. Accordingly, in 706, the number of ACKs and/or the number of NACKs in the reference burst may be determined. Identifying the number of ACKs/NACKs in the reference burst may be performed using the CBG based HARQ feedback for the reference burst. This may include counting feedbacks for each CBG individually, or may include translating the CBG level feedback to an equivalent TB level feedback, according to various embodiments.

For example, according to some embodiments, all CBG feedback for a TB may be identified as NACKs if a NACK is received for at least one CBG of the TB. Alternatively, it may be the case that the feedback for each CBG is counted independently of each other CBG feedback for the TB. In case the CBG feedback is translated to TB level feedback, it may be the case that a TB feedback is identified as a NACK based on one of: all CBG feedbacks in the TB being NACKs; a certain percentage of CBG feedbacks for the TB being NACKs; or at least one CBG feedback for the TB being a NACK.

In 708, a CWS adjustment may be determined based at least in part on the number of ACKs/NACKs in the reference burst. As one possibility, this may include increasing the CWS (e.g., if not yet at a maximum configured CWS) if a percentage of HARQ feedbacks (e.g., CBG level feedback, or possibly TB level feedback) that are NACKs is above a certain threshold. In some instances, (e.g., in case of uplink transmission), the CWS adjustment may additionally or alternatively be based at least in part on whether the same HARQ process ID is scheduled by the uplink grant, and whether a new data indicator (NDI) bit is toggled in case the same HARQ process ID is scheduled by the uplink grant. For example, in some instances, the CWS may be increased (e.g., if not yet at a maximum configured CWS) if the NDI bit for at least one active HARQ process of the HARQ process ID of the uplink reference burst is not toggled in the uplink grant for which the CWS size adjustment is determined, or if the HARQ process ID of the uplink reference burst is not scheduled in the uplink grant for which the CWS size adjustment is determined. As another example, the CWS may be reset if a new data indicator (NDI) bit for at least one active HARQ process of a HARQ process ID of the uplink reference burst is toggled in the uplink grant for which the CWS size adjustment is determined. In some instances, it may be the case that the CWS is reset to a minimum CWS value for a priority class if a maximum CWS value is used for a configured number of LBT attempts for the priority class. Other adjustments, and/or variations on these example adjustments, are also possible.

Note that, at least in some instances, CWS selection parameters that may be used when performing CWS adjustment determination for uplink communications may be provided from a cellular base station to a UE served by the cellular base station, e.g., via radio resource control (RRC) signaling, or in any of various other ways. Alternatively, such parameters may be pre-configured at the UE, e.g., based on 3GPP specifications. The cellular base station may also use a set of CWS selection parameters when performing CWS adjustment determination for downlink communications, according to some embodiments.

According to some embodiments, once any CWS adjustment has been determined, a listen-before-talk procedure may be performed using the selected CWS. Following successful completion of the LBT procedure, the wireless communication may be performed.

Thus, using the techniques of FIG. 7, it may be possible to perform CWS adjustments in a specified and consistent manner, which may support fair coexistence and medium access between 3GPP NR-U communication and incumbent technologies, when CBG based retransmission is configured, at least according to some embodiments.

FIGS. 8-27 and Additional Information

FIGS. 8-27 illustrate further aspects that might be used in conjunction with the method of FIG. 7 if desired. It should be noted, however, that the exemplary details illustrated in and described with respect to FIGS. 8-27 are not intended to be limiting to the disclosure as a whole: numerous variations and alternatives to the details provided herein below are possible and should be considered within the scope of the disclosure.

Each year, the number of mobile devices connected to wireless networks significantly increases. In order to keep up with the demand in mobile data traffic, necessary changes have to be made to system requirements to be able to meet these demands. Three critical areas that need to be enhanced in order to deliver this increase in traffic may include larger bandwidth, lower latency, and higher data rates.

One of the major limiting factors in wireless innovation is the availability in spectrum. To mitigate this, the unlicensed spectrum has been an area of interest to expand the availability of LTE. In this context, one of the major enhancements for LTE in 3GPP Release 13 has been to enable its operation in the unlicensed spectrum via Licensed-Assisted Access (LAA), which expands the system bandwidth by utilizing the flexible carrier aggregation (CA) framework introduced by the LTE-Advanced system.

Now that the main building blocks for the framework of NR have been established, an enhancement is to allow this to also operate on unlicensed spectrum. Various aspects of NR-based operation in unlicensed spectrum may be considered, including physical channels inheriting the choices of duplex mode, waveform, carrier bandwidth, subcarrier spacing, frame structure, and physical layer design made as part of the NR study and avoiding unnecessary divergence with decisions made in the NR WI. It may be the case that unlicensed bands both below and above 6 GHz, up to 52.6 GHz may be considered; unlicensed bands above 52.6 GHz may also be considered to the extent that waveform design principles remain unchanged with respect to below 52.6 GHz bands; and considering similar forward compatibility principles made in the NR WI.

Initial access and channel access may also be considered, potentially including scheduling/HARQ, and mobility including connected/inactive/idle mode operation and radio-link monitoring/failure.

Coexistence methods within NR-based and between NR-based operation in unlicensed and LTE-based LAA and with other incumbent RATs may be considered, in accordance with regulatory requirements, for example in the 5 GHz, 37 GHz, and/or 60 GHz bands.

Coexistence methods already defined for 5 GHz band in LTE-based LAA context may be assumed as the baseline for 5 GHz operation, in some instances. Enhancements in 5 GHz over these methods should not be precluded. It may be preferred or possibly required that NR-based operation in unlicensed spectrum should not impact deployed Wi-Fi services (data, video and voice services) more than an additional Wi-Fi network on the same carrier.

It is important to identify aspects of the design that can be enhanced for NR when operating in unlicensed spectrum. One of the challenges in this case is for this system to maintain fair coexistence with other incumbent technologies, and in order to do so depending on the particular band in which it might operate some restriction might be taken into account when designing this system. For instance, if operating in the 5 GHz band, a listen before talk (LBT) procedure needs to be performed in some parts of the world to acquire the medium before a transmission can occur.

In legacy Rel. 15 NR, among other enhancements of the PHY layer, the HARQ procedure was improved and modified. In fact, Rel. 15 NR introduces the concept of code block groups (CBGs), wherein essentially a transport block (TB) is divided into smaller subsets, called CBGs. These groups are decoded by the UE, and the UE then sends HARQ feedback for each CBG. The aim for the CBGs based retransmission is to cope with the fact that NR supports very large transport block sizes (TBS) and as in legacy LTE the scheduler works with a 10% BLER target. This implies that if the gNB is transmitting data to the UE with a large TBS, around 10% of this data is subject to retransmission. However, if the TB is divided into smaller subsets, the UE will send NACKs for only the failed subsets and the gNB only needs to retransmit the failed subsets instead of the whole TB. This can effectively reduce the overhead of retransmission, and improve spectral efficiency, even though on the other side this will increase the HARQ feedback overhead, since the UE will no longer need to transmit a single bit per TB, but will need to send multiple bits for each TB based on the number of CBGs. In order to reduce this overhead, the CBG-based (re)transmission procedure may be configurable. A UE may be semi-statically configured by RRC signaling to enable CBG-based retransmission, and, as an example, the maximum number of CBGs per TB can be configured by RRC to be {2,4,6,8}. By changing the number of CBGs per TB, the number of code blocks (CBs) per CBG may also change according to the TBS. In Rel. 15 NR, the CBG-based (re)-transmission may be allowed only for the TB of a HARQ process. The CBG-based (re)transmission procedure is also separately configurable for UL and DL.

When operating the NR system on an unlicensed spectrum, before initiating any transmission, it may be the case that a LBT procedure should be performed. In Rel-13 and Rel-14, and potentially in accordance with certain embodiments described herein, the LBT priority classes, LBT parameters, and MCOT values provided in the table illustrated in FIG. 8 for DL and in the table illustrated in FIG. 9 for UL may be used.

In legacy LAA, the contention windows size (CWS) may be adapted based on the HARQ-ACK feedback. This may include, for DL: given a reference subframe set (which may include the first DL subframe of the latest DL data burst for which HARQ-ACK feedback is available), the CWS may be increased if at least 80% of the HARQ-ACK feedback values for the reference subframe are NACK. Otherwise, the CWS may be reset to the minimum value.

For UL, this may include: given a reference subframe (which may include the first subframe with UL-SCH that was transmitted at least 4 ms prior to the UL grant reception in the most recent transmitted burst of contiguous subframes that is transmitted after performing a category 4 LBT procedure) and the HARQ_ID_ref, which is the HARQ ID of the reference subframe, the CWS of all priority classes at the UE is reset for all the priority classes if an UL grant is received and the NDI bit for at least one of the active HARQ processes (i.e., TB not disabled) of HARQ_ID_ref is toggled. Otherwise (i.e., HARQ_ID_ref not scheduled or NDI of the active HARQ process(es) of HARQ_ID_ref not toggled) the contention window size of all priority classes at the UE is increased to the next higher value. Furthermore, the CWS is reset to the minimum value if the maximum CWS is used for K consecutive LBT attempts for transmission only for the priority class for which maximum CWS is used for K consecutive LBT attempts, where K is selected by UE implementation from the set of values from (1, . . . , 8).

While, as previously noted, it may be the case that for NR operating on unlicensed spectrum, the tables of FIG. 8 and FIG. 9 may be used as they are, the CWS adjustment procedure for DL and UL might be instead modified. For example, while in legacy LAA, a TB-based (re)transmission procedure is used, and the CWS adjustment is tailored based on such a procedure, as previously noted, in NR-U, a CBG-based retransmission procedure may be used, which may impact how the CWS adjustment is performed.

Accordingly, embodiments described herein may be directed to multiple options on how to update the CWS when a CBG-based (re)transmission procedure is used.

In Rel. 15 NR, among other enhancements of the PHY layer, the concept of code block groups (CBGs) based transmission was introduced, e.g., to reduce overhead and increase spectral efficiency when data packet with large TBS is transmitted. As previously noted, a TB may be divided into multiple CBGs, and upon decoding the CBGs, a UE may send HARQ-ACK feedback for each individual CBG rather than for the TB, and the gNB may only retransmit the CBGs that were not received or decoded. While this procedure may be efficient for large TBS, this might induce additional overhead for the HARQ-ACK feedbacks, which could overcome the benefit of reducing overhead for the retransmission for small TBSs. For this reason, the CBG-based retransmission procedure may be configurable, potentially including a UE being semi-statically configured by RRC signaling to enable CBG-based retransmission When operating the NR system on an unlicensed spectrum (NR-U), before initiating any transmission the LBT procedure should be performed, and its CWS should be adjusted based on the HARQ-ACK feedback. During the LAA WI, a CWS adjustment procedure was introduced in order to allow fair coexistence with incumbent technologies. For NR-U a similar intention may be maintained when designing the corresponding CWS adjustment procedure. As one possibility, the Rel-14 LBT priority classes, LBT parameters, and MCOT values, summarized in the table of FIG. 8, may be reused as they are for NR-U, but some modifications to cope with the CBG-based retransmission procedure introduced in Rel-15 for NR may be used in conjunction with the LTE LAA Rel-14 CWS adjustment procedure.

In some embodiments, the parameters from the tables of FIGS. 8-9 may be reused. However, in some embodiments, the LBT parameters and MCOT values for FIG. 9 may be modified to those of the table of FIG. 10, e.g., to align NR-U toward Wi-Fi and allow the two technologies to be in par. In particular, note that for the table of FIG. 10, as an example, aCWmax=1023.

In Rel.13, the following was agreed: CWS is increased to the next higher value if at least 80% of the HARQ-ACK feedback values for a reference subframe set are NACK. Otherwise, the CWS is reset to the minimum value. Because in NR, a CBG-based (re)-transmission is introduced, it may be the case that the CWS adjustment procedure defined for LAA can be modified to clarify how the feedbacks for each CBG are counted toward X % of the HARQ-ACK feedbacks, where X is in one example 80.

Figure 11:
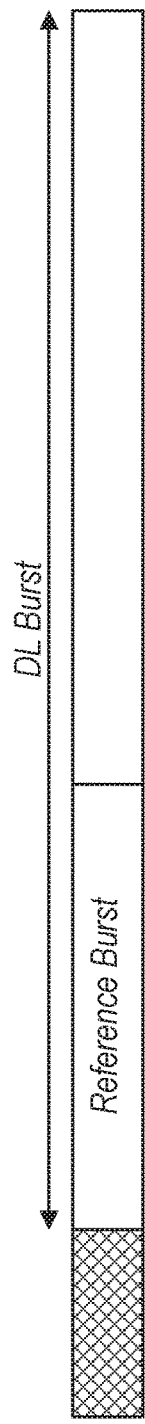
FIGS. 11-12 illustrate possible approaches to identifying a downlink reference burst, according to some embodiments.
Figure 12:
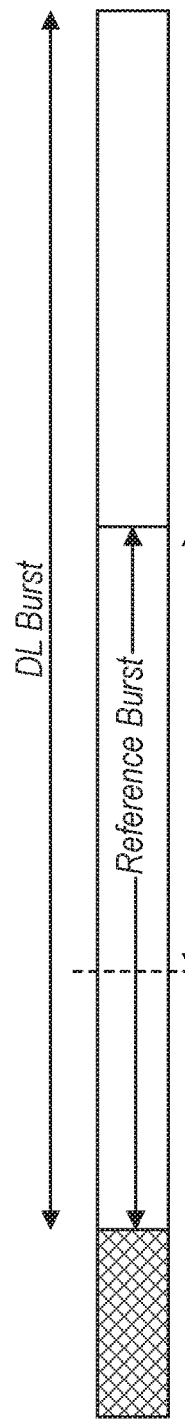
Figure 13:
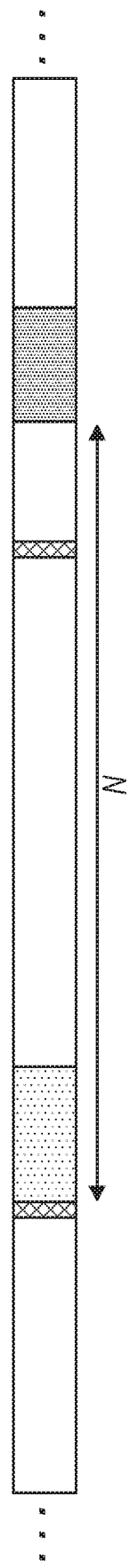
FIG. 13 illustrates possible timing between an uplink reference burst and a control resource set in which uplink grant reception or configured-grant downlink control information reception occurs, according to some embodiments.

Part of such a CWS adjustment procedure may include specifying how to identify a reference burst based upon which the CWS adjustment procedure may be performed. As one possibility, a reference DL burst may be defined for the CWS adjustment as follows: the reference burst is always 1 ms long independently from the subcarrier spacing and starts from the beginning of the DL burst, e.g., as illustrated in FIG. 11. As another possibility, The reference burst may be composed of the partial subframe (SF) or slot from the beginning of the DL burst and the following SF or slot, independently from the subcarrier spacing, e.g., as illustrated in FIG. 12. In case the partial subframe is the only subframe included in the reference DL burst, it may be the case that only the partial subframe is used for the CWS adjustment.

As a still further possibility, the reference burst may be composed of N (e.g., 14) symbols from the start of the DL burst, where N is RRC configured, and N may be larger than the number of symbols in the partial slot. As yet another possibility, the reference burst may be composed of the partial slot only from the beginning of the DL burst. As a yet further possibility, the reference burst may be composed of T ms, or us, starting from the beginning of the DL burst, where T, as one example, may be 1 ms.

In some embodiments, when the CBG-based transmission is configured, the NACKs are counted such that if a NACK is received for at least one of the CBGs for a specific TB, all other CBG feedbacks for that TB within the reference slot set are also counted as NACKs. In another embodiment, when the CBG-based transmission is configured, each feedback is counted individually for each CBG within a TB as either a NACK or an ACK independently of the value of the other CBG feedbacks for that TB.

In one embodiment, the ACK/NACK is counted per TB, which requires a representation of ACK/NACK for each TB with CBG based HARQ ACK feedback. In this case, according to some embodiments, a TB can be counted as NACK, if 1) all the CBGs comprising the TB are NACK'ed, 2) at least one CBG is NACK'ed, or 3) X % of CBGs are NACK'ed.

In some embodiments, when CBG-based transmission is configured, the NACK is counted on a per TB basis, meaning that all the CBGs per TB are bundled into one bit. In this case if the gNB does not schedule all unsuccessful CBGs of a TB, it may be the case that one of two approaches may be selected: either the TB may be considered as a NACK even though all scheduled CBG are correctly received, or the TB may not be counted for CWS adjustment in this case. Alternatively, only the currently scheduled CBGs may be considered to derive a bundled HARQ-ACK for CWS adjustment. In one set of embodiments, a TB can be counted as a NACK, if 1) all the currently scheduled CBGs of the TB are NACK'ed, 2) at least one of the currently scheduled CBG is NACK'ed, or 3) X % of currently scheduled CBGs are NACK'ed.

In some embodiments, since some UEs may be configured with CBG-based transmission while others would perform TB based transmission, the percentage of NACKs Z can be evaluated through one of the following ways:

1. $Z=(c*NACK_{CBG}+t*NACK_{TB})/(c*N_{CBG}+t*N_{TB})$ (1)

2. $Z=(u*NACK_{CBG}+(1-u)*NACK_{TB})/(u*N_{CBG}+(1-u)*N_{TB})$ (2)

where $NACK_{CBG}$ is the number of NACKs per CBG in the reference DL burst, $NACK_{TB}$ is the number of NACKs per TB in the reference DL burst, $N_{CBG}$ is the total number of CBGs feedbacks in the DL reference burst, $N_{TB}$ is the total number of TBs feedbacks in the DL reference burst. In one embodiment, if equ. (1) is used, then "c" and "t" are two variables, where for example $0<=c<=1$ and $0<=t<=1$. Note that the variables "c" and "t" may be defined as a function of maximum number of CBG within a slot for UEs or 8. In another option, these two values may depend on the number of TB and/or CBG transmissions scheduled in the window or DL burst.

In some embodiments, the value of c and/or t are RRC configurable or depends on the configuration. In one embodiment, if equ. (2) is used, "u" is a variable such that $0<=u<=1$. In one embodiment, the value of u is RRC configurable or depends on the configuration.

In some embodiments, the TBs/CBGs/CBs feedbacks for one or more of the following cases are not used for the CWS adjustment:
1. TB/CBG/CB that is punctured by others, e.g., such as may occur in URLLC
2. In the initial partial slot, the TB/CBG/CB punctured due to late channel occupation
3. Due to BWP switch, if the UE does not report HARQ-ACK for certain PDSCH. In this case, the transmission may be considered a NACK as default or it may be ignored for the CWS adjustment.
4. If gNB does not schedule all unsuccessful CBGs of a TB, such a TB may not be counted.

In some embodiments, for self-scheduling, DTX is considered as an indication of collision and as a NACK in the matter of the CWS adjustment mechanism. In some embodiments, for cross-carrier scheduling, DTX may be ignored for the matter of the CWS adjustment mechanism. In some embodiments, for cross-carrier scheduling, DTX may be considered as an indication of collision and as a NACK in the matter of the CWS adjustment for the scheduling cell. In some embodiments, DTX may be considered as an indication of collision and as a NACK in the matter of the CWS adjustment in case that the related PDCCH is transmitted in a DL burst followed by CAT-4 LBT. In some embodiments, DTX is considered as an indication of collision and as a NACK in the matter of the CWS adjustment in case that the related PDCCH is transmitted in the reference burst within a DL burst followed by CAT-4 LBT. In some embodiments, similarly as in legacy LTE LAA, based on how scheduling is performed (e.g. self-scheduling or cross-carrier scheduling), the manner in which the 'DTX' feedback would be interpreted toward the CWS adjustment may be different. In particular, in the case that the PDCCH is transmitted in a separate channel, 'DTX' may be ignored, and when PUCCH is transmitted in the same channel, it may be an indication that there may be a collision, and thus, in this case, 'DTX' should be treated as a NACK.

Another aspect that may be considered is the CWS update for the gNB when the acquired COT is shared with grant-free or scheduled UEs, or when PDSCH transmission is not performed by the gNB. As one possibility, if the gNB performs PDSCH transmissions, and part of the acquired MCOT is configured for UL transmissions with overlapping time-domain resources for scheduled or grant-free transmissions, the CWS update is performed as described herein above. As another possibility, if the gNB does not perform any PDSCH transmissions, and part of the acquired MCOT is configured for UL transmissions with overlapping time-domain resources, it may be the case that if the gNB schedules UL transport blocks (TBs) with 25 us LBT in a shared COT without any PDSCH, the gNB increases the CWS if less than X % of the scheduled UL TBs are not successfully received or if less than X % of the CBGs for the scheduled UL are not successfully received, where X is as an example 10, or in case Q*100 is less than X, where Q is given by one of the following equations:

3. $Q=(c*NACK_{CBG}+t*NACK_{TB})/(c*N_{CBG}+t*N_{TB})$, (3)

4. $Q=(u*NACK_{CBG}+(1-u)*NACK_{TB})/(u*N_{CBG}+(1-u)*N_{TB})$, (4)

where $NACK_{CBG}$ is the number of NACKs per scheduled UL CBG in the reference DL burst, $NACK_{TB}$ is the number of NACKs per UL scheduled TB in the reference DL burst, $N_{CBG}$ is the total number of scheduled UL CBGs feedbacks in the DL reference burst, and $N_{TB}$ is the total number of UL scheduled TBs feedbacks in the DL reference burst. In one set of embodiments, if equ. (3) is used "c" and "t" are two variables. In another option, these two values may depend on the number of TB and/or CBG transmissions scheduled in the shared COT.

In some embodiments, the value of c and/or t are RRC configurable and/or depend on the configuration. In some embodiments, if equ. (4) is used, "u" is a variable such that $0<=u<=1$. In some embodiments, the value of u is RRC configurable and/or depends on the configuration. In some embodiments, if the gNB schedules UL transport blocks (TBs) with 25 us LBT in a shared COT without any PDSCH, and also shares the MCOT with grant-free UEs, the CWS update is performed based on the schedule and/or grant-free TBs or CBGs that have been detected by the gNB.

In some embodiments, for the Cat. 4 LBT for UL transmission, the CWS may be adjusted per UE and at the UE. In some embodiments, a reference UL burst is defined for the CWS adjustment in one of the following ways:
1. The reference burst is always 1 ms long independently from the subcarrier spacing and starts from the beginning of the UL burst.
2. The reference burst is composed of the partial SF from the beginning of the UL burst and the following SF independently from the subcarrier spacing. In case the partial subframe is the only subframe included in the reference UL burst, only the partial subframe is used for CWS adjustment.
3. The reference burst is composed of N symbols from the start of the UL burst, where N is RRC configured, and N may be larger than the number of symbols that compose the initial partial slot.

4. The reference burst is composed of the initial partial slot only.

5. The reference burst is composed of T ms starting from the beginning of the UL burst, where T is for example 1 ms.

In some embodiments, the gNB configures a number of symbols N, so that the reference burst occurs at least in symbol ns-N, where ns is the first or last symbol of the CORESET containing the UL grant or a DFI DCI. In some embodiments, N is evaluated as:

5. $N=Nx+y$, (5)

where Nx is the processing delay based on gNB capability for PUSCH decoding (which depends on the subcarrier spacing), and y is a margin to give gNB freedom for scheduling.

In another set of embodiments, N is evaluated as:

6. $N=Nx+TA+y$, (6)

where Nx is the processing delay based on gNB capability for PUSCH decoding (which depends on the subcarrier spacing), and y is a margin to give gNB freedom for scheduling, and TA is the time advance of the UE.

In some embodiments, similarly as in legacy LTE-LAA, the gNB configures a number of slots N, so that the reference burst occurs before ns-N, where ns is here the slot containing the UL grant or the DFI DCI. An illustration of this concept is provided in FIG. 13.

In some embodiments, N is provided in symbols, slots, subframes, radio frames, or in terms of time (e.g. ms). In some embodiments, the value of N is counted from the beginning or the end of the UL reference burst until the start or the end of the CORESET containing the related UL grant reception or configured grant DCI. In some embodiments, N is the counted from the start of the first uplink symbol of the reference burst, until the last symbol of the PDCCH with the CORESET containing the related UL grant reception or configured grant DCI. In some embodiments, N is the counted from the end of the last slot of the reference burst, until the first or last slot of the PDCCH with the CORESET containing the related UL grant reception or configured grant DCI.

According to some embodiments, HARQ_ID_ref may be defined as the HARQ process ID of the reference burst. In some embodiments, for scheduled UEs if the NDI bit for at least one of the active HARQ processes of HARQ_ID_ref in the reference burst is toggled, the contention window size at the UE is reset for all the priority classes. In some embodiments, if the HARQ_ID_ref is not scheduled or NDI of the active HARQ process(es) of HARQ_ID_ref is not toggled, the contention window size of all priority classes at the UE is increased to the next higher value.

In some embodiments, if CBG-based transmission is configured, the individual bits of the CBG Transmit Information (CBGTI)=1 is considered as failure when the NDI is not toggled (i.e. retransmission) for the same HARQ process, i.e., NACK, otherwise it is considered as successful, i.e., ACK. In some embodiments, the CBGs are bundled to represent the information on TB failure/success in the CWS adjustment mechanism.

In some embodiments, if CBG-based transmission is configured, all CBGs of a TB transmitted in the reference burst are considered in CWS adjustment. In some embodiments, if CBG-based transmission is configured, only the currently transmitted CBGs of a TB transmitted in the reference burst are considered for CWS adjustment.

In some embodiments, when the CBG-based transmission is configured, the NACK are counted such that if a NACK is received for at least one of the CBG for a specific TB, all other CBG feedbacks for that TB within the reference burst set are also counted as NACKs. In another embodiment, when the CBG-based transmission is configured, each feedback is counted individually for each CBG within a TB as either a NACK or an ACK independently of the value of the other CBG feedback for that TB. In some embodiments, the ACK/NACK is counted per TB, which requires a representation of ACK/NACK for each TB with CBG based HARQ ACK feedback. In this case in some embodiments, a TB can be counted as NACK, if 1) all the CBGs comprising the TB are NACK'ed, 2) at least one CBG is NACK'ed, or 3) X % of CBGs are NACK'ed.

In some embodiments, the percentage of NACKs X is evaluated through one of the following equations:

7. $X=(c*NACK_{CBG}+t*NACK_{TB})/(c*N_{CBG}+t*N_{TB})$, (7)

8. $X=(u*NACK_{CBG}+(u-1)*NACK_{TB})/(u*N_{CBG}+(u-1)*N_{TB})$, (8)

where $NACK_{CBG}$ is the number of NACKs per CBG in the reference UL burst, $NACK_{TB}$ is the number of NACKs per TB in the reference UL burst, $N_{CBG}$ is the total number of CBGs feedbacks in the UL reference burst, $N_{TB}$ is the total number of TBs feedbacks in the UL reference burst. In one embodiment, if equ. (7) is used, "c" and "t" are two variables. In another option, these two values may depend on the number of TB and/or CBG transmissions scheduled in the UL burst. In one embodiment, the value of c and/or t are RRC configurable or depends on the configuration. In one embodiment, if equ. (8) is used, "u" is a variable such that $0<=u<=1$. In one embodiment, the value of u is RRC configurable and/or depends on the configuration.

According to some embodiments, if a configured grant (CG)-DFI is received, and if CBG-based configuration is used, the CWS will be reset to its minimum value if all of the currently scheduled CBGs of the TB are ACK'ed. Otherwise, the CWS should be increased. According to some embodiments, if an UL grant is received, and CBG-based transmissions is configured, the UE knows the status of each CBG via the CBG Transmit Information (CBGTI). If the NDI bit is not toggled (i.e. retransmission), it should consider a NACK if any of the CBGTI bits is set to 1.

As in Rel-14, in some embodiments, the CWS is reset to the minimum value if the maximum CWS is used for K consecutive LBT attempts for transmission only for the priority class for which maximum CWS is used for K consecutive LBT attempts, and the value of K is left up to UE's implementation.

For grant-free uplink transmission in NR-U, in some embodiments, if an UL grant or a DFI-DCI is received, the CWS is reset for all the priority classes if a UL grant is received and the NDI bit for at least one of the active HARQ processes associated with HARQ_ID_ref is toggled or a DFI-DCI is received and indicates one of: ACK for all the CBGs for at least one of the active HARQ processes associated with HARQ ref; ACK for one of the CBGs for at least one of the active HARQ processes associated with HARQ_ID_ref; or ACK for Y % of the CBGs for at least one of the active HARQ processes associated with HARQ_ID_ref.

According to some embodiments, the CWS of all priority classes at the UE may be increased to the next higher value if a UL grant is received and the NDI bit(s) of all the active HARQ processe(s) for the reference burst are not toggled, or a UL grant is received and does not schedule any active HARQ process for the reference burst or a DFI-DCI is received that one of: does not indicate ACK for all the CBGs for at least one of the active HARQ processes for the reference burst; does not indicate ACK for X % of all the CBGs for at least one of the active HARQ processes for the reference burst; or does not indicate ACK for X % of the CBGs for at least one of the active HARQ processes associated with HARQ_ID_ref.

As for Rel-14, the CWS may be reset to the minimum value if the maximum CWS is used for K consecutive LBT attempts for transmission only for the priority class for which maximum CWS is used for K consecutive LBT attempts, and the value of K is left up to UE's implementation.

If there exists at least one previous Cat. 4 LBT UL transmission, from the start slot of which, N or more slots have elapsed and neither UL grant nor DFI-DCI is received, where as an example N=max (X, corresponding UL burst length+1) if X>0 and N=0 otherwise, where X is RRC configured. For each previous Cat-4 LBT (SUL/AUL) transmission from the start slot of which, N or more slots have elapsed and neither UL grant nor DFI-DCI is received, CWS for all priority classes at the UE is increased to the next higher value, and each such previous Cat-4 LBT transmission is used to adjust the CWS only once, according to some embodiments.

If the UE starts a new Cat-4 LBT UL transmission before N slots have elapsed from the previous Cat-4 LBT and neither UL grant nor DFI-DCI is received, it may be the case that the CWS is unchanged.

If the UE receives feedback for one or more previous Cat-4 LBT (SUL/AUL) transmission from the start slot of which, N or more slots have elapsed and neither UL grant nor DFI-DCI was received, it may re-compute the CWS as follows: i) it reverts the CWS to the value used to transmit the first burst of such previous Cat-4 LBT transmission(s); ii) it updates the CWS sequentially in order of the transmission of bursts as follows. If the feedback indicates ACKs for all the CBGs for the first slot of the burst, or alternatively ACKs for X % of all CBGs for the first slot of the burst, it may be the case that the CWS is reset, else the CWS may be doubled. If the UE CWS changes while a Cat-4 LBT procedure is ongoing, the UE may draw a new random back-off counter and apply it to the ongoing LBT procedure.

In some embodiments, only the PUSCH for one or more of the following cases are used for the CWS adjustment: only PUSCH whose starting symbol is within the reference burst; only PUSCH within the reference burst; or only the earliest PUSCH within the reference burst.

In some embodiments, the TB/CBGs for one or more of the following are not used for the CWS adjustment: TB/CBG that is punctured by others, e.g., such as might occur for URLLC; or in the initial partial slot, the TB/CBG punctured due to late channel occupation.

Figure 14:
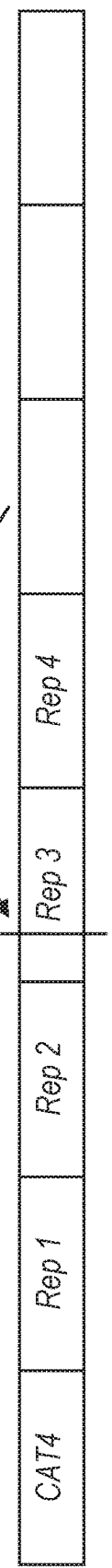
FIG. 14 illustrates aspects of a possible approach to identifying an uplink reference burst, according to some embodiments.

In some embodiments, for multi-slot PUSCH, one of the following options can be enforced to prevent that a partial PUSCH repetition might be used as a reference burst, e.g., as illustrated in FIG. 14.

As one option, it is up to the gNB's implementation to guarantee that after getting a reference timing ns-N, there will always be a PUSCH with a full repetition, which can be used as reference burst.

As another option, if the reference timing ns-N is in the middle of the repetitions of a TB, the UE can skip this TB, and use some even earlier PUSCH transmission as the reference burst.

As another option, a threshold can be configured to decide whether a TB can be used within the reference burst. The threshold can be a number of repetitions. For example, should the reference timing ns-N fall in the middle of the repetitions of a TB, if the number of repetitions received by gNB is higher than threshold, the HARQ-ACK for the TB can still be a good reference for CWS; otherwise, UE can skip this TB, and use some even earlier PUSCH transmission as reference burst.

As another option, a threshold can be used to determine the number of repetitions used by gNB. The threshold can be a maximum coding rate. For example, should the reference timing ns-N fall in the middle of the repetitions of a TB, if coding rate of repetitions received by gNB is lower than the threshold, the current TB can be used within the reference burst. Otherwise, UE can skip this TB, and use some even earlier PUSCH transmission as reference burst.

As another option, regardless of the reference timing ns-N, in this case if at least one of the repetitions follow with the reference burst, all the repetitions will be used for the CWS adjustment.

As another option, assuming there are multiple PUSCHs transmitted in the reference burst, if there is a multi-slot PUSCH in the reference burst, but only part of its repetitions is received by gNB, only other PUSCHs are considered in CWS adjustment.

Example Procedures

Figure 15:
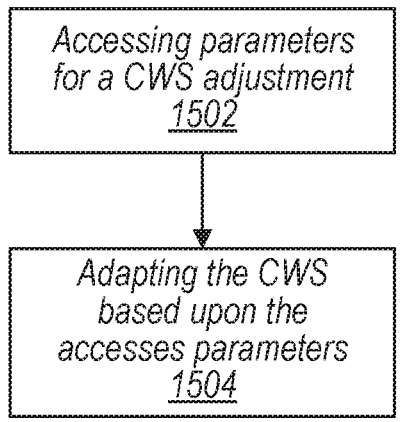
FIGS. 15-17 are flowchart diagrams illustrating example methods relating to performing contention window size adjustment when code block group based retransmission is configured.

In some embodiments, the electronic device(s), network(s), system(s), chip(s) or component(s), or portions or implementations thereof, of FIGS. 18-27, or some other figure herein, may be configured to perform one or more processes, techniques, or methods as described herein, or portions thereof. One such process is depicted in FIG. 15. For example, the process may include, at 1502, accessing parameters for a CWS adjustment. The process may further include, at 1504, adapting the CWS based upon the accessed parameters. In some embodiments, the process may be performed by a UE or a portion thereof that may be interacting with a gNB and communicating at least in part over NR-U.

Figure 16:
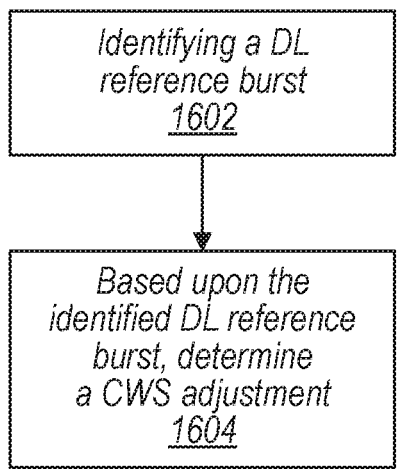

In some embodiments, the electronic device(s), network(s), system(s), chip(s) or component(s), or portions or implementations thereof, of FIGS. 18-27, or some other figure herein, may be configured to perform one or more processes, techniques, or methods as described herein, or portions thereof. One such process is depicted in FIG. 16. For example, the process may include, at 1602, identifying a DL reference burst. The process may further include, at 1604, based upon the identified DL reference burst, determine a CWS adjustment. In embodiments, the process may be performed by a UE or a portion thereof that may be interacting with a gNB and communicating at least in part over NR-U.

Figure 17:
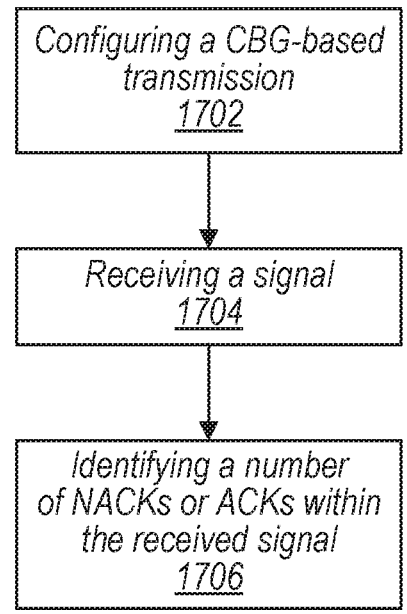

In some embodiments, the electronic device(s), network(s), system(s), chip(s) or component(s), or portions or implementations thereof, of FIGS. 18-27, or some other figure herein, may be configured to perform one or more processes, techniques, or methods as described herein, or portions thereof. One such process is depicted in FIG. 17. For example, the process may include, at 1702, configuring a CBG-based transmission. The process may further include, at 1704, receiving a signal. The process may further include, at 1706, identifying a number of NACKs or ACKs within the received signal. In embodiments, the process may be performed by a UE or a portion thereof that may be interacting with a gNB and communicating at least in part over NR-U.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

A first example may include a method comprising: accessing parameters for a CWS adjustment; and adapting the CWS based upon the accessed parameters.

A second example may include the subject matter of the first example, or of any other example herein, wherein accessing parameters for a CWS adjustment further includes receiving CWS parameters from RRC signaling.

A third example may include the subject matter of the first example, or of any other example herein, wherein the parameters include one or more of LBT priority class, MCOT, and one or more set of CWS.

A fourth example may include the subject matter of the first example, or of any other example herein, wherein adapting the CWS based upon the accessed parameters is to align NR-U and Wi-Fi to be in par.

A fifth example may include a method comprising: identifying a DL reference burst; based upon the identified DL reference burst, determine a CWS adjustment.

A sixth example may include the subject matter of the fifth example, or of any other example herein, wherein the reference burst is 1 ms long and independent from subcarrier spacing.

A seventh example may include the subject matter of the sixth example, or of any other example herein, wherein the reference burst begins at a beginning of the DL burst.

An eighth example may include the subject matter of the sixth example, or of any other example herein, wherein the reference burst includes a partial subframe from the beginning of the DL burst.

A ninth example may include the subject matter of the eighth example, or of any other example herein, wherein the subframe follows independently from subcarrier spacing.

A tenth example may include the subject matter of the eighth example, or of any other example herein, further comprising, upon the partial subframe being a only subframe in the reference DL burst, then only the partial subframe is used for CWS adjustment.

An eleventh example may include the subject matter of the eighth example, or of any other example herein, wherein the reference burst includes N symbols from a start of the DL burst.

A twelfth example may include the subject matter of the eleventh example, or of any other example herein, wherein N is RRC configured, or N is larger than a number of symbols in a partial slot.

A thirteenth example may include the subject matter of the eighth example, or of any other example herein, wherein the reference burst includes only a partial slot.

A fourteenth example may include the subject matter of the eighth example, or of any other example herein, wherein the reference burst includes T milliseconds or microseconds starting from a beginning of the DL burst.

A fifteenth example may include a method comprising: configuring a CBG-based transmission; receiving a signal; and identifying a number of NACKs or ACKs within the received signal.

A sixteenth example may include the subject matter of the fifteenth example, or of any other example herein, wherein if a NACK is received for at least one of a CBG for a TB, all CBG feedbacks for the TB within a reference lot set are identified as a NACK.

A seventeenth example may include the subject matter of the fifteenth example, or of any other example herein, wherein the number of NACKs or the number of ACKS are counted for each CBG within a TB independent of the value of other CBG feedback for the TB.

An eighteenth example may include the subject matter of the fifteenth example, or of any other example herein, wherein the number of NACKs or ACKs are identified per TB with CBG based HARQ ACK feedback.

A nineteenth example 19 may include the method of the fifteenth example, or of any other example herein, wherein a TB is identified as a NACK upon (1) all CBGs in the TB are NACK'ed, (2) at least one CBG is NACK'ed, or (3) a determined percentage of CBGs are NACK'ed.

A twentieth example may include the method of the fifteenth example, or of any other example herein, wherein the number of NACKs are identified on a per TB basis, and wherein the TB is considered a NACK even if all scheduled CBGs are correctly received, or wherein the TB is not counted for CWS adjustment.

A twenty-first example may include a method that includes a CWS update mechanism for NR-U and also configuration of CBG-based transmissions.

A twenty-second example may include the method of the twenty-first example or some other example herein, wherein the parameters from FIG. 8 and FIG. 9 are reused.

A twenty-third example may include the method of the twenty-first example or some other example herein, wherein the LBT parameters and MCOT values for FIG. 9 are as in FIG. 10 to align NR-U toward Wi-Fi and allow the two technologies to be in par.

A twenty-fourth example may include the method of the twenty-first example or some other example herein, wherein for the DL CWS adjustment, a reference DL burst is defined for the CWS adjustment as one of the following options: A. the reference burst is always 1 ms long independently from the subcarrier spacing and starts from the beginning of the DL burst; B. the reference burst is composed of the partial subframe (SF) from the beginning of the DL burst+following SF independently from the subcarrier spacing. In case the partial subframe is the only subframe included in the reference DL burst, only the partial subframe is used for CWS adjustment; C. the reference burst is composed of N symbols (e.g. 14) from the start of the DL burst, where N is RRC configured, and N may be larger than the number of symbols in the partial slot; D. the reference burst is composed of the partial slot only; E. the reference burst is composed of T ms, or us, starting from the beginning of the DL burst, where T, for example, is 1 ms.

A twenty-fifth example may include the method of the twenty-first example or some other example herein, wherein when the CBG-based transmission is configured, the NACKs are counted such that if a NACK is received for at least one of the CBG for a specific TB, all other CBG feedbacks for that TB within the reference slot set are also counted as NACK.

A twenty-sixth example may include the method of the twenty-first example or some other example herein, when the CBG-based transmission is configured, each feedback is counted individually for each CBG within a TB as either a NACK or an ACK independently of the value of the other CBG feedback for that TB.

A twenty-seventh example may include the method of the twenty-first example or some other example herein, wherein the ACK/NACK is counted per TB, which requires a representation of ACK/NACK for each TB with CBG based HARQ ACK feedback.

A twenty-eighth example may include the method of the twenty-first or twenty-seventh example, or some other example herein, wherein a TB can be counted as NACK, if 1) all the CBGs comprising the TB are NACK'ed, 2) at least one CBG is NACK'ed, or 3) X % of CBGs are NACK'ed.

A twenty-ninth example may include the method of the twenty-first example or some other example herein, when CBG-based transmission is configured, the NACK is counted on a per TB basis, meaning that all the CBGs per TB are bundled into one bit; if the gNB does not schedule all unsuccessful CBG of a TB, there are two choices: either the TB is be considered as a NACK even though all scheduled CBG are correctly received, or the TB is not counted for CWS adjustment in this case.

A thirtieth example may include the method of the twenty-first example or some other example herein, wherein only the currently scheduled CBGs are considered to derive bundled HARQ-ACK for CWS adjustment.

A thirty-first example may include the method of the twenty-first example or some other example herein, wherein a TB can be counted as NACK, if 1) all the currently scheduled CBGs of the TB are NACK'ed, 2) at least one of the currently scheduled CBG is NACK'ed, or 3) X % of currently scheduled CBGs are NACK'ed.

A thirty-second example may include the method of the twenty-first example or some other example herein, wherein since some UEs may be configured with CBG-based transmission while others would perform TB based transmission, the percentage of NACKs Z is evaluated through one of the following ways:

$$Z=(c*NACKCBG+t*NACKTB)/(c*NCBG+t*NTB) \quad (1) \text{ Or}$$

$$Z=(u*NACKCBG+(1-u)*NACKTB)/(u*NCBG+(1-u)*NTB) \quad (2)$$

A thirty-third example may include a method of some example herein, comprising the TBs/CBGs/CBs feedbacks for one or more of the following cases are not used for the CWS adjustment:
  a. TB/CBG/CB that is punctured by others e.g. URLLC;
  b. In the initial partial slot, the TB/CBG/CB punctured due to late channel occupation;
  c. Due to BWP switch, UE does not report HARQ-ACK for certain PDSCH—in this case, the transmission is considered a NACK as default or it is ignored for the CWS adjustment;
  d. If gNB does not schedule all unsuccessful CBG of a TB, such TB is not counted.

A thirty-fourth example may include the method of the twenty-first example or some other example herein, wherein for self-scheduling DTX is considered as an indication of collision and as a NACK in the matter of the CWS adjustment mechanism.

A thirty-fifth example may include the method of the twenty-first example or some other example herein, wherein for cross-carrier scheduling, DTX is ignored for the matter of the CWS adjustment mechanism.

A thirty-sixth example may include the method of the twenty-first example or some other example herein, wherein the CWS update for the gNB when the acquired COT is shared with grant-free or scheduled UEs, or when PDSCH transmission is not performed by the gNB includes:
  a. If the gNB performs PDSCH transmissions, and part of the acquired MCOT is configured for UL transmissions with overlapping time-domain resources for scheduled or grant-free transmissions, in one embodiment, the CWS update is performed as described above;
  b. If the gNB does not perform any PDSCH transmissions, and part of the acquired MCOT is configured for UL transmissions with overlapping time-domain resources:
  if eNB schedules UL transport blocks (TBs) with 25 us LBT in a shared COT without any PDSCH, the gNB increases the CWS if less than X % of the scheduled UL TBs are not successfully received or if less than X % of the CBGs for the scheduled UL are not successfully received, where X is as an example 10, or in case Q*100 is less than X, where Q is given by one of the following equations:

i. $Q=(c*NACKCBG+t*NACKTB)/(c*NCBG+t*NTB)$, \quad (3)

ii. $Q=(u*NACKCBG+(1-u)*NACKTB)/(u*NCBG+(1-u)*NTB)$, \quad (4)

if gNB schedules UL transport blocks (TBs) with 25 us LBT in a shared COT without any PDSCH, and also shares the MCOT with grant-free UEs, the CWS update is performed based on the schedule and/or grant-free TBs or CBGs that have been detected by the gNB.

A thirty-seventh example may include the method of the twenty-first example or some other example herein, wherein for the Cat. 4 LBT for UL transmission, the CWS is adjusted per UE and at UE.

A thirty-eighth example may include the method of the twenty-first example or some other example herein, wherein a reference UL burst is defined for the CWS adjustment according to one of the following options:
  i. the reference burst is always 1 ms long independently from the subcarrier spacing and starts from the beginning of the UL burst;
  ii. the reference burst is composed by the partial SF from the beginning of the UL burst+following SF independently from the subcarrier spacing. In case the partial subframe is the only subframe included in the reference UL burst, only the partial subframe is used for CWS adjustment;
  iii. the reference burst is composed by N symbols from the start of the UL burst, where N is RRC configured, and N may be larger than the number of symbols that compose the initial partial slot;
  iv. the reference burst is composed by the initial partial slot only;
  v. the reference burst is composed by T ms starting from the beginning of the UL burst, where T is for example 1 ms.

A thirty-ninth example may include the method of the twenty-first example or some other example herein, wherein the gNB configures a number of symbol N, so that the reference burst occurs at least in symbol ns-N, where ns is the first or last symbol of the CORESET containing the UL grant or a DFI DCI.

A fortieth example may include the method of the twenty-first or thirty-ninth example, or some other example herein, wherein N is evaluated as $$N=Nx+y, \quad (5), \text{ or}$$

$$N=Nx+TA+y, \quad (6)$$

A forty-first example may include the method of the twenty-first or thirty-ninth example or some other example herein, wherein the gNB configures a number of slot N, so that the reference burst occurs before ns-N, where ns is here the slot containing the UL grant or the DFI DCI.

A forty-second example may include the method of the twenty-first example or some other example herein, wherein define the HARQ_ID_ref as the HARQ process ID of the reference burst.

A forty-third example may include the method of the twenty-first example or some other example herein, wherein for scheduled UEs if the NDI bit for at least one of the active HARQ processes of HARQ_ID_ref in the reference burst is toggled, the contention window size at the UE is reset for all the priority classes.

A forty-fourth example may include the method of the twenty-first example or some other example herein, wherein if the HARQ_ID_ref is not scheduled or NDI of the active HARQ process(es) of HARQ_ID_ref is not toggled, the contention window size of all priority classes at the UE is increased to the next higher value.

A forty-fifth example may include the method of the twenty-first example or some other example herein, wherein if CBG-based transmission is configured, CBGTI=1 is considered as failure, i.e. NACK.

A forty-sixth example may include the method of the twenty-first example or some other example herein, wherein the CBGs are bundled to represent the information on TB failure/success in the CWS adjustment mechanism.

A forty-seventh example may include the method of the twenty-first example or some other example herein, wherein if CBG-based transmission is configured, all CBGs of a TB transmitted in the reference burst is considered in CWS adjustment.

A forty-eighth example 48 may include the method of the twenty-first example or some other example herein, wherein if CBG-based transmission is configured, only the currently transmitted CBGs of a TB transmitted in the reference burst is considered for CWS adjustment.

A forty-ninth example may include the method of the twenty-first example or some other example herein, when the CBG-base transmission is configured, the NACK are counted such that if a NACK is received for at least one of the CBG for a specific TB, all other CBG feedbacks for that TB within the reference burst set are also counted as NACK.

A fiftieth example may include the method of the twenty-first example or some other example herein, when the CBG-based transmission is configured, each feedback is counted individually for each CBG within a TB as either a NACK or an ACK independently of the value of the other CBG feedback for that TB.

A fifty-first example may include the method of the twenty-first example or some other example herein, wherein the ACK/NACK is counted per TB, which requires a representation of ACK/NACK for each TB with CBG based HARQ ACK feedback. In this case in one embodiment, a TB can be counted as NACK, if 1) all the CBGs comprising the TB are NACK'ed, 2) at least one CBG is NACK'ed, or 3) X % of CBGs are NACK'ed.

A fifty-second example may include the method of the twenty-first example or some other example herein, wherein the percentage of NACKs X is evaluated through one of the following equations:

$$X=(c*NACKCBG+t*NACKTB)/(c*NCBG+t*NTB);$$
or $$X=(u*NACKCBG+(u-1)*NACKTB)/(u*NCBG+(u-1)*NTB)$$

A fifty-third example may include the method of the twenty-first example, wherein the CWS is reset to the minimum value if the maximum CWS is used for K consecutive LBT attempts for transmission only for the priority class for which maximum CWS is used for K consecutive LBT attempts, and the value of K is left up to UE's implementation.

A fifty-fourth example may include the method of the twenty-first example or some other example herein, wherein for grant-free uplink transmission in NR-U, if an UL grant or a DFI-DCI is received, the CWS is reset for all the priority classes if a UL grant is received and the NDI bit for at least one of the active HARQ processes associated with HARQ_ID_ref is toggled or an DFI-DCI is received and indicates:
  ACK for all the CBGs for at least one of the active HARQ processes associated with HARQ_ID_ref;
  ACK for one of the CBGs for at least one of the active HARQ processes associated with HARQ_ID_ref;
  ACK for Y % of the CBGs for at least one of the active HARQ processes associated with HARQ_ID_ref; and/or
  The CWS of all priority classes at the UE is increased to the next higher value if a UL grant is received and the NDI bit(s) of all the active HARQ processe(s) for the reference burst are not toggled, or a UL grant is received and does not schedule any active HARQ process for the reference burst or a DFI-DCI is received which:
    does not indicate ACK for all the CBGs for at least one of the active HARQ processes for the reference burst;
    does not indicate ACK for X % of all the CBGs for at least one of the active HARQ processes for the reference burst;
    does not indicate ACK for X % of the CBGs for at least one of the active HARQ processes associated with HARQ_ID_ref; and/or
  the CWS is reset to the minimum value if the maximum CWS is used for K consecutive LBT attempts for transmission only for the priority class for which maximum CWS is used for K consecutive LBT attempts, and the value of K is left up to UE's implementation; and/or
  if there exist at least one previous Cat. 4 LBT UL transmission, from the start slot of which, N or more slots have elapsed and neither UL grant nor DFI-DCI is received, where as an example N=max (X, corresponding UL burst length+1)
  if X>0 and N=0 otherwise, where X is RRC configured. For each previous Cat-4 LBT (SUL/AUL) transmission from the start slot of which, N or more slots have elapsed and neither UL grant nor DFI-DCI is received CWS for all priority classes at the UE is increased to the next higher value, and each such previous Cat-4 LBT transmission is used to adjust the CWS only once; and/or if the UE starts a new Cat-4 LBT UL transmission before N slots have elapsed from the previous Cat-4 LBT and neither UL grant nor DFI-DCI is received, the CWS is unchanged; and/or if the UE receives feedback for one or more previous Cat-4 LBT (SUL/AUL) transmission from the start slot of which, N or more slots have elapsed and neither UL grant nor DFI-DCI was received, it may re-compute the CWS as follows: i) it reverts the CWS to the value used to transmit the first burst of such previous Cat-4 LBT transmission(s); ii) it updates the CWS sequentially in order of the transmission of bursts as follows; and/or if the feedback indicates ACK for all the CBGs for the first slot of the burst, or ACK for X % of all CBGs for the first slot of the burst, CWS is reset else the CWS is doubled. If the UE CWS changes while a Cat-4 LBT procedure is ongoing, the UE draws a new random back-off counter and applies it to the ongoing LBT procedure.

A fifty-fifth example may include the method of the twenty-first example or some other example herein, wherein only the PUSCH for one or more of the following cases are used for the CWS adjustment:

a. Only PUSCH whose starting symbol is within the reference burst;
b. Only PUSCH within the reference burst;
c. Only the earliest PUSCH within the reference burst.

A fifty-sixth example may include the method of the twenty-first example or some other example herein, wherein the TB/CBGs for one or more of the following are not used for the CWS adjustment:

TB/CBG that is punctured by others e.g. URLLC, or
In the initial partial slot, the TB/CBG punctured due to late channel occupation.

A fifty-seventh example may include the method of the twenty-first example or some other example herein, wherein for multi-slot PUSCH, one of the following options can be enforced to prevent that a partial PUSCH repetition might be used as a reference burst:

It is gNB's implementation to guarantee that after getting a reference timing ns-N, there will always be a PUSCH with a full repetitions, which can be used as reference burst;

If the reference timing ns-N is in the middle of the repetitions of a TB, UE can skip this TB, and use some even earlier PUSCH transmission as reference burst;

A threshold can be configured to decide whether a TB can be used within the reference burst-the threshold can be a number of repetitions-let the reference timing ns-N is in the middle of the repetitions of a TB, if the number of repetitions received by gNB is higher than threshold, the HARQ-ACK for the TB can still be a good reference for CWS; otherwise, UE can skip this TB, and use some even earlier PUSCH transmission as reference burst;

A threshold can be used to determine the number of repetitions used by gNB-the threshold can be a maximum coding rate-let the reference timing ns-N is in the middle of the repetitions of a TB, if coding rate of repetitions received by gNB is lower than the threshold, the current TB can be used within the reference burst-otherwise, UE can skip this TB, and use some even earlier PUSCH transmission as reference burst;

Regardless on the reference timing ns-N, in this case if at least one of the repetitions follow with the reference burst, all the repetitions will be used for the CWS adjustment;

Assuming there are multiple PUSCH transmitted in the reference burst, if there is a multi-slot PUSCH in the reference burst, however only part of its repetitions is received by gNB, only other PUSCHs is considered in CWS adjustment.

A fifty-eighth example may include a method of operating a gNB to configure a UE with a number, N, wherein a UL reference burst is to occur before ns-N, where ns is a slot that includes a UL grant or DFI DCI, and further wherein:

N is provided in symbols, slots, subframes, radio frames, or time;

N is counted from a beginning or end of the UL reference burst until a start or end of a CORESET that includes the UL grant or DFI DCI;

N is counted from a start of a first uplink symbol of the UL reference burst, until a last symbol of the PDCCH with the CORESET that includes the UL grant or DFI DCI; or N is counted from an end of a last slot of the UL reference burst, until a first or last slot of the PDCCH with the CORESET that includes the UL grant or DFI DCI.

A fifty-ninth example may include an apparatus comprising means to perform one or more elements of a method described in or related to any of the first through fifty-eighth examples, or any other method or process described herein.

A sixtieth example may include one or more non-transitory computer-readable media comprising instructions to cause an electronic device, upon execution of the instructions by one or more processors of the electronic device, to perform one or more elements of a method described in or related to any of the first through fifty-eighth examples, or any other method or process described herein.

A sixty-first example may include an apparatus comprising logic, modules, or circuitry to perform one or more elements of a method described in or related to any of the first through fifty-eighth examples, or any other method or process described herein.

A sixty-second example may include a method, technique, or process as described in or related to any of the first through fifty-eighth examples, or portions or parts thereof.

A sixty-third example may include an apparatus comprising: one or more processors and one or more computer-readable media comprising instructions that, when executed by the one or more processors, cause the one or more processors to perform the method, techniques, or process as described in or related to any of the first through fifty-eighth examples, or portions thereof.

A sixty-fourth example may include a signal as described in or related to any of the first through fifty-eighth examples, or portions or parts thereof.

A sixty-fifth example may include a signal in a wireless network as shown and described herein.

A sixty-sixth example may include a method of communicating in a wireless network as shown and described herein.

A sixty-seventh example may include a system for providing wireless communication as shown and described herein.

A sixty-eighth example 67 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed.

Modifications and variations are possible in light of the above teachings or may be acquired from practice of various embodiments.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Systems and Implementations

Figure 18:
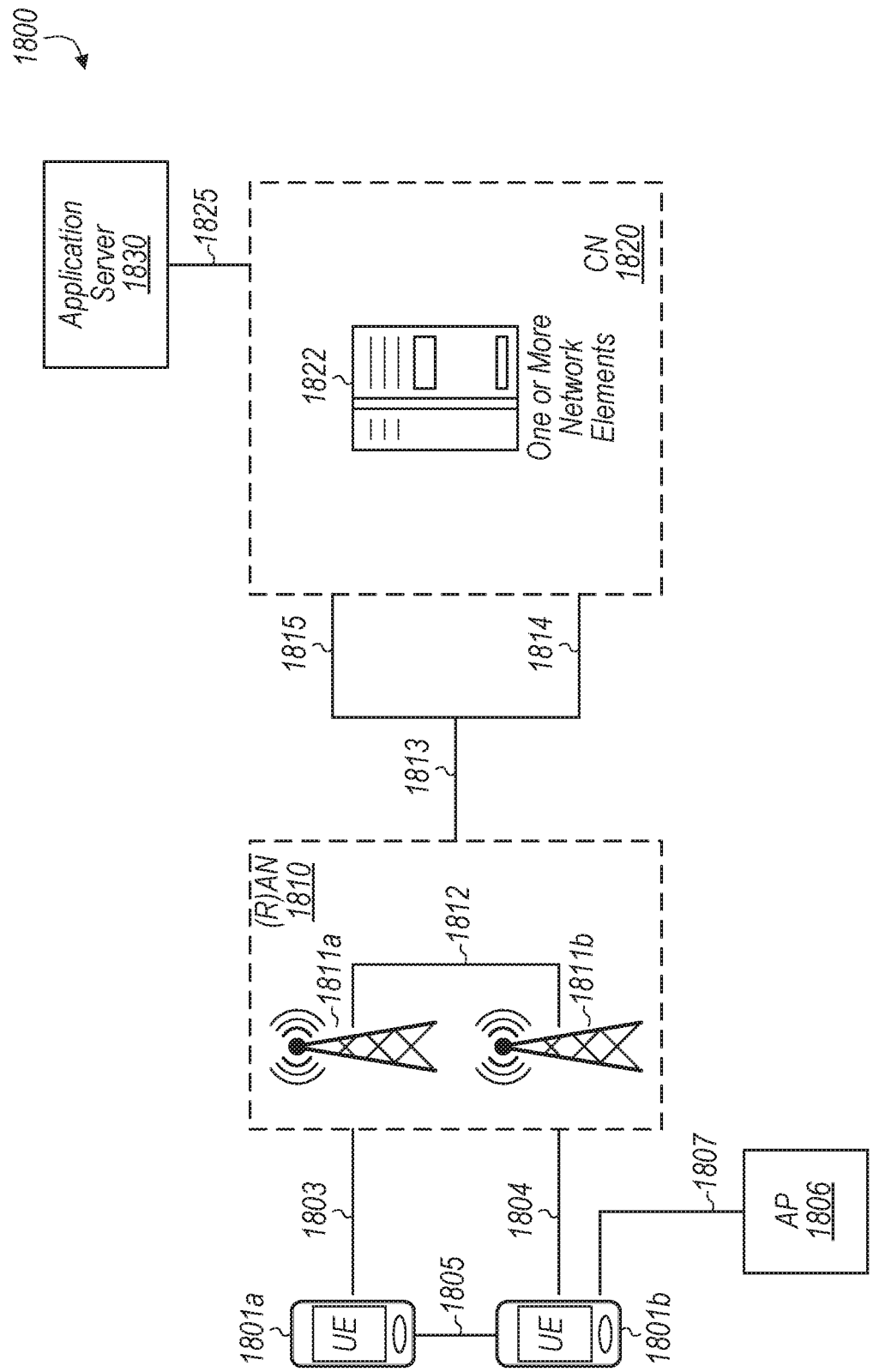
FIG. 18 illustrates an example architecture of a wireless communication system, according to some embodiments.

FIG. 18 illustrates an example architecture of a system 1800 of a network, in accordance with various embodiments. The following description is provided for an example system 1800 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 18, the system 1800 includes UE 1801a and UE 1801b (collectively referred to as "UEs 1801" or "UE 1801"). In this example, UEs 1801 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 1801 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1801 may be configured to connect, for example, communicatively couple, with a RAN 1810. In embodiments, the RAN 1810 may be an NG RAN or a 5G RAN, an E-UTRAN, or a legacy RAN, such as a UTRAN or GERAN. As used herein, the term "NG RAN" or the like may refer to a RAN 1810 that operates in an NR or 5G system 1800, and the term "E-UTRAN" or the like may refer to a RAN 1810 that operates in an LTE or 4G system 1800. The UEs 1801 utilize connections (or channels) 1803 and 1804, respectively, each of which comprises a physical communications interface or layer (discussed in further detail below).

In this example, the connections 1803 and 1804 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 1801 may directly exchange communication data via a ProSe interface 1805. The ProSe interface 1805 may alternatively be referred to as a SL interface 1805 and may comprise one or more logical channels, including but not limited to a PSCCH, a PSSCH, a PSDCH, and a PSBCH.

The UE 1801b is shown to be configured to access an AP 1806 (also referred to as "WLAN node 1806," "WLAN 1806," "WLAN Termination 1806," "WT 1806" or the like) via connection 1807. The connection 1807 can comprise a local wireless connection, such as a connection consistent with any IEEE 802.11 protocol, wherein the AP 1806 would comprise a wireless fidelity (Wi-Fi®) router. In this example, the AP 1806 is shown to be connected to the Internet without connecting to the core network of the wireless system (described in further detail below). In various embodiments, the UE 1801b, RAN 1810, and AP 1806 may be configured to utilize LWA operation and/or LWIP operation. The LWA operation may involve the UE 1801b in RRC_CONNECTED being configured by a RAN node 1811a-b to utilize radio resources of LTE and WLAN. LWIP operation may involve the UE 1801b using WLAN radio resources (e.g., connection 1807) via IPsec protocol tunneling to authenticate and encrypt packets (e.g., IP packets) sent over the connection 1807. IPsec tunneling may include encapsulating the entirety of original IP packets and adding a new packet header, thereby protecting the original header of the IP packets.

The RAN 1810 can include one or more AN nodes or RAN nodes 1811a and 1811b (collectively referred to as "RAN nodes 1811" or "RAN node 1811") that enable the connections 1803 and 1804. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 1811 that operates in an NR or 5G system 1800 (for example, a gNB), and the term "E-UTRAN node" or the like may refer to a RAN node 1811 that operates in an LTE or 4G system 1800 (e.g., an eNB). According to various embodiments, the RAN nodes 1811 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 1811 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 1811; a MAC/PHY split wherein RRC, PDCP, RLC, and MAC layers are operated by the CRAN/vBBUP and the PHY layer is operated by individual RAN nodes 1811; or a "lower PHY" split wherein RRC, PDCP, RLC, MAC layers and upper portions of the PHY layer are operated by the CRAN/vBBUP and lower portions of the PHY layer are operated by individual RAN nodes 1811. This virtualized framework allows the freed-up processor cores of the RAN nodes 1811 to perform other virtualized applications. In some implementations, an individual RAN node 1811 may represent individual gNB-DUs that are connected to a gNB-CU via individual F1 interfaces (not shown by FIG. 18). In these implementations, the gNB-DUs may include one or more remote radio heads or RFEMs (see, e.g., FIG. 21), and the gNB-CU may be operated by a server that is located in the RAN 1810 (not shown) or by a server pool in a similar manner as the CRAN/vBBUP. Additionally or alternatively, one or more of the RAN nodes 1811 may be next generation eNBs (ng-eNBs), which are RAN nodes that provide E-UTRA user plane and control plane protocol terminations toward the UEs 1801, and are connected to a 5GC (e.g., CN 2020 of FIG. 20) via an NG interface (discussed infra).

In V2X scenarios one or more of the RAN nodes 1811 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 1801 (vUEs 1801). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 1811 can terminate the air interface protocol and can be the first point of contact for the UEs 1801. In some embodiments, any of the RAN nodes 1811 can fulfill various logical functions for the RAN 1810 including, but not limited to, radio network controller (RNC) functions such as radio bearer management, uplink and downlink dynamic radio resource management and data packet scheduling, and mobility management.

In embodiments, the UEs 1801 can be configured to communicate using OFDM communication signals with each other or with any of the RAN nodes 1811 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal sub carriers.

In some embodiments, a downlink resource grid can be used for downlink transmissions from any of the RAN nodes 1811 to the UEs 1801, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 1801 and the RAN nodes 1811 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 1801 and the RAN nodes 1811 may operate using LAA, eLAA, and/or feLAA mechanisms. In these implementations, the UEs 1801 and the RAN nodes 1811 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 1801 RAN nodes 1811, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 1801, AP 1806, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 1801 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 1801. The PDCCH carries information about the transport format and resource allocations related to the PDSCH channel, among other things. It may also inform the UEs 1801 about the transport format, resource allocation, and HARQ information related to the uplink shared channel. Typically, downlink scheduling (assigning control and shared channel resource blocks to the UE 1801b within a cell) may be performed at any of the RAN nodes 1811 based on channel quality information fed back from any of the UEs 1801. The downlink resource assignment information may be sent on the PDCCH used for (e.g., assigned to) each of the UEs 1801.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as EREGs. An ECCE may have other numbers of EREGs in some situations.

The RAN nodes 1811 may be configured to communicate with one another via interface 1812. In embodiments where the system 1800 is an LTE system (e.g., when CN 1820 is an EPC 1920 as in FIG. 19), the interface 1812 may be an X2 interface 1812. The X2 interface may be defined between two or more RAN nodes 1811 (e.g., two or more eNBs and the like) that connect to EPC 1820, and/or between two eNBs connecting to EPC 1820. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 1801 from an SeNB for user data; information of PDCP PDUs that were not delivered to a UE 1801; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 1800 is a 5G or NR system (e.g., when CN 1820 is a 5GC 2020 as in FIG. 20), the interface 1812 may be an Xn interface 1812. The Xn interface is defined between two or more RAN nodes 1811 (e.g., two or more gNBs and the like) that connect to 5GC 1820, between a RAN node 1811 (e.g., a gNB) connecting to 5GC 1820 and an eNB, and/or between two eNBs connecting to 5GC 1820. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 1801 in a connected mode (e.g., CM-CONNECTED) including functionality to manage the UE mobility for connected mode between one or more RAN nodes 1811. The mobility support may include context transfer from an old (source) serving RAN node 1811 to new (target) serving RAN node 1811; and control of user plane tunnels between old (source) serving RAN node 1811 to new (target) serving RAN node 1811. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 1810 is shown to be communicatively coupled to a core network—in this embodiment, core network (CN) 1820. The CN 1820 may comprise a plurality of network elements 1822, which are configured to offer various data and telecommunications services to customers/subscribers (e.g., users of UEs 1801) who are connected to the CN 1820 via the RAN 1810. The components of the CN 1820 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 1820 may be referred to as a network slice, and a logical instantiation of a portion of the CN 1820 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 1830 may be an element offering applications that use IP bearer resources with the core network (e.g., UMTS PS domain, LTE PS data services, etc.). The application server 1830 can also be configured to support one or more communication services (e.g., VoIP sessions, PTT sessions, group communication sessions, social networking services, etc.) for the UEs 1801 via the EPC 1820.

In embodiments, the CN 1820 may be a 5GC (referred to as "5GC 1820" or the like), and the RAN 1810 may be connected with the CN 1820 via an NG interface 1813. In embodiments, the NG interface 1813 may be split into two parts, an NG user plane (NG-U) interface 1814, which carries traffic data between the RAN nodes 1811 and a UPF, and the S1 control plane (NG-C) interface 1815, which is a signaling interface between the RAN nodes 1811 and AMFs. Embodiments where the CN 1820 is a 5GC 1820 are discussed in more detail with regard to FIG. 20.

In embodiments, the CN 1820 may be a 5G CN (referred to as "5GC 1820" or the like), while in other embodiments, the CN 1820 may be an EPC). Where CN 1820 is an EPC (referred to as "EPC 1820" or the like), the RAN 1810 may be connected with the CN 1820 via an S1 interface 1813. In embodiments, the S1 interface 1813 may be split into two parts, an S1 user plane (S1-U) interface 1814, which carries traffic data between the RAN nodes 1811 and the S-GW, and the S1-MME interface 1815, which is a signaling interface between the RAN nodes 1811 and MMEs.

Figure 19:
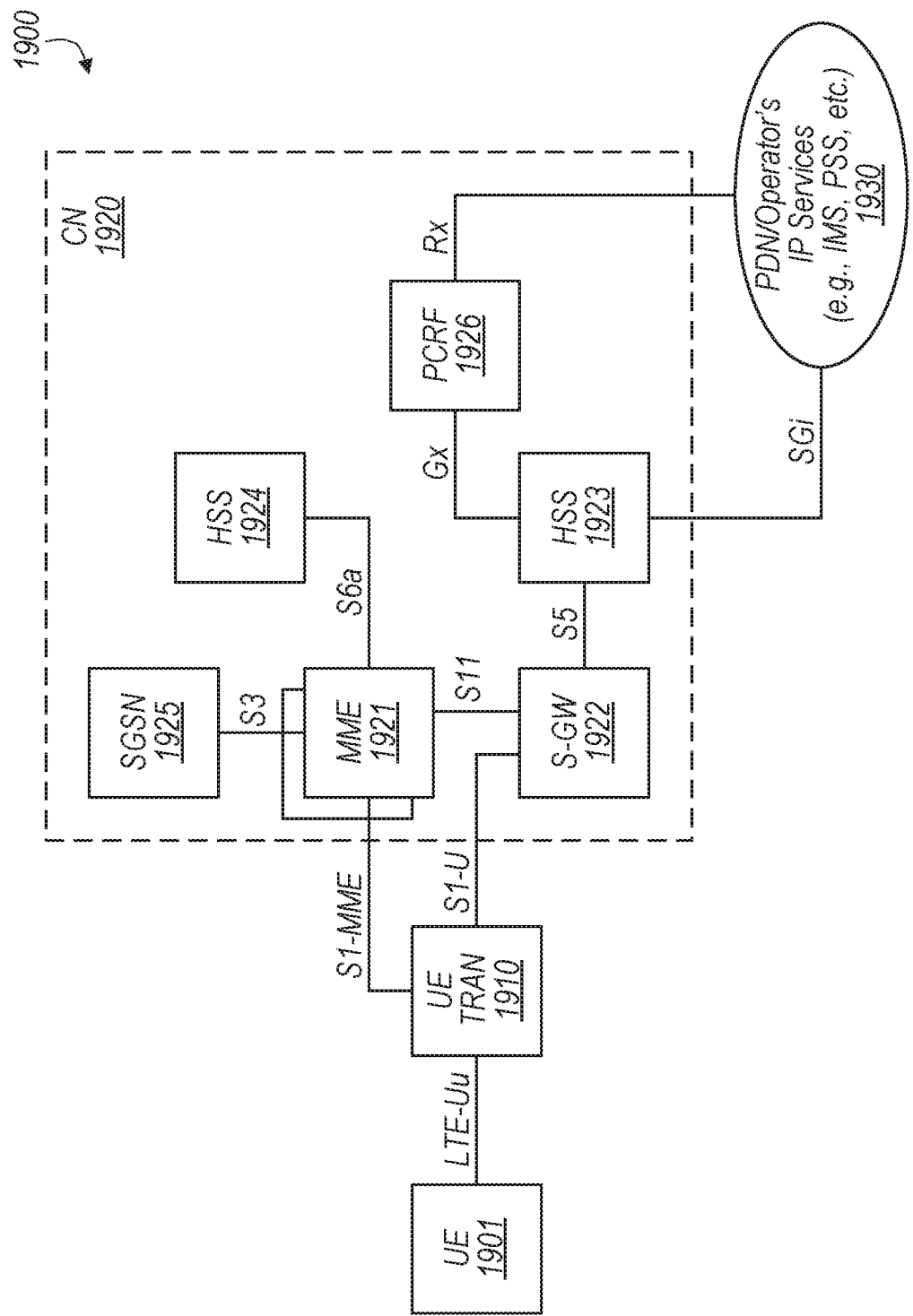
FIG. 19 illustrates an example architecture of a system including a first cellular core network, according to some embodiments

FIG. 19 illustrates an example architecture of a system 1900 including a first CN 1920, in accordance with various embodiments. In this example, system 1900 may implement the LTE standard wherein the CN 1920 is an EPC 1920 that corresponds with CN 1820 of FIG. 18. Additionally, the UE 1901 may be the same or similar as the UEs 1801 of FIG. 18, and the E-UTRAN 1910 may be a RAN that is the same or similar to the RAN 1810 of FIG. 18, and which may include RAN nodes 1811 discussed previously. The CN 1920 may comprise MMEs 1921, an S-GW 1922, a P-GW 1923, a HSS 1924, and a SGSN 1925.

The MMEs 1921 may be similar in function to the control plane of legacy SGSN, and may implement MM functions to keep track of the current location of a UE 1901. The MMEs 1921 may perform various MM procedures to manage mobility aspects in access such as gateway selection and tracking area list management. MM (also referred to as "EPS MM" or "EMM" in E-UTRAN systems) may refer to all applicable procedures, methods, data storage, etc. that are used to maintain knowledge about a present location of the UE 1901, provide user identity confidentiality, and/or perform other like services to users/subscribers. Each UE 1901 and the MME 1921 may include an MM or EMM sublayer, and an MM context may be established in the UE 1901 and the MME 1921 when an attach procedure is successfully completed. The MM context may be a data structure or database object that stores MM-related information of the UE 1901. The MMEs 1921 may be coupled with the HSS 1924 via an S6a reference point, coupled with the SGSN 1925 via an S3 reference point, and coupled with the S-GW 1922 via an S11 reference point.

The SGSN 1925 may be a node that serves the UE 1901 by tracking the location of an individual UE 1901 and performing security functions. In addition, the SGSN 1925 may perform Inter-EPC node signaling for mobility between 2G/3G and E-UTRAN 3GPP access networks; PDN and S-GW selection as specified by the MMEs 1921; handling of UE 1901 time zone functions as specified by the MMEs 1921; and MME selection for handovers to E-UTRAN 3GPP access network. The S3 reference point between the MMEs 1921 and the SGSN 1925 may enable user and bearer information exchange for inter-3GPP access network mobility in idle and/or active states.

The HSS 1924 may comprise a database for network users, including subscription-related information to support the network entities' handling of communication sessions. The EPC 1920 may comprise one or several HSSs 1924, depending on the number of mobile subscribers, on the capacity of the equipment, on the organization of the network, etc. For example, the HSS 1924 can provide support for routing/roaming, authentication, authorization, naming/addressing resolution, location dependencies, etc. An S6a reference point between the HSS 1924 and the MMEs 1921 may enable transfer of subscription and authentication data for authenticating/authorizing user access to the EPC 1920 between HSS 1924 and the MMEs 1921.

The S-GW 1922 may terminate the S1 interface 1813 ("S1-U" in FIG. 19) toward the RAN 1910, and routes data packets between the RAN 1910 and the EPC 1920. In addition, the S-GW 1922 may be a local mobility anchor point for inter-RAN node handovers and also may provide an anchor for inter-3GPP mobility. Other responsibilities may include lawful intercept, charging, and some policy enforcement. The S11 reference point between the S-GW 1922 and the MMEs 1921 may provide a control plane between the MMEs 1921 and the S-GW 1922. The S-GW 1922 may be coupled with the P-GW 1923 via an S5 reference point.

The P-GW 1923 may terminate a SGi interface toward a PDN 1930. The P-GW 1923 may route data packets between the EPC 1920 and external networks such as a network including the application server 1830 (alternatively referred to as an "AF") via an IP interface 1825 (see e.g., FIG. 18). In embodiments, the P-GW 1923 may be communicatively coupled to an application server (application server 1830 of FIG. 18 or PDN 1930 in FIG. 19) via an IP communications interface 1825 (see, e.g., FIG. 18). The S5 reference point between the P-GW 1923 and the S-GW 1922 may provide user plane tunneling and tunnel management between the P-GW 1923 and the S-GW 1922. The S5 reference point may also be used for S-GW 1922 relocation due to UE 1901 mobility and if the S-GW 1922 needs to connect to a non-collocated P-GW 1923 for the required PDN connectivity. The P-GW 1923 may further include a node for policy enforcement and charging data collection (e.g., PCEF (not shown)). Additionally, the SGi reference point between the P-GW 1923 and the packet data network (PDN) 1930 may be an operator external public, a private PDN, or an intra operator packet data network, for example, for provision of IMS services. The P-GW 1923 may be coupled with a PCRF 1926 via a Gx reference point.

PCRF 1926 is the policy and charging control element of the EPC 1920. In a non-roaming scenario, there may be a single PCRF 1926 in the Home Public Land Mobile Network (HPLMN) associated with a UE 1901's Internet Protocol Connectivity Access Network (IP-CAN) session. In a roaming scenario with local breakout of traffic, there may be two PCRFs associated with a UE 1901's IP-CAN session, a Home PCRF (H-PCRF) within an HPLMN and a Visited PCRF (V-PCRF) within a Visited Public Land Mobile Network (VPLMN). The PCRF 1926 may be communicatively coupled to the application server 1930 via the P-GW 1923. The application server 1930 may signal the PCRF 1926 to indicate a new service flow and select the appropriate QoS and charging parameters. The PCRF 1926 may provision this rule into a PCEF (not shown) with the appropriate TFT and QCI, which commences the QoS and charging as specified by the application server 1930. The Gx reference point between the PCRF 1926 and the P-GW 1923 may allow for the transfer of QoS policy and charging rules from the PCRF 1926 to PCEF in the P-GW 1923. An Rx reference point may reside between the PDN 1930 (or "AF 1930") and the PCRF 1926.

Figure 20:
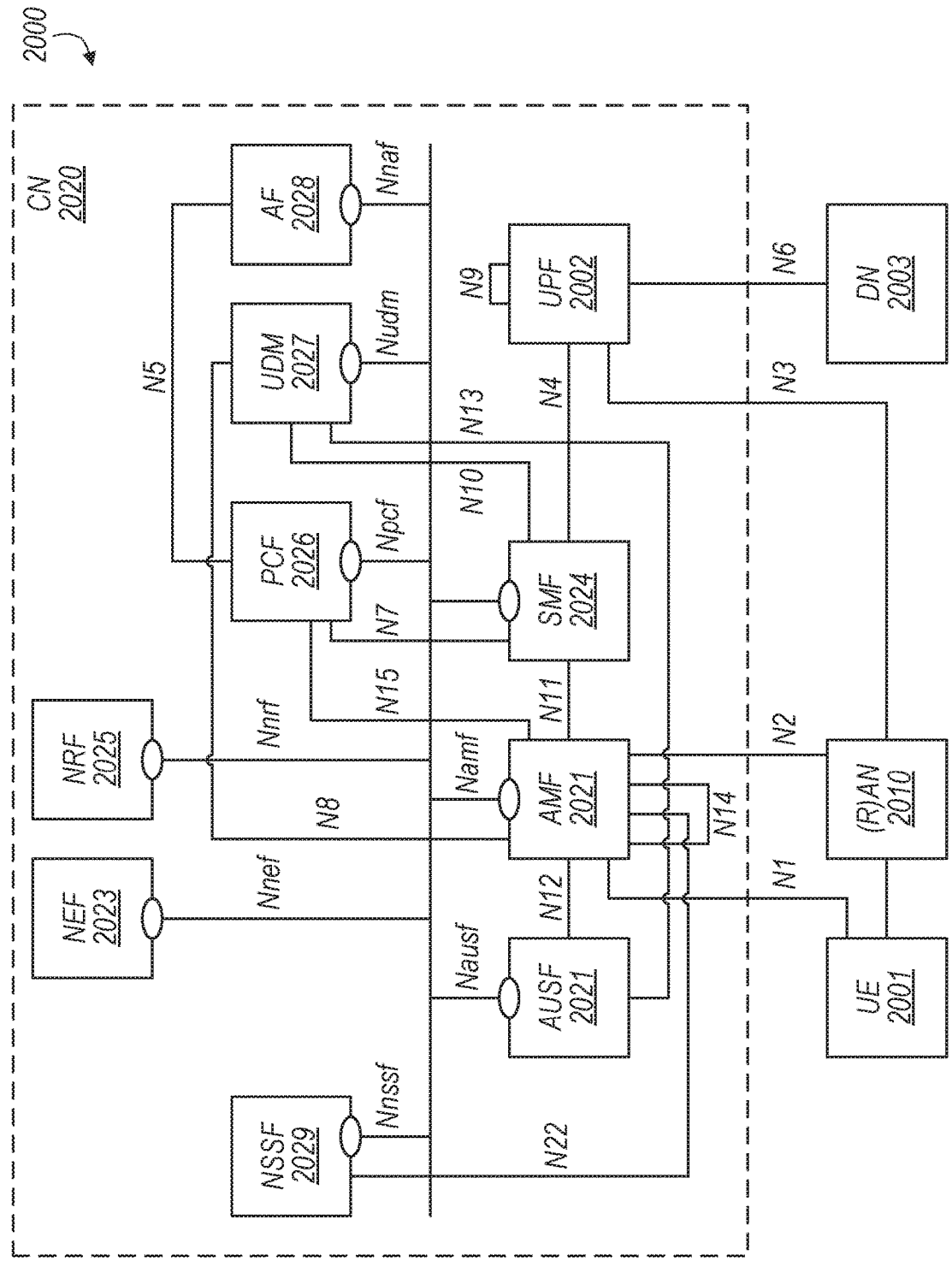
FIG. 20 illustrates an example architecture of a system including a second cellular core network, according to some embodiments.

FIG. 20 illustrates an architecture of a system 2000 including a second CN 2020 in accordance with various embodiments. The system 2000 is shown to include a UE 2001, which may be the same or similar to the UEs 1801 and UE 1901 discussed previously; a (R)AN 2010, which may be the same or similar to the RAN 1810 and RAN 1910 discussed previously, and which may include RAN nodes 1811 discussed previously; and a DN 2003, which may be, for example, operator services, Internet access or 3rd party services; and a 5GC 2020. The 5GC 2020 may include an AUSF 2022; an AMF 2021; a SMF 2024; a NEF 2023; a PCF 2026; a NRF 2025; a UDM 2027; an AF 2028; a UPF 2002; and a NSSF 2029.

The UPF 2002 may act as an anchor point for intra-RAT and inter-RAT mobility, an external PDU session point of interconnect to DN 2003, and a branching point to support multi-homed PDU session. The UPF 2002 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform Uplink Traffic verification (e.g., SDF to QoS flow mapping), transport level packet marking in the uplink and downlink, and perform downlink packet buffering and downlink data notification triggering. UPF 2002 may include an uplink classifier to support routing traffic flows to a data network. The DN 2003 may represent various network operator services, Internet access, or third party services. DN 2003 may include, or be similar to, application server 1830 discussed previously. The UPF 2002 may interact with the SMF 2024 via an N4 reference point between the SMF 2024 and the UPF 2002.

The AUSF 2022 may store data for authentication of UE 2001 and handle authentication-related functionality. The AUSF 2022 may facilitate a common authentication framework for various access types. The AUSF 2022 may communicate with the AMF 2021 via an N12 reference point between the AMF 2021 and the AUSF 2022; and may communicate with the UDM 2027 via an N13 reference point between the UDM 2027 and the AUSF 2022. Additionally, the AUSF 2022 may exhibit an Nausf service-based interface.

The AMF 2021 may be responsible for registration management (e.g., for registering UE 2001, etc.), connection management, reachability management, mobility management, and lawful interception of AMF-related events, and access authentication and authorization. The AMF 2021 may be a termination point for the N11 reference point between the AMF 2021 and the SMF 2024. The AMF 2021 may provide transport for SM messages between the UE 2001 and the SMF 2024, and act as a transparent pro26 for routing SM messages. AMF 2021 may also provide transport for SMS messages between UE 2001 and an SMSF (not shown by FIG. 20). AMF 2021 may act as SEAF, which may include interaction with the AUSF 2022 and the UE 2001, receipt of an intermediate key that was established as a result of the UE 2001 authentication process. Where USIM based authentication is used, the AMF 2021 may retrieve the security material from the AUSF 2022. AMF 2021 may also include a SCM function, which receives a key from the SEA that it uses to derive access-network specific keys. Furthermore, AMF 2021 may be a termination point of a RAN CP interface, which may include or be an N2 reference point between the (R)AN 2010 and the AMF 2021; and the AMF 2021 may be a termination point of NAS (N1) signalling, and perform NAS ciphering and integrity protection.

AMF 2021 may also support NAS signalling with a UE 2001 over an N3 IWF interface. The N3IWF may be used to provide access to untrusted entities. N3IWF may be a termination point for the N2 interface between the (R)AN 2010 and the AMF 2021 for the control plane, and may be a termination point for the N3 reference point between the (R)AN 2010 and the UPF 2002 for the user plane. As such, the AMF 2021 may handle N2 signalling from the SMF 2024 and the AMF 2021 for PDU sessions and QoS, encapsulate/de-encapsulate packets for IPSec and N3 tunnelling, mark N3 user-plane packets in the uplink, and enforce QoS corresponding to N3 packet marking taking into account QoS requirements associated with such marking received over N2. N3IWF may also relay uplink and downlink control-plane NAS signalling between the UE 2001 and AMF 2021 via an N1 reference point between the UE 2001 and the AMF 2021, and relay uplink and downlink user-plane packets between the UE 2001 and UPF 2002. The N3IWF also provides mechanisms for IPsec tunnel establishment with the UE 2001. The AMF 2021 may exhibit an Namf service-based interface, and may be a termination point for an N14 reference point between two AMFs 2021 and an N17 reference point between the AMF 2021 and a 5G-EIR (not shown by FIG. 20).

The UE 2001 may need to register with the AMF 2021 in order to receive network services. RM is used to register or deregister the UE 2001 with the network (e.g., AMF 2021), and establish a UE context in the network (e.g., AMF 2021). The UE 2001 may operate in an RM-REGISTERED state or an RM-DEREGISTERED state. In the RM DEREGISTERED state, the UE 2001 is not registered with the network, and the UE context in AMF 2021 holds no valid location or routing information for the UE 2001 so the UE 2001 is not reachable by the AMF 2021. In the RM REGISTERED state, the UE 2001 is registered with the network, and the UE context in AMF 2021 may hold a valid location or routing information for the UE 2001 so the UE 2001 is reachable by the AMF 2021. In the RM-REGISTERED state, the UE 2001 may perform mobility Registration Update procedures, perform periodic Registration Update procedures triggered by expiration of the periodic update timer (e.g., to notify the network that the UE 2001 is still active), and perform a Registration Update procedure to update UE capability information or to re-negotiate protocol parameters with the network, among others.

The AMF 2021 may store one or more RM contexts for the UE 2001, where each RM context is associated with a specific access to the network. The RM context may be a data structure, database object, etc. that indicates or stores, inter alia, a registration state per access type and the periodic update timer. The AMF 2021 may also store a 5GC MM context that may be the same or similar to the (E)MM context discussed previously. In various embodiments, the AMF 2021 may store a CE mode B Restriction parameter of the UE 2001 in an associated MM context or RM context. The AMF 2021 may also derive the value, when needed, from the UE's usage setting parameter already stored in the UE context (and/or MM/RM context).

CM may be used to establish and release a signaling connection between the UE 2001 and the AMF 2021 over the N1 interface. The signaling connection is used to enable NAS signaling exchange between the UE 2001 and the CN 2020, and comprises both the signaling connection between the UE and the AN (e.g., RRC connection or UE-N3IWF connection for non-3GPP access) and the N2 connection for the UE 2001 between the AN (e.g., RAN 2010) and the AMF 2021. The UE 2001 may operate in one of two CM states, CM-IDLE mode or CM-CONNECTED mode. When the UE 2001 is operating in the CM-IDLE state/mode, the UE 2001 may have no NAS signaling connection established with the AMF 2021 over the N1 interface, and there may be (R)AN 2010 signaling connection (e.g., N2 and/or N3 connections) for the UE 2001. When the UE 2001 is operating in the CM-CONNECTED state/mode, the UE 2001 may have an established NAS signaling connection with the AMF 2021 over the N1 interface, and there may be a (R)AN 2010 signaling connection (e.g., N2 and/or N3 connections) for the UE 2001. Establishment of an N2 connection between the (R)AN 2010 and the AMF 2021 may cause the UE 2001 to transition from CM-IDLE mode to CM-CONNECTED mode, and the UE 2001 may transition from the CM-CONNECTED mode to the CM-IDLE mode when N2 signaling between the (R)AN 2010 and the AMF 2021 is released.

The SMF 2024 may be responsible for SM (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent via AMF over N2 to AN; and determining SSC mode of a session. SM may refer to management of a PDU session, and a PDU session or "session" may refer to a PDU connectivity service that provides or enables the exchange of PDUs between a UE 2001 and a data network (DN) 2003 identified by a Data Network Name (DNN). PDU sessions may be established upon UE 2001 request, modified upon UE 2001 and 5GC 2020 request, and released upon UE 2001 and 5GC 2020 request using NAS SM signaling exchanged over the N1 reference point between the UE 2001 and the SMF 2024. Upon request from an application server, the 5GC 2020 may trigger a specific application in the UE 2001. In response to receipt of the trigger message, the UE 2001 may pass the trigger message (or relevant parts/information of the trigger message) to one or more identified applications in the UE 2001. The identified application(s) in the UE 2001 may establish a PDU session to a specific DNN. The SMF 2024 may check whether the UE 2001 requests are compliant with user subscription information associated with the UE 2001. In this regard, the SMF 2024 may retrieve and/or request to receive update notifications on SMF 2024 level subscription data from the UDM 2027.

The SMF 2024 may include the following roaming functionality: handling local enforcement to apply QoS SLAB (VPLMN); charging data collection and charging interface (VPLMN); lawful intercept (in VPLMN for SM events and interface to LI system); and support for interaction with external DN for transport of signalling for PDU session authorization/authentication by external DN. An N16 reference point between two SMFs 2024 may be included in the system 2000, which may be between another SMF 2024 in a visited network and the SMF 2024 in the home network in roaming scenarios. Additionally, the SMF 2024 may exhibit the Nsmf service-based interface.

The NEF 2023 may provide means for securely exposing the services and capabilities provided by 3GPP network functions for third party, internal exposure/re-exposure, Application Functions (e.g., AF 2028), edge computing or fog computing systems, etc. In such embodiments, the NEF 2023 may authenticate, authorize, and/or throttle the AFs. NEF 2023 may also translate information exchanged with the AF 2028 and information exchanged with internal network functions. For example, the NEF 2023 may translate between an AF-Service-Identifier and an internal 5GC information. NEF 2023 may also receive information from other network functions (NFs) based on exposed capabilities of other network functions. This information may be stored at the NEF 2023 as structured data, or at a data storage NF using standardized interfaces. The stored information can then be re-exposed by the NEF 2023 to other NFs and AFs, and/or used for other purposes such as analytics. Additionally, the NEF 2023 may exhibit an Nnef service-based interface.

The NRF 2025 may support service discovery functions, receive NF discovery requests from NF instances, and provide the information of the discovered NF instances to the NF instances. NRF 2025 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 2025 may exhibit the Nnrf service-based interface.

The PCF 2026 may provide policy rules to control plane function(s) to enforce them, and may also support unified policy framework to govern network behaviour. The PCF 2026 may also implement an FE to access subscription information relevant for policy decisions in a UDR of the UDM 2027. The PCF 2026 may communicate with the AMF 2021 via an N15 reference point between the PCF 2026 and the AMF 2021, which may include a PCF 2026 in a visited network and the AMF 2021 in case of roaming scenarios. The PCF 2026 may communicate with the AF 2028 via an N5 reference point between the PCF 2026 and the AF 2028; and with the SMF 2024 via an N7 reference point between the PCF 2026 and the SMF 2024. The system 2000 and/or CN 2020 may also include an N24 reference point between the PCF 2026 (in the home network) and a PCF 2026 in a visited network. Additionally, the PCF 2026 may exhibit an Npcf service-based interface.

The UDM 2027 may handle subscription-related information to support the network entities' handling of communication sessions, and may store subscription data of UE 2001. For example, subscription data may be communicated between the UDM 2027 and the AMF 2021 via an N8 reference point between the UDM 2027 and the AMF. The UDM 2027 may include two parts, an application FE and a UDR (the FE and UDR are not shown by FIG. 20). The UDR may store subscription data and policy data for the UDM 2027 and the PCF 2026, and/or structured data for exposure and application data (including PFDs for application detection, application request information for multiple UEs 2001) for the NEF 2023. The Nudr service-based interface may be exhibited by the UDR 221 to allow the UDM 2027, PCF 2026, and NEF 2023 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. The UDR may interact with the SMF 2024 via an N10 reference point between the UDM 2027 and the SMF 2024. UDM 2027 may also support SMS management, wherein an SMS-FE implements the similar application logic as discussed previously. Additionally, the UDM 2027 may exhibit the Nudm service-based interface.

The AF 2028 may provide application influence on traffic routing, provide access to the NCE, and interact with the policy framework for policy control. The NCE may be a mechanism that allows the 5GC 2020 and AF 2028 to provide information to each other via NEF 2023, which may be used for edge computing implementations. In such implementations, the network operator and third party services may be hosted close to the UE 2001 access point of attachment to achieve an efficient service delivery through the reduced end-to-end latency and load on the transport network. For edge computing implementations, the 5GC may select a UPF 2002 close to the UE 2001 and execute traffic steering from the UPF 2002 to DN 2003 via the N6 interface. This may be based on the UE subscription data, UE location, and information provided by the AF 2028. In this way, the AF 2028 may influence UPF (re)selection and traffic routing. Based on operator deployment, when AF 2028 is considered to be a trusted entity, the network operator may permit AF 2028 to interact directly with relevant NFs. Additionally, the AF 2028 may exhibit an Naf service-based interface.

The NSSF 2029 may select a set of network slice instances serving the UE 2001. The NSSF 2029 may also determine allowed NSSAI and the mapping to the subscribed S-NSSAIs, if needed. The NSSF 2029 may also determine the AMF set to be used to serve the UE 2001, or a list of candidate AMF(s) 2021 based on a suitable configuration and possibly by querying the NRF 2025. The selection of a set of network slice instances for the UE 2001 may be triggered by the AMF 2021 with which the UE 2001 is registered by interacting with the NSSF 2029, which may lead to a change of AMF 2021. The NSSF 2029 may interact with the AMF 2021 via an N22 reference point between AMF 2021 and NSSF 2029; and may communicate with another NSSF 2029 in a visited network via an N31 reference point (not shown by FIG. 20). Additionally, the NSSF 2029 may exhibit an Nnssf service-based interface.

As discussed previously, the CN 2020 may include an SMSF, which may be responsible for SMS subscription checking and verification, and relaying SM messages to/from the UE 2001 to/from other entities, such as an SMS-GMSC/IWMSC/SMS-router. The SMS may also interact with AMF 2021 and UDM 2027 for a notification procedure that the UE 2001 is available for SMS transfer (e.g., set a UE not reachable flag, and notifying UDM 2027 when UE 2001 is available for SMS).

The CN 120 may also include other elements that are not shown by FIG. 20, such as a Data Storage system/architecture, a 5G-EIR, a SEPP, and the like. The Data Storage system may include a SDSF, an UDSF, and/or the like. Any NF may store and retrieve unstructured data into/from the UDSF (e.g., UE contexts), via N18 reference point between any NF and the UDSF (not shown by FIG. 20). Individual NFs may share a UDSF for storing their respective unstructured data or individual NFs may each have their own UDSF located at or near the individual NFs. Additionally, the UDSF may exhibit an Nudsf service-based interface (not shown by FIG. 20). The 5G-EIR may be an NF that checks the status of PEI for determining whether particular equipment/entities are blacklisted from the network; and the SEPP may be a non-transparent pro26 that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 20 for clarity. In one example, the CN 2020 may include an Nx interface, which is an inter-CN interface between the MME (e.g., MME 1921) and the AMF 2021 in order to enable interworking between CN 2020 and CN 1920. Other example interfaces/reference points may include an N5g-EIR service-based interface exhibited by a 5G-EIR, an N27 reference point between the NRF in the visited network and the NRF in the home network; and an N31 reference point between the NSSF in the visited network and the NSSF in the home network.

Figure 21:
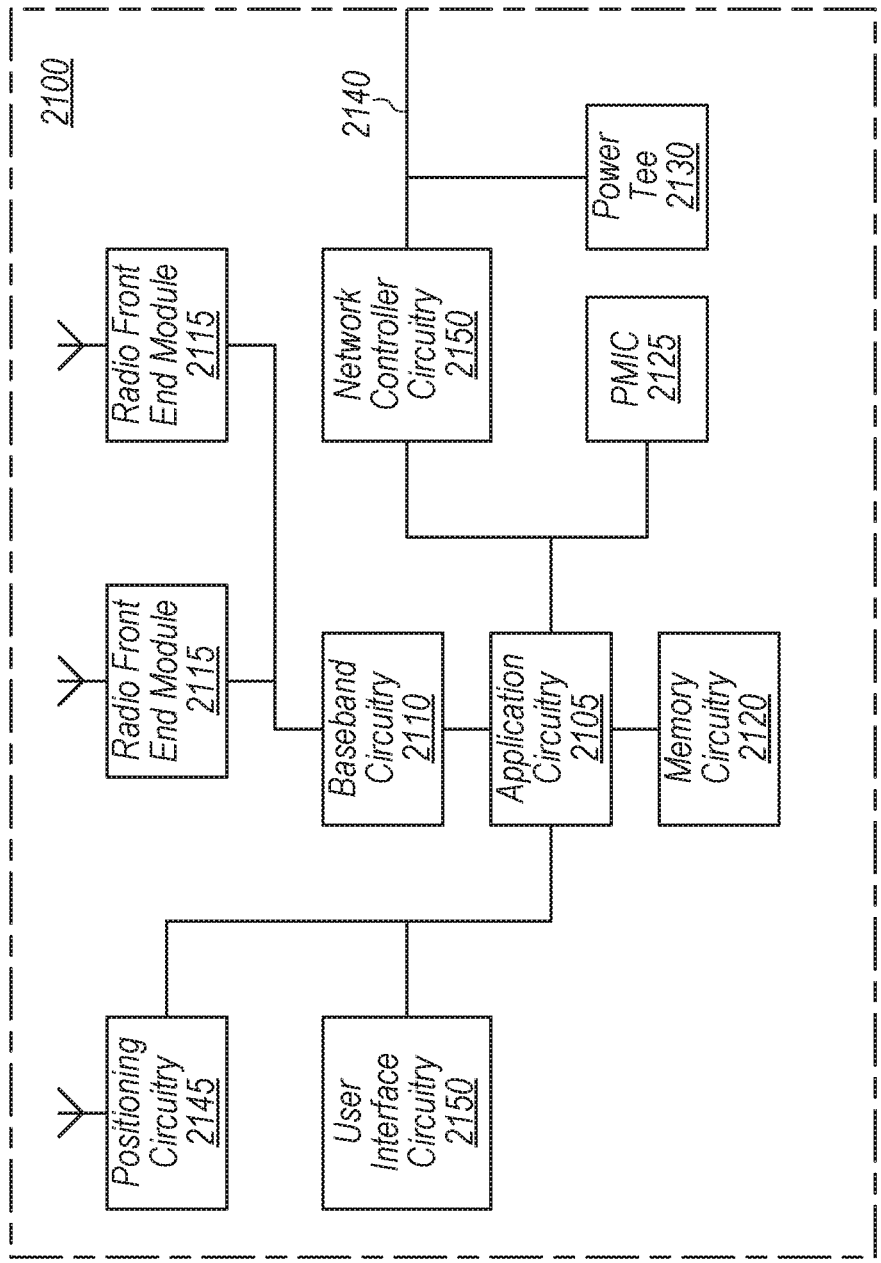
FIG. 21 illustrates an example of infrastructure equipment, according to some embodiments.

FIG. 21 illustrates an example of infrastructure equipment 2100 in accordance with various embodiments. The infrastructure equipment 2100 (or "system 2100") may be implemented as a base station, radio head, RAN node such as the RAN nodes 1811 and/or AP 1806 shown and described previously, application server(s) 1830, and/or any other element/device discussed herein. In other examples, the system 2100 could be implemented in or by a UE.

The system 2100 includes application circuitry 2105, baseband circuitry 2110, one or more radio front end modules (RFEMs) 2115, memory circuitry 2120, power management integrated circuitry (PMIC) 2125, power tee circuitry 2130, network controller circuitry 2135, network interface connector 2140, satellite positioning circuitry 2145, and user interface 2150. In some embodiments, the device 2100 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 2105 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 2105 may be coupled with or may include memory/storage elements and may be configured to execute instructions stored in the memory/storage to enable various applications or operating systems to run on the system 2100. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 2105 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 2105 may comprise, or may be, a special-purpose processor/controller to operate according to the various embodiments herein. As examples, the processor(s) of application circuitry 2105 may include one or more Apple® processor(s), such as A5-A9 processor(s); Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 2100 may not utilize application circuitry 2105, and instead may include a special-purpose processor/controller to process IP data received from an EPC or 5GC, for example.

In some implementations, the application circuitry 2105 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 2105 may comprise logic blocks or logic fabric, and other interconnected resources that may be programmed to perform various functions, such as the procedures, methods, functions, etc. of the various embodiments discussed herein. In such embodiments, the circuitry of application circuitry 2105 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 2110 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 2110 are discussed infra with regard to FIG. 23.

User interface circuitry 2150 may include one or more user interfaces designed to enable user interaction with the system 2100 or peripheral component interfaces designed to enable peripheral component interaction with the system 2100. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 2115 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 2311 of FIG. 23 infra), and the RFEM may be connected to multiple antennas. In alternative implementations, both mmWave and sub-mmWave radio functions may be implemented in the same physical RFEM 2115, which incorporates both mmWave antennas and sub-mmWave.

The memory circuitry 2120 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 2120 may be implemented as one or more of solder down packaged integrated circuits, socketed memory modules and plug-in memory cards.

The PMIC 2125 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 2130 may provide for electrical power drawn from a network cable to provide both power supply and data connectivity to the infrastructure equipment 2100 using a single cable.

The network controller circuitry 2135 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 2100 via network interface connector 2140 using a physical connection, which may be electrical (commonly referred to as a "copper interconnect"), optical, or wireless. The network controller circuitry 2135 may include one or more dedicated processors and/or FPGAs to communicate using one or more of the aforementioned protocols. In some implementations, the network controller circuitry 2135 may include multiple controllers to provide connectivity to other networks using the same or different protocols.

The positioning circuitry 2145 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 2145 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 2145 may include a Micro-Technology for Positioning, Navigation, and Timing (Micro-PNT) IC that uses a master timing clock to perform position tracking/estimation without GNSS assistance. The positioning circuitry 2145 may also be part of, or interact with, the baseband circuitry 2110 and/or RFEMs 2115 to communicate with the nodes and components of the positioning network. The positioning circuitry 2145 may also provide position data and/or time data to the application circuitry 2105, which may use the data to synchronize operations with various infrastructure (e.g., RAN nodes 1811, etc.), or the like.

The components shown by FIG. 21 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

Figure 22:
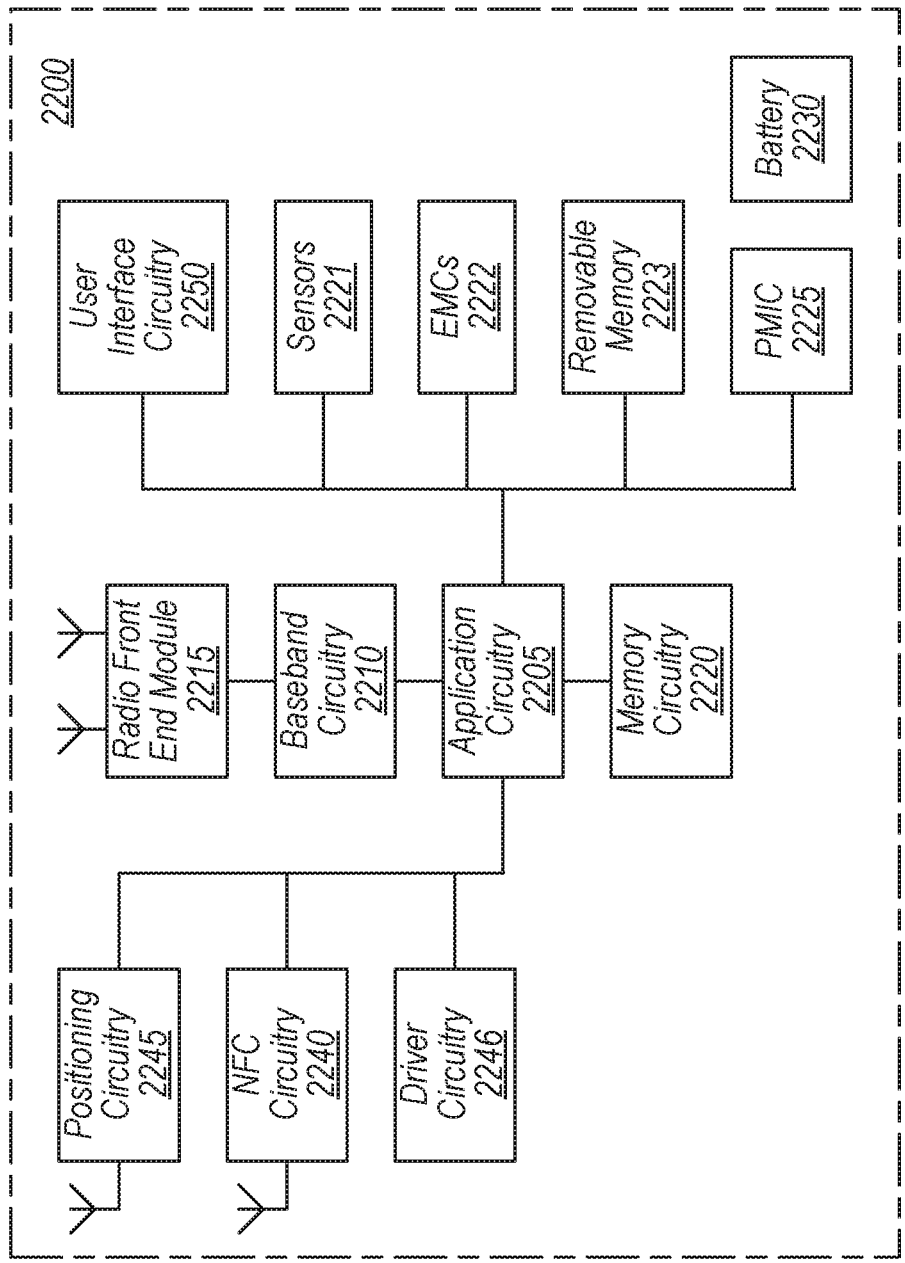
FIG. 22 illustrates an example of a platform or device, according to some embodiments.

FIG. 22 illustrates an example of a platform 2200 (or "device 2200") in accordance with various embodiments. In embodiments, the computer platform 2200 may be suitable for use as UEs 1801, 1901, 2001, application servers 1830, and/or any other element/device discussed herein. The platform 2200 may include any combinations of the components shown in the example. The components of platform 2200 may be implemented as integrated circuits (ICs), portions thereof, discrete electronic devices, or other modules, logic, hardware, software, firmware, or a combination thereof adapted in the computer platform 2200, or as components otherwise incorporated within a chassis of a larger system. The block diagram of FIG. 22 is intended to show a high level view of components of the computer platform 2200. However, some of the components shown may be omitted, additional components may be present, and different arrangement of the components shown may occur in other implementations.

Application circuitry 2205 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 2205 may be coupled with or may include memory/storage elements and may be configured to execute instructions stored in the memory/storage to enable various applications or operating systems to run on the system 2200. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 2105 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 2105 may comprise, or may be, a special-purpose processor/controller to operate according to the various embodiments herein.

As examples, the processor(s) of application circuitry 2205 may include one or more A series processor(s) from Apple® Inc., such as A5-A9 processor(s). The processors of the application circuitry 2205 may also be one or more of an Intel® Architecture Core™ based processor, such as a Quark™, an Atom™, an i3, an i5, an i7, or an MCU-class processor, or another such processor available from Intel® Corporation, Santa Clara, CA; Advanced Micro Devices (AMD) Ryzen® processor(s) or Accelerated Processing Units (APUs); Snapdragon™ processor(s) from Qualcomm® Technologies, Inc., Texas Instruments, Inc.® Open Multimedia Applications Platform (OMAP)™ processor(s);

a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 2205 may be a part of a system on a chip (SoC) in which the application circuitry 2205 and other components are formed into a single integrated circuit, or a single package, such as the Edison™ or Galileo™ SoC boards from Intel® Corporation.

Additionally or alternatively, application circuitry 2205 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 2205 may comprise logic blocks or logic fabric, and other interconnected resources that may be programmed to perform various functions, such as the procedures, methods, functions, etc. of the various embodiments discussed herein. In such embodiments, the circuitry of application circuitry 2205 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 2210 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 2210 are discussed infra with regard to FIG. 23.

The RFEMs 2215 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 2311 of FIG. 23 infra), and the RFEM may be connected to multiple antennas. In alternative implementations, both mmWave and sub-mmWave radio functions may be implemented in the same physical RFEM 2215, which incorporates both mmWave antennas and sub-mmWave.

The memory circuitry 2220 may include any number and type of memory devices used to provide for a given amount of system memory. As examples, the memory circuitry 2220 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 2220 may be developed in accordance with a Joint Electron Devices Engineering Council (JEDEC) low power double data rate (LPDDR)-based design, such as LPDDR2, LPDDR3, LPDDR4, or the like. Memory circuitry 2220 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 2220 may be on-die memory or registers associated with the application circuitry 2205. To provide for persistent storage of information such as data, applications, operating systems and so forth, memory circuitry 2220 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 2200 may incorporate the three-dimensional (3D) cross-point (XPOINT) memories from Intel® and Micron®.

Removable memory circuitry 2223 may include devices, circuitry, enclosures/housings, ports or receptacles, etc. used to couple portable data storage devices with the platform 2200. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 2200 may also include interface circuitry (not shown) that is used to connect external devices with the platform 2200. The external devices connected to the platform 2200 via the interface circuitry include sensor circuitry 2221 and electro-mechanical components (EMCs) 2222, as well as removable memory devices coupled to removable memory circuitry 2223.

The sensor circuitry 2221 include devices, modules, or subsystems whose purpose is to detect events or changes in its environment and send the information (sensor data) about the detected events to some other a device, module, subsystem, etc. Examples of such sensors include, inter alia, inertia measurement units (IMUS) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 2222 include devices, modules, or subsystems whose purpose is to enable platform 2200 to change its state, position, and/or orientation, or move or control a mechanism or (sub)system. Additionally, EMCs 2222 may be configured to generate and send messages/signalling to other components of the platform 2200 to indicate a current state of the EMCs 2222. Examples of the EMCs 2222 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 2200 is configured to operate one or more EMCs 2222 based on one or more captured events and/or instructions or control signals received from a service provider and/or various clients.

In some implementations, the interface circuitry may connect the platform 2200 with positioning circuitry 2245. The positioning circuitry 2245 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 2245 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 2245 may include a Micro-PNT IC that uses a master timing clock to perform position tracking/estimation without GNSS assistance. The positioning circuitry 2245 may also be part of, or interact with, the baseband circuitry 2110 and/or RFEMs 2215 to communicate with the nodes and components of the positioning network. The positioning circuitry 2245 may also provide position data and/or time data to the application circuitry 2205, which may use the data to synchronize operations with various infrastructure (e.g., radio base stations), for turn-by-turn navigation applications, or the like In some implementations, the interface circuitry may connect the platform 2200 with Near-Field Communication (NFC) circuitry 2240. NFC circuitry 2240 is configured to provide contactless, short-range communications based on radio frequency identification (RFID) standards, wherein magnetic field induction is used to enable communication between NFC circuitry 2240 and NFC-enabled devices external to the platform 2200 (e.g., an "NFC touchpoint"). NFC circuitry 2240 comprises an NFC controller coupled with an antenna element and a processor coupled with the NFC controller. The NFC controller may be a chip/IC providing NFC functionalities to the NFC circuitry 2240 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 2240, or initiate data transfer between the NFC circuitry 2240 and another active NFC device (e.g., a smartphone or an NFC-enabled POS terminal) that is proximate to the platform 2200.

The driver circuitry 2246 may include software and hardware elements that operate to control particular devices that are embedded in the platform 2200, attached to the platform 2200, or otherwise communicatively coupled with the platform 2200. The driver circuitry 2246 may include individual drivers allowing other components of the platform 2200 to interact with or control various input/output (I/O) devices that may be present within, or connected to, the platform 2200. For example, driver circuitry 2246 may include a display driver to control and allow access to a display device, a touchscreen driver to control and allow access to a touchscreen interface of the platform 2200, sensor drivers to obtain sensor readings of sensor circuitry 2221 and control and allow access to sensor circuitry 2221, EMC drivers to obtain actuator positions of the EMCs 2222 and/or control and allow access to the EMCs 2222, a camera driver to control and allow access to an embedded image capture device, audio drivers to control and allow access to one or more audio devices.

The power management integrated circuitry (PMIC) 2225 (also referred to as "power management circuitry 2225") may manage power provided to various components of the platform 2200. In particular, with respect to the baseband circuitry 2210, the PMIC 2225 may control power-source selection, voltage scaling, battery charging, or DC-to-DC conversion. The PMIC 2225 may often be included when the platform 2200 is capable of being powered by a battery 2230, for example, when the device is included in a UE 1801, 1901, 2001.

In some embodiments, the PMIC 2225 may control, or otherwise be part of, various power saving mechanisms of the platform 2200. For example, if the platform 2200 is in an RRC_Connected state, where it is still connected to the RAN node as it expects to receive traffic shortly, then it may enter a state known as Discontinuous Reception Mode (DRX) after a period of inactivity. During this state, the platform 2200 may power down for brief intervals of time and thus save power. If there is no data traffic activity for an extended period of time, then the platform 2200 may transition off to an RRC_Idle state, where it disconnects from the network and does not perform operations such as channel quality feedback, handover, etc. The platform 2200 goes into a very low power state and it performs paging where again it periodically wakes up to listen to the network and then powers down again. The platform 2200 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 2230 may power the platform 2200, although in some examples the platform 2200 may be mounted deployed in a fixed location, and may have a power supply coupled to an electrical grid. The battery 2230 may be a lithium ion battery, a metal-air battery, such as a zinc-air battery, an aluminum-air battery, a lithium-air battery, and the like. In some implementations, such as in V2X applications, the battery 2230 may be a typical lead-acid automotive battery.

In some implementations, the battery 2230 may be a "smart battery," which includes or is coupled with a Battery Management System (BMS) or battery monitoring integrated circuitry. The BMS may be included in the platform 2200 to track the state of charge (SoCh) of the battery 2230. The BMS may be used to monitor other parameters of the battery 2230 to provide failure predictions, such as the state of health (SoH) and the state of function (SoF) of the battery 2230. The BMS may communicate the information of the battery 2230 to the application circuitry 2205 or other components of the platform 2200. The BMS may also include an analog-to-digital (ADC) convertor that allows the application circuitry 2205 to directly monitor the voltage of the battery 2230 or the current flow from the battery 2230. The battery parameters may be used to determine actions that the platform 2200 may perform, such as transmission frequency, network operation, sensing frequency, and the like.

A power block, or other power supply coupled to an electrical grid may be coupled with the BMS to charge the battery 2230. In some examples, the power block XS30 may be replaced with a wireless power receiver to obtain the power wirelessly, for example, through a loop antenna in the computer platform 2200. In these examples, a wireless battery charging circuit may be included in the BMS. The specific charging circuits chosen may depend on the size of the battery 2230, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 2250 includes various input/output (I/O) devices present within, or connected to, the platform 2200, and includes one or more user interfaces designed to enable user interaction with the platform 2200 and/or peripheral component interfaces designed to enable peripheral component interaction with the platform 2200. The user interface circuitry 2250 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 2200. The output device circuitry may also include speakers or other audio emitting devices, printer(s), and/or the like. In some embodiments, the sensor circuitry 2221 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 2200 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I2C interface, an SPI interface, point-to-point interfaces, and a power bus, among others.

Figure 23:
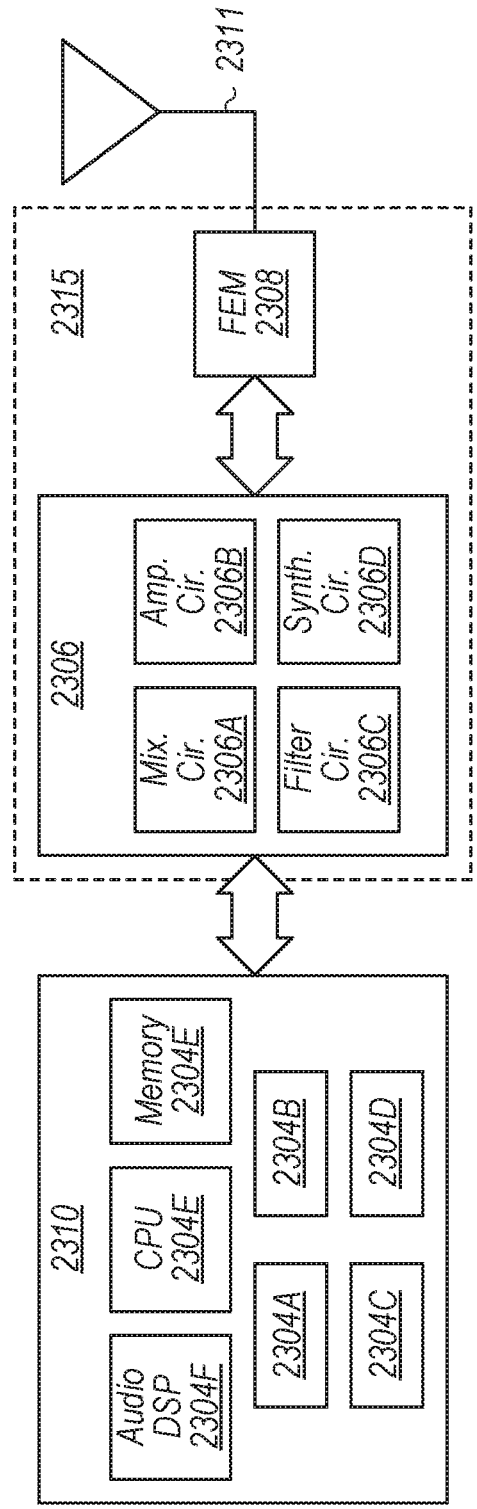
FIG. 23 illustrates example components of baseband circuitry and radio front end modules, according to some embodiments.

FIG. 23 illustrates example components of baseband circuitry 2310 and radio front end modules (RFEM) 2315 in accordance with various embodiments. The baseband circuitry 2310 corresponds to the baseband circuitry 2110 and 2210 of FIGS. 21 and 22, respectively. The RFEM 2315 corresponds to the RFEM 2115 and 2215 of FIGS. 21 and 22, respectively. As shown, the RFEMs 2315 may include Radio Frequency (RF) circuitry 2306, front-end module (FEM) circuitry 2308, antenna array 2311 coupled together at least as shown.

The baseband circuitry 2310 includes circuitry and/or control logic configured to carry out various radio/network protocol and radio control functions that enable communication with one or more radio networks via the RF circuitry 2306. The radio control functions may include, but are not limited to, signal modulation/demodulation, encoding/decoding, radio frequency shifting, etc. In some embodiments, modulation/demodulation circuitry of the baseband circuitry 2310 may include Fast-Fourier Transform (FFT), precoding, or constellation mapping/demapping functionality. In some embodiments, encoding/decoding circuitry of the baseband circuitry 2310 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 2310 is configured to process baseband signals received from a receive signal path of the RF circuitry 2306 and to generate baseband signals for a transmit signal path of the RF circuitry 2306. The baseband circuitry 2310 is configured to interface with application circuitry 2105/2205 (see FIGS. 21 and 22) for generation and processing of the baseband signals and for controlling operations of the RF circuitry 2306. The baseband circuitry 2310 may handle various radio control functions.

The aforementioned circuitry and/or control logic of the baseband circuitry 2310 may include one or more single or multi-core processors. For example, the one or more processors may include a 3G baseband processor 2304A, a 4G/LTE baseband processor 2304B, a 5G/NR baseband processor 2304C, or some other baseband processor(s) 2304D for other existing generations, generations in development or to be developed in the future (e.g., sixth generation (6G), etc.). In other embodiments, some or all of the functionality of baseband processors 2304A-D may be included in modules stored in the memory 2304G and executed via a Central Processing Unit (CPU) 2304E. In other embodiments, some or all of the functionality of baseband processors 2304A-D may be provided as hardware accelerators (e.g., FPGAs, ASICs, etc.) loaded with the appropriate bit streams or logic blocks stored in respective memory cells. In various embodiments, the memory 2304G may store program code of a real-time OS (RTOS), which when executed by the CPU 2304E (or other baseband processor), is to cause the CPU 2304E (or other baseband processor) to manage resources of the baseband circuitry 2310, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 2310 includes one or more audio digital signal processor(s) (DSP) 2304F. The audio DSP(s) 2304F include elements for compression/decompression and echo cancellation and may include other suitable processing elements in other embodiments.

In some embodiments, each of the processors 2304A-2304E include respective memory interfaces to send/receive data to/from the memory 2304G. The baseband circuitry 2310 may further include one or more interfaces to communicatively couple to other circuitries/devices, such as an interface to send/receive data to/from memory external to the baseband circuitry 2310; an application circuitry interface to send/receive data to/from the application circuitry 2105/2205 of FIGS. 21-23); an RF circuitry interface to send/receive data to/from RF circuitry 2306 of FIG. 23; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 2225.

In alternate embodiments (which may be combined with the above described embodiments), baseband circuitry 2310 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 2310 may include protocol processing circuitry with one or more instances of control circuitry (not shown) to provide control functions for the digital baseband circuitry and/or radio frequency circuitry (e.g., the radio front end modules 2315).

Although not shown by FIG. 23, in some embodiments, the baseband circuitry 2310 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 2310 and/or RF circuitry 2306 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 2310 and/or RF circuitry 2306 are part of a Wi-Fi communication system. In the second example, the protocol processing circuitry would operate Wi-Fi MAC and logical link control (LLC) functions. The protocol processing circuitry may include one or more memory structures (e.g., 2304G) to store program code and data for operating the protocol functions, as well as one or more processing cores to execute the program code and perform various operations using the data. The baseband circuitry 2310 may also support radio communications for more than one wireless protocol.

The various hardware elements of the baseband circuitry 2310 discussed herein may be implemented, for example, as a solder-down substrate including one or more integrated circuits (ICs), a single packaged IC soldered to a main circuit board or a multi-chip module containing two or more ICs. In one example, the components of the baseband circuitry 2310 may be suitably combined in a single chip or chipset, or disposed on a same circuit board. In another example, some or all of the constituent components of the baseband circuitry 2310 and RF circuitry 2306 may be implemented together such as, for example, a system on a chip (SoC) or System-in-Package (SiP). In another example, some or all of the constituent components of the baseband circuitry 2310 may be implemented as a separate SoC that is communicatively coupled with and RF circuitry 2306 (or multiple instances of RF circuitry 2306). In yet another example, some or all of the constituent components of the baseband circuitry 2310 and the application circuitry 2105/2205 may be implemented together as individual SoCs mounted to a same circuit board (e.g., a "multi-chip package").

In some embodiments, the baseband circuitry 2310 may provide for communication compatible with one or more radio technologies. For example, in some embodiments, the baseband circuitry 2310 may support communication with an E-UTRAN or other WMAN, a WLAN, a WPAN. Embodiments in which the baseband circuitry 2310 is configured to support radio communications of more than one wireless protocol may be referred to as multi-mode baseband circuitry.

RF circuitry 2306 may enable communication with wireless networks using modulated electromagnetic radiation through a non-solid medium. In various embodiments, the RF circuitry 2306 may include switches, filters, amplifiers, etc. to facilitate the communication with the wireless network. RF circuitry 2306 may include a receive signal path, which may include circuitry to down-convert RF signals received from the FEM circuitry 2308 and provide baseband signals to the baseband circuitry 2310. RF circuitry 2306 may also include a transmit signal path, which may include circuitry to up-convert baseband signals provided by the baseband circuitry 2310 and provide RF output signals to the FEM circuitry 2308 for transmission.

In some embodiments, the receive signal path of the RF circuitry 2306 may include mixer circuitry 2306a, amplifier circuitry 2306b and filter circuitry 2306c. In some embodiments, the transmit signal path of the RF circuitry 2306 may include filter circuitry 2306c and mixer circuitry 2306a. RF circuitry 2306 may also include synthesizer circuitry 2306d for synthesizing a frequency for use by the mixer circuitry 2306a of the receive signal path and the transmit signal path. In some embodiments, the mixer circuitry 2306a of the receive signal path may be configured to down-convert RF signals received from the FEM circuitry 2308 based on the synthesized frequency provided by synthesizer circuitry 2306d. The amplifier circuitry 2306b may be configured to amplify the down-converted signals and the filter circuitry 2306c may be a low-pass filter (LPF) or band-pass filter (BPF) configured to remove unwanted signals from the down-converted signals to generate output baseband signals. Output baseband signals may be provided to the baseband circuitry 2310 for further processing. In some embodiments, the output baseband signals may be zero-frequency baseband signals, although this is not a requirement. In some embodiments, mixer circuitry 2306a of the receive signal path may comprise passive mixers, although the scope of the embodiments is not limited in this respect.

In some embodiments, the mixer circuitry 2306a of the transmit signal path may be configured to up-convert input baseband signals based on the synthesized frequency provided by the synthesizer circuitry 2306d to generate RF output signals for the FEM circuitry 2308. The baseband signals may be provided by the baseband circuitry 2310 and may be filtered by filter circuitry 2306c.

In some embodiments, the mixer circuitry 2306a of the receive signal path and the mixer circuitry 2306a of the transmit signal path may include two or more mixers and may be arranged for quadrature downconversion and upconversion, respectively. In some embodiments, the mixer circuitry 2306a of the receive signal path and the mixer circuitry 2306a of the transmit signal path may include two or more mixers and may be arranged for image rejection (e.g., Hartley image rejection). In some embodiments, the mixer circuitry 2306a of the receive signal path and the mixer circuitry 2306a of the transmit signal path may be arranged for direct downconversion and direct upconversion, respectively. In some embodiments, the mixer circuitry 2306a of the receive signal path and the mixer circuitry 2306a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 2306 may include analog-to-digital converter (ADC) and digital-to-analog converter (DAC) circuitry and the baseband circuitry 2310 may include a digital baseband interface to communicate with the RF circuitry 2306.

In some dual-mode embodiments, a separate radio IC circuitry may be provided for processing signals for each spectrum, although the scope of the embodiments is not limited in this respect.

In some embodiments, the synthesizer circuitry 2306d may be a fractional-N synthesizer or a fractional N/N+1 synthesizer, although the scope of the embodiments is not limited in this respect as other types of frequency synthesizers may be suitable. For example, synthesizer circuitry 2306d may be a delta-sigma synthesizer, a frequency multiplier, or a synthesizer comprising a phase-locked loop with a frequency divider.

The synthesizer circuitry 2306d may be configured to synthesize an output frequency for use by the mixer circuitry 2306a of the RF circuitry 2306 based on a frequency input and a divider control input. In some embodiments, the synthesizer circuitry 2306d may be a fractional N/N+1 synthesizer.

In some embodiments, frequency input may be provided by a voltage controlled oscillator (VCO), although that is not a requirement. Divider control input may be provided by either the baseband circuitry 2310 or the application circuitry 2105/2205 depending on the desired output frequency. In some embodiments, a divider control input (e.g., N) may be determined from a look-up table based on a channel indicated by the application circuitry 2105/2205.

Synthesizer circuitry 2306d of the RF circuitry 2306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 2306d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 2306 may include an IQ/polar converter.

FEM circuitry 2308 may include a receive signal path, which may include circuitry configured to operate on RF signals received from antenna array 2311, amplify the received signals and provide the amplified versions of the received signals to the RF circuitry 2306 for further processing. FEM circuitry 2308 may also include a transmit signal path, which may include circuitry configured to amplify signals for transmission provided by the RF circuitry 2306 for transmission by one or more of antenna elements of antenna array 2311. In various embodiments, the amplification through the transmit or receive signal paths may be done solely in the RF circuitry 2306, solely in the FEM circuitry 2308, or in both the RF circuitry 2306 and the FEM circuitry 2308.

In some embodiments, the FEM circuitry 2308 may include a TX/RX switch to switch between transmit mode and receive mode operation. The FEM circuitry 2308 may include a receive signal path and a transmit signal path. The receive signal path of the FEM circuitry 2308 may include an LNA to amplify received RF signals and provide the amplified received RF signals as an output (e.g., to the RF circuitry 2306). The transmit signal path of the FEM circuitry 2308 may include a power amplifier (PA) to amplify input RF signals (e.g., provided by RF circuitry 2306), and one or more filters to generate RF signals for subsequent transmission by one or more antenna elements of the antenna array 2311.

The antenna array 2311 comprises one or more antenna elements, each of which is configured convert electrical signals into radio waves to travel through the air and to convert received radio waves into electrical signals. For example, digital baseband signals provided by the baseband circuitry 2310 is converted into analog RF signals (e.g., modulated waveform) that will be amplified and transmitted via the antenna elements of the antenna array 2311 including one or more antenna elements (not shown). The antenna elements may be omnidirectional, direction, or a combination thereof. The antenna elements may be formed in a multitude of arranges as are known and/or discussed herein. The antenna array 2311 may comprise microstrip antennas or printed antennas that are fabricated on the surface of one or more printed circuit boards. The antenna array 2311 may be formed in as a patch of metal foil (e.g., a patch antenna) in a variety of shapes, and may be coupled with the RF circuitry 2306 and/or FEM circuitry 2308 using metal transmission lines or the like.

Processors of the application circuitry 2105/2205 and processors of the baseband circuitry 2310 may be used to execute elements of one or more instances of a protocol stack. For example, processors of the baseband circuitry 2310, alone or in combination, may be used execute Layer 3, Layer 2, or Layer 1 functionality, while processors of the application circuitry 2105/2205 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 24:
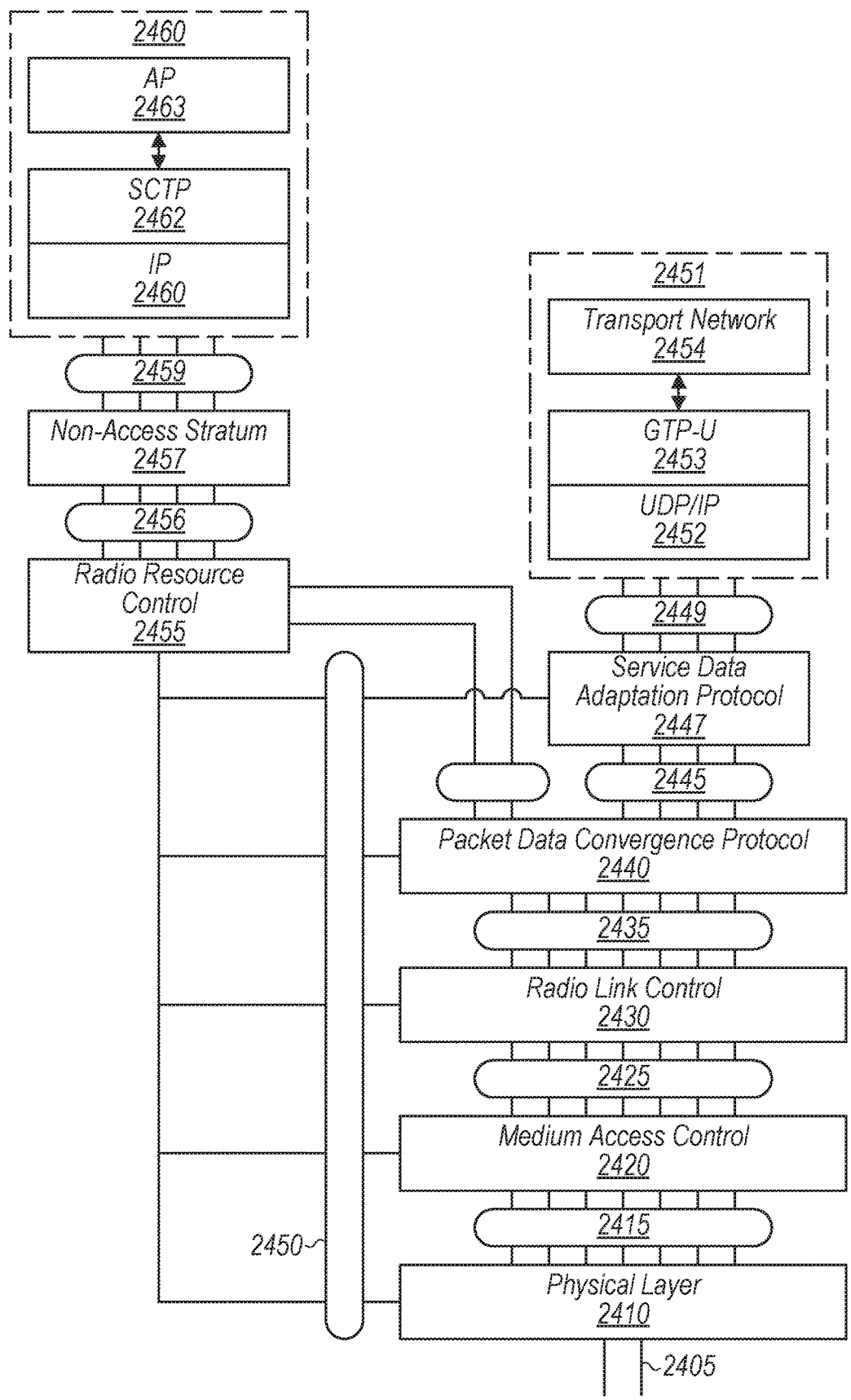
FIG. 24 illustrates various protocol functions that may be implemented in a wireless communication device, according to some embodiments.

FIG. 24 illustrates various protocol functions that may be implemented in a wireless communication device according to various embodiments. In particular, FIG. 24 includes an arrangement 2400 showing interconnections between various protocol layers/entities. The following description of FIG. 24 is provided for various protocol layers/entities that operate in conjunction with the 5G/NR system standards and LTE system standards, but some or all of the aspects of FIG. 24 may be applicable to other wireless communication network systems as well.

The protocol layers of arrangement 2400 may include one or more of PHY 2410, MAC 2420, RLC 2430, PDCP 2440, SDAP 2447, RRC 2455, and NAS layer 2457, in addition to other higher layer functions not illustrated. The protocol layers may include one or more service access points (e.g., items 2459, 2456, 2450, 2449, 2445, 2435, 2425, and 2415 in FIG. 24) that may provide communication between two or more protocol layers.

The PHY 2410 may transmit and receive physical layer signals 2405 that may be received from or transmitted to one or more other communication devices. The physical layer signals 2405 may comprise one or more physical channels, such as those discussed herein. The PHY 2410 may further perform link adaptation or adaptive modulation and coding (AMC), power control, cell search (e.g., for initial synchronization and handover purposes), and other measurements used by higher layers, such as the RRC 2455. The PHY 2410 may still further perform error detection on the transport channels, forward error correction (FEC) coding/decoding of the transport channels, modulation/demodulation of physical channels, interleaving, rate matching, mapping onto physical channels, and MIMO antenna processing. In embodiments, an instance of PHY 2410 may process requests from and provide indications to an instance of MAC 2420 via one or more PHY-SAP 2415. According to some embodiments, requests and indications communicated via PHY-SAP 2415 may comprise one or more transport channels.

Instance(s) of MAC 2420 may process requests from, and provide indications to, an instance of RLC 2430 via one or more MAC-SAPs 2425. These requests and indications communicated via the MAC-SAP 2425 may comprise one or more logical channels. The MAC 2420 may perform mapping between the logical channels and transport channels, multiplexing of MAC SDUs from one or more logical channels onto TBs to be delivered to PHY 2410 via the transport channels, de-multiplexing MAC SDUs to one or more logical channels from TBs delivered from the PHY 2410 via transport channels, multiplexing MAC SDUs onto TBs, scheduling information reporting, error correction through HARQ, and logical channel prioritization.

Instance(s) of RLC 2430 may process requests from and provide indications to an instance of PDCP 2440 via one or more radio link control service access points (RLC-SAP) 2435. These requests and indications communicated via RLC-SAP 2435 may comprise one or more RLC channels. The RLC 2430 may operate in a plurality of modes of operation, including: Transparent Mode™, Unacknowledged Mode (UM), and Acknowledged Mode (AM). The RLC 2430 may execute transfer of upper layer protocol data units (PDUs), error correction through automatic repeat request (ARQ) for AM data transfers, and concatenation, segmentation and reassembly of RLC SDUs for UM and AM data transfers. The RLC 2430 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 2440 may process requests from and provide indications to instance(s) of RRC 2455 and/or instance(s) of SDAP 2447 via one or more packet data convergence protocol service access points (PDCP-SAP) 2445. These requests and indications communicated via PDCP-SAP 2445 may comprise one or more radio bearers. The PDCP 2440 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 2447 may process requests from and provide indications to one or more higher layer protocol entities via one or more SDAP-SAP 2449. These requests and indications communicated via SDAP-SAP 2449 may comprise one or more QoS flows. The SDAP 2447 may map QoS flows to DRBs, and vice versa, and may also mark QFIs in DL and UL packets. A single SDAP entity 2447 may be configured for an individual PDU session. In the UL direction, the NG-RAN 1810 may control the mapping of QoS Flows to DRB(s) in two different ways, reflective mapping or explicit mapping. For reflective mapping, the SDAP 2447 of a UE 1801 may monitor the QFIs of the DL packets for each DRB, and may apply the same mapping for packets flowing in the UL direction. For a DRB, the SDAP 2447 of the UE 1801 may map the UL packets belonging to the QoS flows(s) corresponding to the QoS flow ID(s) and PDU session observed in the DL packets for that DRB. To enable reflective mapping, the NG-RAN 2010 may mark DL packets over the Uu interface with a QoS flow ID. The explicit mapping may involve the RRC 2455 configuring the SDAP 2447 with an explicit QoS flow to DRB mapping rule, which may be stored and followed by the SDAP 2447. In embodiments, the SDAP 2447 may only be used in NR implementations and may not be used in LTE implementations.

The RRC 2455 may configure, via one or more management service access points (M-SAP), aspects of one or more protocol layers, which may include one or more instances of PHY 2410, MAC 2420, RLC 2430, PDCP 2440 and SDAP 2447. In embodiments, an instance of RRC 2455 may process requests from and provide indications to one or more NAS entities 2457 via one or more RRC-SAPs 2456. The main services and functions of the RRC 2455 may include broadcast of system information (e.g., included in MIBs or SIBs related to the NAS), broadcast of system information related to the access stratum (AS), paging, establishment, maintenance and release of an RRC connection between the UE 1801 and RAN 1810 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more IEs, which may each comprise individual data fields or data structures.

The NAS 2457 may form the highest stratum of the control plane between the UE 1801 and the AMF 2021. The NAS 2457 may support the mobility of the UEs 1801 and the session management procedures to establish and maintain IP connectivity between the UE 1801 and a P-GW in LTE systems.

According to various embodiments, one or more protocol entities of arrangement 2400 may be implemented in UEs 1801, RAN nodes 1811, AMF 2021 in NR implementations or MME 1921 in LTE implementations, UPF 2002 in NR implementations or S-GW 1922 and P-GW 1923 in LTE implementations, or the like to be used for control plane or user plane communications protocol stack between the aforementioned devices. In such embodiments, one or more protocol entities that may be implemented in one or more of UE 1801, gNB 1811, AMF 2021, etc. may communicate with a respective peer protocol entity that may be implemented in or on another device using the services of respective lower layer protocol entities to perform such communication. In some embodiments, a gNB-CU of the gNB 1811 may host the RRC 2455, SDAP 2447, and PDCP 2440 of the gNB that controls the operation of one or more gNB-DUs, and the gNB-DUs of the gNB 1811 may each host the RLC 2430, MAC 2420, and PHY 2410 of the gNB 1811.

In a first example, a control plane protocol stack may comprise, in order from highest layer to lowest layer, NAS 2457, RRC 2455, PDCP 2440, RLC 2430, MAC 2420, and PHY 2410. In this example, upper layers 2460 may be built on top of the NAS 2457, which includes an IP layer 2461, an SCTP 2462, and an application layer signaling protocol (AP) 2463.

In NR implementations, the AP 2463 may be an NG application protocol layer (NGAP or NG-AP) 2463 for the NG interface 1813 defined between the NG-RAN node 1811 and the AMF 2021, or the AP 2463 may be an Xn application protocol layer (XnAP or Xn-AP) 2463 for the Xn interface 1812 that is defined between two or more RAN nodes 1811.

The NG-AP 2463 may support the functions of the NG interface 1813 and may comprise Elementary Procedures (EPs). An NG-AP EP may be a unit of interaction between the NG-RAN node 1811 and the AMF 2021. The NG-AP 2463 services may comprise two groups: UE-associated services (e.g., services related to a UE 1801) and non-UE-associated services (e.g., services related to the whole NG interface instance between the NG-RAN node 1811 and AMF 2021). These services may include functions including, but not limited to: a paging function for the sending of paging requests to NG-RAN nodes 1811 involved in a particular paging area; a UE context management function for allowing the AMF 2021 to establish, modify, and/or release a UE context in the AMF 2021 and the NG-RAN node 1811; a mobility function for UEs 1801 in ECM-CONNECTED mode for intra-system HOs to support mobility within NG-RAN and inter-system HOs to support mobility from/to EPS systems; a NAS Signaling Transport function for transporting or rerouting NAS messages between UE 1801 and AMF 2021; a NAS node selection function for determining an association between the AMF 2021 and the UE 1801; NG interface management function(s) for setting up the NG interface and monitoring for errors over the NG interface; a warning message transmission function for providing means to transfer warning messages via NG interface or cancel ongoing broadcast of warning messages; a Configuration Transfer function for requesting and transferring of RAN configuration information (e.g., SON information, performance measurement (PM) data, etc.) between two RAN nodes 1811 via CN 1820; and/or other like functions.

The XnAP 2463 may support the functions of the Xn interface 1812 and may comprise XnAP basic mobility procedures and XnAP global procedures. The XnAP basic mobility procedures may comprise procedures used to handle UE mobility within the NG RAN 1811 (or E-UTRAN 1910), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE 1801, such as Xn interface setup and reset procedures, NG-RAN update procedures, cell activation procedures, and the like.

In LTE implementations, the AP 2463 may be an S1 Application Protocol layer (S1-AP) 2463 for the S1 interface 1813 defined between an E-UTRAN node 1811 and an MME, or the AP 2463 may be an X2 application protocol layer (X2AP or X2-AP) 2463 for the X2 interface 1812 that is defined between two or more E-UTRAN nodes 1811.

The S1 Application Protocol layer (S1-AP) 2463 may support the functions of the S1 interface, and similar to the NG-AP discussed previously, the S1-AP may comprise S1-AP EPs. An S1-AP EP may be a unit of interaction between the E-UTRAN node 1811 and an MME 1921 within an LTE CN 1820. The S1-AP 2463 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 2463 may support the functions of the X2 interface 1812 and may comprise X2AP basic mobility procedures and X2AP global procedures. The X2AP basic mobility procedures may comprise procedures used to handle UE mobility within the E-UTRAN 1820, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE 1801, such as X2 interface setup and reset procedures, load indication procedures, error indication procedures, cell activation procedures, and the like.

The SCTP layer (alternatively referred to as the SCTP/IP layer) 2462 may provide guaranteed delivery of application layer messages (e.g., NGAP or XnAP messages in NR implementations, or S1-AP or X2AP messages in LTE implementations). The SCTP 2462 may ensure reliable delivery of signaling messages between the RAN node 1811 and the AMF 2021/MME 1921 based, in part, on the IP protocol, supported by the IP 2461. The Internet Protocol layer (IP) 2461 may be used to perform packet addressing and routing functionality. In some implementations the IP layer 2461 may use point-to-point transmission to deliver and convey PDUs. In this regard, the RAN node 1811 may comprise L2 and L1 layer communication links (e.g., wired or wireless) with the MME/AMF to exchange information.

In a second example, a user plane protocol stack may comprise, in order from highest layer to lowest layer, SDAP 2447, PDCP 2440, RLC 2430, MAC 2420, and PHY 2410. The user plane protocol stack may be used for communication between the UE 1801, the RAN node 1811, and UPF 2002 in NR implementations or an S-GW 1922 and P-GW 1923 in LTE implementations. In this example, upper layers 2451 may be built on top of the SDAP 2447, and may include a user datagram protocol (UDP) and IP security layer (UDP/IP) 2452, a General Packet Radio Service (GPRS) Tunneling Protocol for the user plane layer (GTP-U) 2453, and a User Plane PDU layer (UP PDU) 2463.

The transport network layer 2454 (also referred to as a "transport layer") may be built on IP transport, and the GTP-U 2453 may be used on top of the UDP/IP layer 2452 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 2453 may be used for carrying user data within the GPRS core network and between the radio access network and the core network. The user data transported can be packets in any of IPv4, IPv6, or PPP formats, for example. The UDP/IP 2452 may provide checksums for data integrity, port numbers for addressing different functions at the source and destination, and encryption and authentication on the selected data flows. The RAN node 1811 and the S-GW 1922 may utilize an S1-U interface to exchange user plane data via a protocol stack comprising an L1 layer (e.g., PHY 2410), an L2 layer (e.g., MAC 2420, RLC 2430, PDCP 2440, and/or SDAP 2447), the UDP/IP layer 2452, and the GTP-U 2453. The S-GW 1922 and the P-GW 1923 may utilize an S5/S8a interface to exchange user plane data via a protocol stack comprising an L1 layer, an L2 layer, the UDP/IP layer 2452, and the GTP-U 2453. As discussed previously, NAS protocols may support the mobility of the UE 1801 and the session management procedures to establish and maintain IP connectivity between the UE 1801 and the P-GW 1923.

Moreover, although not shown by FIG. 24, an application layer may be present above the AP 2463 and/or the transport network layer 2454. The application layer may be a layer in which a user of the UE 1801, RAN node 1811, or other network element interacts with software applications being executed, for example, by application circuitry 2105 or application circuitry 2205, respectively. The application layer may also provide one or more interfaces for software applications to interact with communications systems of the UE 1801 or RAN node 1811, such as the baseband circuitry 2310. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Figure 25:
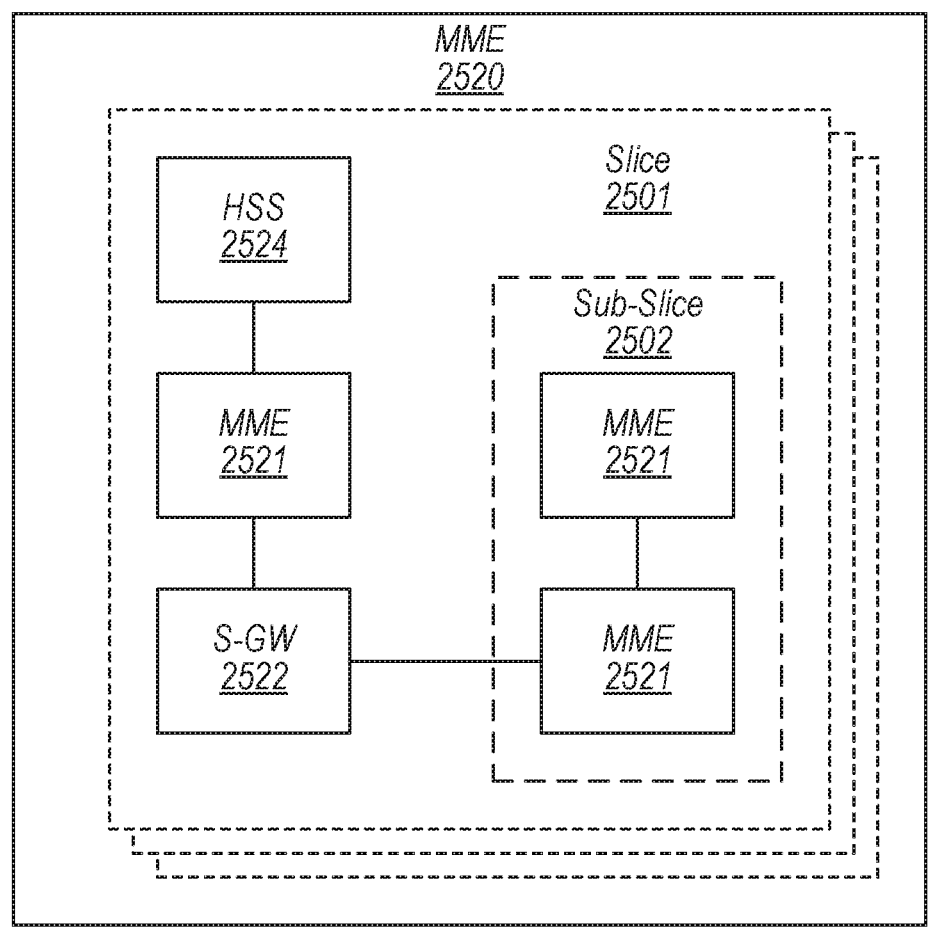
FIG. 25 illustrates components of a core network, according to some embodiments.

FIG. 25 illustrates components of a core network in accordance with various embodiments. The components of the CN 1920 may be implemented in one physical node or separate physical nodes including components to read and execute instructions from a machine-readable or computer-readable medium (e.g., a non-transitory machine-readable storage medium). In embodiments, the components of CN 2020 may be implemented in a same or similar manner as discussed herein with regard to the components of CN 1920. In some embodiments, NFV is utilized to virtualize any or all of the above-described network node functions via executable instructions stored in one or more computer-readable storage mediums (described in further detail below). A logical instantiation of the CN 1920 may be referred to as a network slice 2501, and individual logical instantiations of the CN 1920 may provide specific network capabilities and network characteristics. A logical instantiation of a portion of the CN 1920 may be referred to as a network sub-slice 2502 (e.g., the network sub-slice 2502 is shown to include the P-GW 1923 and the PCRF 1926).

As used herein, the terms "instantiate," "instantiation," and the like may refer to the creation of an instance, and an "instance" may refer to a concrete occurrence of an object, which may occur, for example, during execution of program code. A network instance may refer to information identifying a domain, which may be used for traffic detection and routing in case of different IP domains or overlapping IP addresses. A network slice instance may refer to a set of network functions (NFs) instances and the resources (e.g., compute, storage, and networking resources) required to deploy the network slice.

With respect to 5G systems (see, e.g., FIG. 20), a network slice always comprises a RAN part and a CN part. The support of network slicing relies on the principle that traffic for different slices is handled by different PDU sessions. The network can realize the different network slices by scheduling and also by providing different L1/L2 configurations. The UE 2001 provides assistance information for network slice selection in an appropriate RRC message, if it has been provided by NAS. While the network can support large number of slices, the UE need not support more than 8 slices simultaneously.

A network slice may include the CN 2020 control plane and user plane NFs, NG-RANs 2010 in a serving PLMN, and a N3IWF functions in the serving PLMN. Individual network slices may have different S-NSSAI and/or may have different SSTs. NSSAI includes one or more S-NSSAIs, and each network slice is uniquely identified by an S-NSSAI. Network slices may differ for supported features and network functions optimizations, and/or multiple network slice instances may deliver the same service/features but for different groups of UEs 2001 (e.g., enterprise users). For example, individual network slices may deliver different committed service(s) and/or may be dedicated to a particular customer or enterprise. In this example, each network slice may have different S-NSSAIs with the same SST but with different slice differentiators. Additionally, a single UE may be served with one or more network slice instances simultaneously via a 5G AN and associated with eight different S-NSSAIs. Moreover, an AMF 2021 instance serving an individual UE 2001 may belong to each of the network slice instances serving that UE.

Network Slicing in the NG-RAN 2010 involves RAN slice awareness. RAN slice awareness includes differentiated handling of traffic for different network slices, which have been pre-configured. Slice awareness in the NG-RAN 2010 is introduced at the PDU session level by indicating the S-NSSAI corresponding to a PDU session in all signaling that includes PDU session resource information. How the NG-RAN 2010 supports the slice enabling in terms of NG-RAN functions (e.g., the set of network functions that comprise each slice) is implementation dependent. The NG-RAN 2010 selects the RAN part of the network slice using assistance information provided by the UE 2001 or the 5GC 2020, which unambiguously identifies one or more of the pre-configured network slices in the PLMN. The NG-RAN 2010 also supports resource management and policy enforcement between slices as per SLAs. A single NG-RAN node may support multiple slices, and the NG-RAN 2010 may also apply an appropriate RRM policy for the SLA in place to each supported slice. The NG-RAN 2010 may also support QoS differentiation within a slice.

The NG-RAN 2010 may also use the UE assistance information for the selection of an AMF 2021 during an initial attach, if available. The NG-RAN 2010 uses the assistance information for routing the initial NAS to an AMF 2021. If the NG-RAN 2010 is unable to select an AMF 2021 using the assistance information, or the UE 2001 does not provide any such information, the NG-RAN 2010 sends the NAS signaling to a default AMF 2021, which may be among a pool of AMFs 2021. For subsequent accesses, the UE 2001 provides a temp ID, which is assigned to the UE 2001 by the 5GC 2020, to enable the NG-RAN 2010 to route the NAS message to the appropriate AMF 2021 as long as the temp ID is valid. The NG-RAN 2010 is aware of, and can reach, the AMF 2021 that is associated with the temp ID. Otherwise, the method for initial attach applies.

The NG-RAN 2010 supports resource isolation between slices. NG-RAN 2010 resource isolation may be achieved by means of RRM policies and protection mechanisms that should avoid that shortage of shared resources if one slice breaks the service level agreement for another slice. In some implementations, it is possible to fully dedicate NG-RAN 2010 resources to a certain slice. How NG-RAN 2010 supports resource isolation is implementation dependent.

Some slices may be available only in part of the network. Awareness in the NG-RAN 2010 of the slices supported in the cells of its neighbors may be beneficial for inter-frequency mobility in connected mode. The slice availability may not change within the UE's registration area. The NG-RAN 2010 and the 5GC 2020 are responsible to handle a service request for a slice that may or may not be available in a given area. Admission or rejection of access to a slice may depend on factors such as support for the slice, availability of resources, support of the requested service by NG-RAN 2010.

The UE 2001 may be associated with multiple network slices simultaneously. In case the UE 2001 is associated with multiple slices simultaneously, only one signaling connection is maintained, and for intra-frequency cell reselection, the UE 2001 tries to camp on the best cell. For inter-frequency cell reselection, dedicated priorities can be used to control the frequency on which the UE 2001 camps. The 5GC 2020 is to validate that the UE 2001 has the rights to access a network slice. Prior to receiving an Initial Context Setup Request message, the NG-RAN 2010 may be allowed to apply some provisional/local policies, based on awareness of a particular slice that the UE 2001 is requesting to access. During the initial context setup, the NG-RAN 2010 is informed of the slice for which resources are being requested.

NFV architectures and infrastructures may be used to virtualize one or more NFs, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 26:
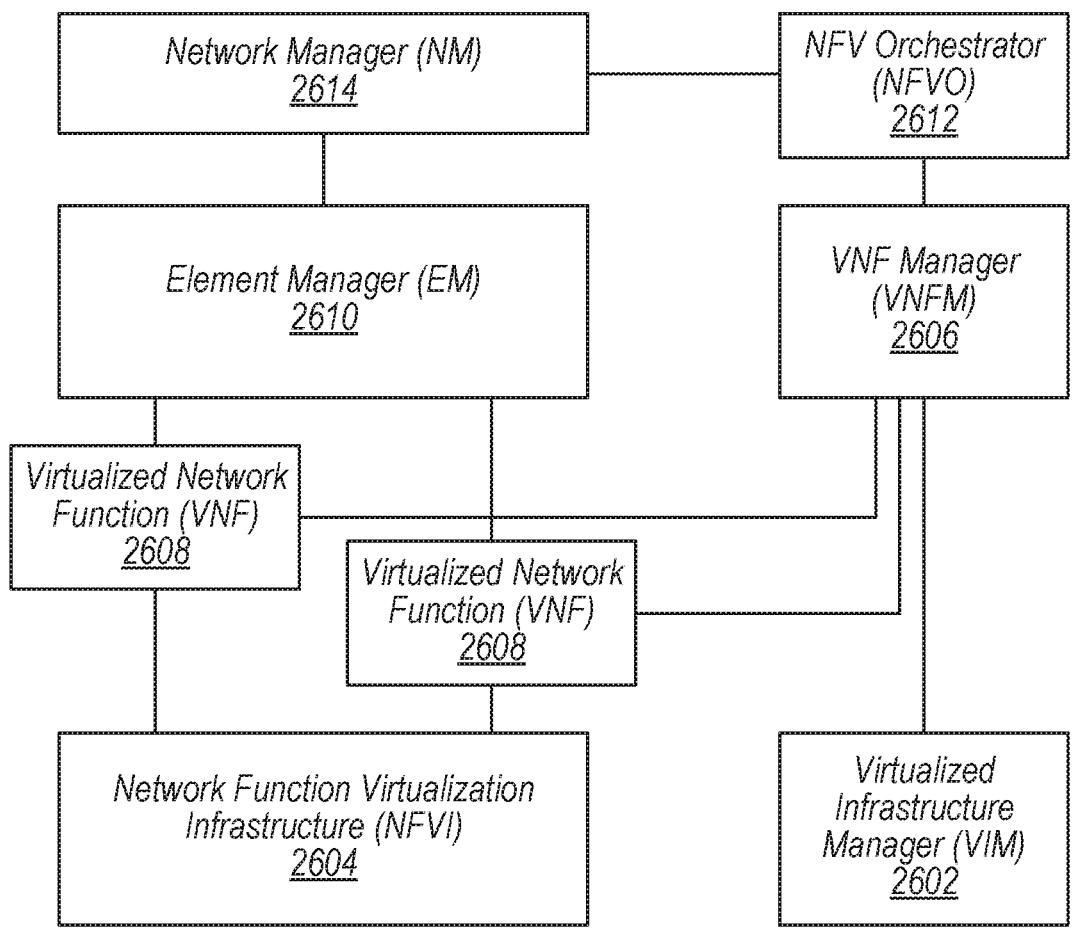
FIG. 26 is a block diagram illustrating components that may support a network virtualization function of a system, according to some embodiments.

FIG. 26 is a block diagram illustrating components, according to some example embodiments, of a system 2600 to support NFV. The system 2600 is illustrated as including a VIM 2602, an NFVI 2604, an VNFM 2606, VNFs 2608, an EM 2610, an NFVO 2612, and a NM 2614.

The VIM 2602 manages the resources of the NFVI 2604. The NFVI 2604 can include physical or virtual resources and applications (including hypervisors) used to execute the system 2600. The VIM 2602 may manage the life cycle of virtual resources with the NFVI 2604 (e.g., creation, maintenance, and tear down of VMs associated with one or more physical resources), track VM instances, track performance, fault and security of VM instances and associated physical resources, and expose VM instances and associated physical resources to other management systems.

The VNFM 2606 may manage the VNFs 2608. The VNFs 2608 may be used to execute EPC components/functions. The VNFM 2606 may manage the life cycle of the VNFs 2608 and track performance, fault and security of the virtual aspects of VNFs 2608. The EM 2610 may track the performance, fault and security of the functional aspects of VNFs 2608. The tracking data from the VNFM 2606 and the EM 2610 may comprise, for example, PM data used by the VIM 2602 or the NFVI 2604. Both the VNFM 2606 and the EM 2610 can scale up/down the quantity of VNFs of the system 2600.

The NFVO 2612 may coordinate, authorize, release and engage resources of the NFVI 2604 in order to provide the requested service (e.g., to execute an EPC function, component, or slice). The NM 2614 may provide a package of end-user functions with the responsibility for the management of a network, which may include network elements with VNFs, non-virtualized network functions, or both (management of the VNFs may occur via the EM 2610).

Figure 27:
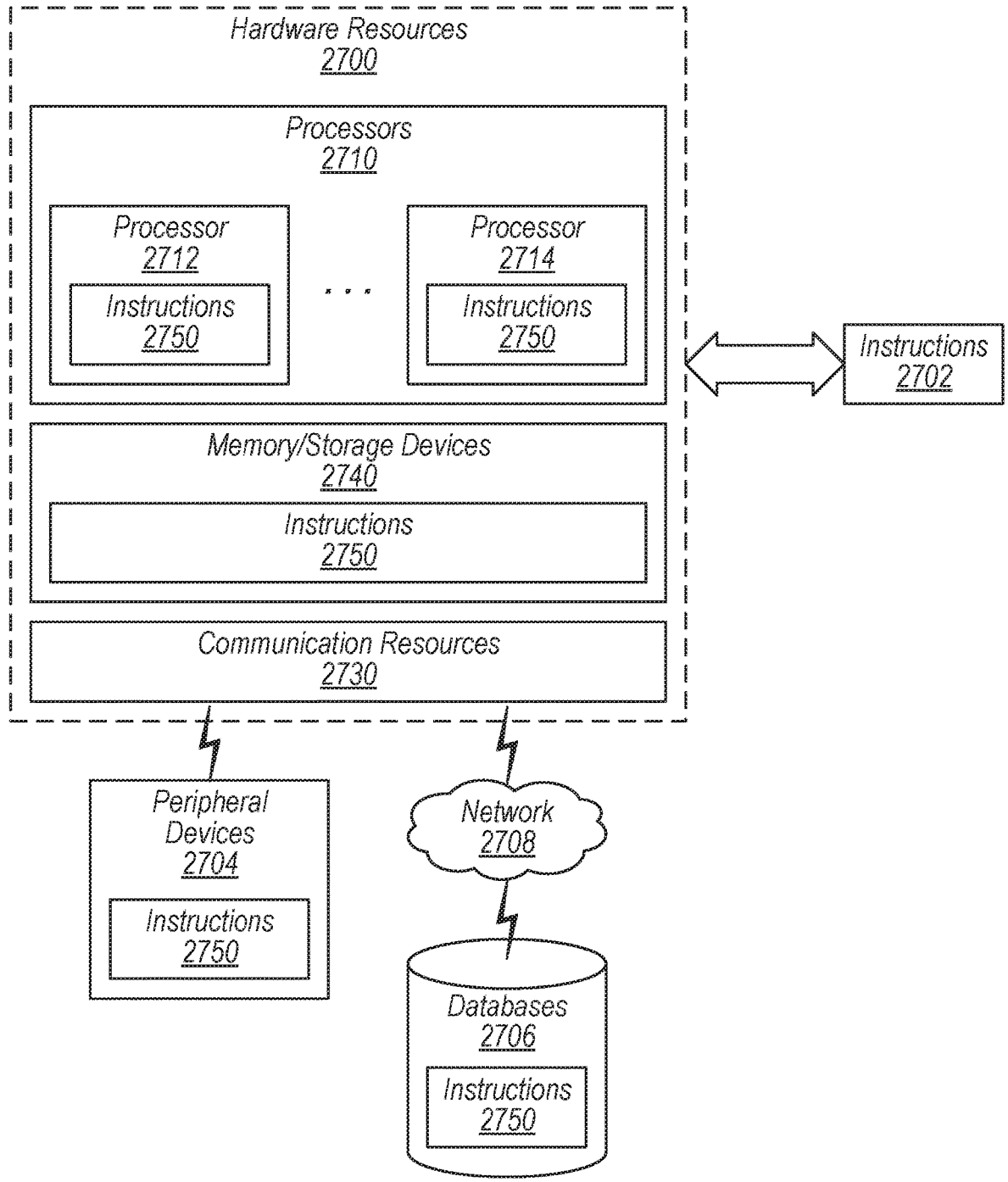
FIG. 27 is a block diagram illustrating components that may be able to read instructions from a machine-readable or computer-readable medium and perform any one or more of the methods described herein, according to some embodiments.

FIG. 27 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 27 shows a diagrammatic representation of hardware resources 2700 including one or more processors (or processor cores) 2710, one or more memory/storage devices 2720, and one or more communication resources 2730, each of which may be communicatively coupled via a bus 2740. For embodiments where node virtualization (e.g., NFV) is utilized, a hypervisor 2702 may be executed to provide an execution environment for one or more network slices/sub-slices to utilize the hardware resources 2700.

The processors 2710 may include, for example, a processor 2712 and a processor 2714. The processor(s) 2710 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 2720 may include main memory, disk storage, or any suitable combination thereof. The memory/storage devices 2720 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 2730 may include interconnection or network interface components or other suitable devices to communicate with one or more peripheral devices 2704 or one or more databases 2706 via a network 2708. For example, the communication resources 2730 may include wired communication components (e.g., for coupling via USB), cellular communication components, NFC components, Bluetooth® (or Bluetooth® Low Energy) components, Wi-Fi® components, and other communication components.

Instructions 2750 may comprise software, a program, an application, an applet, an app, or other executable code for causing at least any of the processors 2710 to perform any one or more of the methodologies discussed herein. The instructions 2750 may reside, completely or partially, within at least one of the processors 2710 (e.g., within the processor's cache memory), the memory/storage devices 2720, or any suitable combination thereof. Furthermore, any portion of the instructions 2750 may be transferred to the hardware resources 2700 from any combination of the peripheral devices 2704 or the databases 2706. Accordingly, the memory of processors 2710, the memory/storage devices 2720, the peripheral devices 2704, and the databases 2706 are examples of computer-readable and machine-readable media.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106, a BS 102, a network element 600) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
    performing a code block group (CBG) based uplink transmission;
    identifying an uplink (UL) reference burst of the CBG based uplink transmission;
    determining, at a first time, a contention window size (CWS) adjustment, wherein the CWS adjustment comprises:
        resetting the CWS for all priority classes at the wireless device to a minimum value if:
            a UL grant is received and a new data indicator (NDI) bit for at least one of active hybrid automatic request (HARQ) processes is toggled; and
            a UL grant is received and the NDI bit is not toggled and at least one or more acknowledgements (ACKs) for Y % of CBGs for at least one of the active HARQ processes are indicated, wherein for individual bits of CBG transmit information (CBGTI) in the UL grant, a value of 1 is considered a negative acknowledgement (NACK) when the NDI is not toggled and values other than 1 are considered as ACKs; or
        otherwise, performing one of maintaining the CWS for all priority classes or increasing the CWS for all priority classes at the wireless device to a next higher level.

2. The method of claim 1, wherein identifying the UL reference burst of the CBG based UL transmission is performed in one of the following manners:
    selecting a configured amount of time from a beginning of an UL burst as the UL reference burst in a manner independent from subcarrier spacing;
    selecting a partial subframe from the beginning of the UL burst as the UL reference burst;
    selecting the partial subframe from the beginning of the UL burst and a following subframe as the UL reference burst, wherein if the partial subframe is the only subframe included in the UL burst, only the partial subframe is used as the UL reference burst; or
    selecting a configured number of symbols from the beginning of the UL burst as the UL reference burst.

3. The method of claim 1,
    wherein the UL reference burst occurs at least a configured number of symbols prior to the UL grant for which the CWS adjustment is determined.

4. The method of claim 1, wherein to determine the CWS adjustment, the method further comprises:
    increasing the CWS if the NDI bit for at least one active HARQ process of a HARQ process ID of the uplink reference burst is not toggled in an uplink grant for which the CWS adjustment is determined, or if the HARQ process ID of the uplink reference burst is not scheduled in the uplink grant for which the CWS adjustment is determined.

5. The method of claim 1, wherein to determine the CWS adjustment, the method further comprises:
    resetting the CWS to a minimum CWS value for a priority class if a maximum CWS value is used for a configured number of listen before talk (LBT) attempts for the priority class.

6. The method of claim 1, further comprising:
identifying a number of ACKs received for the uplink reference burst and a number of NACKs received for the uplink reference burst,
wherein the CWS adjustment is determined based at least in part on one or more of the number of ACKs received for the uplink reference burst or the number of NACKs received for the uplink reference burst.

7. The method of claim 1,
wherein maintaining the CWS for all priority classes is performed when a new uplink transmission is started before N slots have elapsed from a previous category 4 (Cat-4) listen before talk (LBT) procedure.

8. A processor configured to:
perform a code block group (CBG) based uplink transmission;
identify an uplink (UL) reference burst of the CBG based uplink transmission;
determine, at a first time, a contention window size (CWS) adjustment, wherein the CWS adjustment comprises:
resetting the CWS for all priority classes at the wireless device to a minimum value if:
a UL grant is received and a new data indicator (NDI) bit for at least one of active hybrid automatic request (HARD) processes is toggled; and
a UL grant is received and the NDI bit is not toggled and at least one or more acknowledgements (ACKs) for Y % of CBGs for at least one of the active HARQ processes are indicated, wherein for individual bits of CBG transmit information (CBGTI) in the UL grant, a value of 1 is considered a negative acknowledgement (NACK) when the NDI is not toggled and values other than 1 are considered as ACKs; or
otherwise, performing one of maintaining the CWS for all priority classes or increasing the CWS for all priority classes at the wireless device to a next higher level.

9. The processor of claim 8, wherein maintaining the CWS for all priority classes is performed when a new uplink transmission is started before N slots have elapsed from a previous category 4 (Cat-4) listen before talk (LBT) procedure.

10. The processor of claim 8, wherein identifying the UL reference burst of the CBG based UL transmission is performed in one of the following manners:
selecting a configured amount of time from a beginning of an UL burst as the UL reference burst in a manner independent from subcarrier spacing;
selecting a partial subframe from the beginning of the UL burst as the UL reference burst;
selecting the partial subframe from the beginning of the UL burst and a following subframe as the UL reference burst, wherein if the partial subframe is the only subframe included in the UL burst, only the partial subframe is used as the UL reference burst; or
selecting a configured number of symbols from the beginning of the UL burst as the UL reference burst.

11. The processor of claim 8, wherein the UL reference burst occurs at least a configured number of symbols prior to the UL grant for which the CWS adjustment is determined.

12. The processor of claim 8, wherein to determine the CWS adjustment, the processor is further configured to:
increase the CWS if the NDI bit for at least one active HARQ process of a HARQ process ID of the uplink reference burst is not toggled in an uplink grant for which the CWS adjustment is determined, or if the HARQ process ID of the uplink reference burst is not scheduled in the uplink grant for which the CWS adjustment is determined.

13. The processor of claim 8, wherein to determine the adjustment, the processor is further configured to:
reset the CWS to a minimum CWS value for a priority class if a maximum CWS value is used for a configured number of listen before talk (LBT) attempts for the priority class.

14. The processor of claim 8, wherein the processor is further configured to:
identify a number of ACKs received for the uplink reference burst and a number of NACKs received for the uplink reference burst,
wherein the CWS adjustment is determined based at least in part on one or more of the number of ACKs received for the uplink reference burst or the number of NACKs received for the uplink reference burst.

15. The processor of claim 8, wherein the processor is a baseband processor.

16. A non-transitory computer readable storage medium storing program instructions executable by one or more processors to cause a user equipment (UE) device to:
perform a code block group (CBG) based uplink transmission;
identify an uplink (UL) reference burst of the CBG based uplink transmission;
determine, at a first time, a contention window size (CWS) adjustment, wherein the CWS adjustment comprises:
resetting the CWS for all priority classes at the wireless device to a minimum value if:
a UL grant is received and a new data indicator (NDI) bit for at least one of active hybrid automatic request (HARQ) processes is toggled; and
a UL grant is received and the NDI bit is not toggled and at least one or more acknowledgements (ACKs) for Y % of CBGs for at least one of the active HARQ processes are indicated, wherein for individual bits of CBG transmit information (CBGTI) in the UL grant, a value of 1 is considered a negative acknowledgement (NACK) when the NDI is not toggled and values other than 1 are considered as ACKs; or
otherwise, performing one of maintaining the CWS for all priority classes or increasing the CWS for all priority classes at the wireless device to a next higher level.

17. The non-transitory computer readable storage medium of claim 16, wherein maintaining the CWS for all priority classes is performed when a new uplink transmission is started before N slots have elapsed from a previous category 4 (Cat-4) listen before talk (LBT) procedure.

18. The non-transitory computer readable storage medium of claim 16, wherein identifying the UL reference burst of the CBG based UL transmission is performed in one of the following manners:
selecting a configured amount of time from a beginning of an UL burst as the UL reference burst in a manner independent from subcarrier spacing;
selecting a partial subframe from the beginning of the UL burst as the UL reference burst;
selecting the partial subframe from the beginning of the UL burst and a following subframe as the UL reference burst, wherein if the partial subframe is the only subframe included in the UL burst, only the partial subframe is used as the UL reference burst; or selecting a configured number of symbols from the beginning of the UL burst as the UL reference burst.

19. The non-transitory computer readable storage medium of claim 16, wherein the UL reference burst occurs at least a configured number of symbols prior to the UL grant for which the CWS adjustment is determined.

20. The non-transitory computer readable storage medium of claim 16, wherein at least one of the one or more processors is a baseband processor.

* * * * *